US008637192B2

(12) United States Patent  
Yamamoto et al.

(10) Patent No.: US 8,637,192 B2
(45) Date of Patent: *Jan. 28, 2014

(54) NONAQUEOUS ELECTROLYTIC SOLUTION CONTAINING MAGNESIUM IONS, AND ELECTROCHEMICAL DEVICE USING THE SAME

(75) Inventors: Kenta Yamamoto, Kanagawa (JP); Yuri Nakayama, Kanagawa (JP); Yui Senda, Kanagawa (JP)

(73) Assignee: Sony Corporation, Tokyo (JP)

( * ) Notice: Subject to any disclaimer, the term of this patent is extended or adjusted under 35 U.S.C. 154(b) by 302 days.

This patent is subject to a terminal disclaimer.

(21) Appl. No.: 12/996,548

(22) PCT Filed: Jun. 4, 2009

(86) PCT No.: PCT/JP2009/060234
§ 371 (c)(1),
(2), (4) Date: Dec. 6, 2010

(87) PCT Pub. No.: WO2009/148112
PCT Pub. Date: Dec. 10, 2009

(65) Prior Publication Data
US 2011/0111286 A1     May 12, 2011

(30) Foreign Application Priority Data

Jun. 5, 2008 (JP) ................ P2008-148401
Jun. 5, 2008 (JP) ................ P2008-148402
Jun. 5, 2008 (JP) ................ P2008-148403

(51) Int. Cl.
*H01M 10/0568* (2010.01)
*H01M 4/46* (2006.01)
*H01M 4/583* (2010.01)
*H01M 4/62* (2006.01)

(52) U.S. Cl.
USPC ............... 429/341; 429/231.6; 429/231.7; 429/232

(58) Field of Classification Search
USPC ............... 429/108, 341, 231.6, 231.7, 232
See application file for complete search history.

(56) References Cited

U.S. PATENT DOCUMENTS 4,684,591 A * 8/1987 Okamura et al. ...... 429/231.6 X
5,489,492 A * 2/1996 Asami et al. .............. 429/232 X (Continued)

FOREIGN PATENT DOCUMENTS

JP    2003-512704     4/2003
JP    2003-346899    12/2003

(Continued)

OTHER PUBLICATIONS

D. Aurbach et al. "Prototype Systems for Rechargeable Magnesium Batteries", Nature 407, p. 724-727 (2000).

(Continued)

*Primary Examiner* — Stephen J. Kalafut
(74) *Attorney, Agent, or Firm* — K&L Gates LLP

(57) ABSTRACT

A nonaqueous electrolytic solution containing magnesium ions which shows excellent electrochemical characteristics and which can be manufactured in a general manufacturing environment such as a dry room, and an electrochemical device using the same are provided. A Mg battery has a positive-electrode can 1, a positive-electrode pellet 2 made of a positive-electrode active material or the like, a positive electrode 11 composed of a metallic net supporting body 3, a negative-electrode cup 4, a negative electrode 12 made of a negative-electrode active material 5, and a separator 6 impregnated with an electrolytic solution 7 and disposed between the positive-electrode pellet and the negative-electrode active material. Metal Mg, an alkyl trifluoromethanesulfonate, a quaternary ammonium salt or/and a 1,3-alkylmethylimidazolium salt, more preferably, an aluminum halide are added to an ether system organic solvent and are then heated, and thereafter, more preferably, a trifluoroborane-ether complex salt is added thereto, thereby preparing the electrolytic solution. By adopting a structure that copper contacts the positive-electrode active material, the electrochemical device can be given a large discharge capacity.

14 Claims, 21 Drawing Sheets

| BATTERY | QUATERNARY AMMONIUM SALT | DISCHARGE CAPACITY (mAh/g) |
|---|---|---|
| EXAMPLE 1 | $BF_4N(C_4H_9)_4$ | 320.5 |
| EXAMPLE 9-1 | $CF_3SO_3N(C_4H_9)_4$ | 320.1 |
| EXAMPLE 9-2 | $CF_3SO_3N(C_4H_9)_3CH_3$ | 313.2 |
| EXAMPLE 9-3 | $CF_3SO_3N(C_2H_5)_3CH_3$ | 321.0 |
| EXAMPLE 9-4 | $BF_4N(C_4H_9)_3CH_3$ | 314.8 |
| EXAMPLE 9-5 | $BF_4N(C_2H_5)_3CH_3$ | 324.6 |
| EXAMPLE 9-6 | $(SO_2CF_3)_2N-N(C_4H_9)_4$ | 322.6 |
| EXAMPLE 9-7 | $(SO_2CF_3)_2N-N(C_4H_9)_4CH_3$ | 318.7 |
| EXAMPLE 9-8 | $(SO_2CF_3)_2N-N(C_2H_5)_3CH_3$ | 325.4 |

(56) References Cited

U.S. PATENT DOCUMENTS

| | | | |
|---|---|---|---|
| 6,576,159 B1 * | 6/2003 | Michot et al. | 252/511 |
| 7,700,243 B2 * | 4/2010 | Nishida et al. | 429/347 |
| 2001/0049060 A1 | 12/2001 | Aurbach et al. | |
| 2004/0137324 A1 | 7/2004 | Itaya et al. | |
| 2009/0068568 A1 | 3/2009 | Yamamoto et al. | |

FOREIGN PATENT DOCUMENTS

| | | | | |
|---|---|---|---|---|
| JP | 2004-492301 | * | 6/2004 | H01M 6/16 |
| JP | 2004-256676 | | 9/2004 | |
| JP | 2004-259650 | | 9/2004 | |
| JP | 2004-265676 | | 9/2004 | |
| JP | 2004-265677 | | 9/2004 | |
| JP | 2004-327326 | | 11/2004 | |
| JP | 2007-188694 | | 7/2007 | |
| JP | 2007-188709 | | 7/2007 | |
| JP | 2007-280627 | | 10/2007 | |
| WO | 2007/055172 | | 5/2007 | |

OTHER PUBLICATIONS

Amir et al., "Progress in nonaqueous magnesium electrochemistry", Journal of Power Sources, 2007, pp. 1234-1240, vol. 174.
European Search Report issued Jul. 16, 2012 for corresponding European Appln. No. 09758379.3.

* cited by examiner

FIG. 2

| BATTERY | Mg CONCENTRATION (*) | MeTFS CONCENTRATION (*) | TBABF$_4$ CONCENTRATION (*) | AlCl$_3$ CONCENTRATION (*) | HEATING TEMPERATURE (°C) | BF$_3$DEE CONCENTRATION (*) | DISCHARGE CAPACITY (mAh/g) |
|---|---|---|---|---|---|---|---|
| EXAMPLE 1 | 0.50 | 0.50 | 0.75 | 0.25 | 60 | 1.00 | 320.5 |
| COMPARATIVE EXAMPLE 1 | 0.50 | 0.50 | 0.75 | | | | 308.7 |
| COMPARATIVE EXAMPLE 2 | 0.50 | 0.50 | | 0.25 | | | 12.3 |
| COMPARATIVE EXAMPLE 3 | 0.50 | 0.50 | | | 60 | 1.00 | 0.0 |
| COMPARATIVE EXAMPLE 4 | 0.50 | 0.50 | 0.75 | 0.25 | | | 313.0 |
| COMPARATIVE EXAMPLE 5 | 0.50 | 0.50 | 0.75 | | | 1.00 | 316.1 |
| COMPARATIVE EXAMPLE 6 | 0.50 | 0.50 | | 0.25 | | 1.00 | 20.4 |
| COMPARATIVE EXAMPLE 7-1 | 0.25 mol/l THF SOLUTION OF Mg[AlCl$_2$(C$_2$H$_5$)(C$_4$H$_9$)]$_2$ | | | | | | 0.0 |
| COMPARATIVE EXAMPLE 7-2 | 0.25 mol/l THF SOLUTION OF Mg[AlCl$_2$(C$_2$H$_5$)(C$_4$H$_9$)]$_2$ | | | | | | 314.0 |

*: mol/l

| BATTERY | Mg CONCENTRATION (mol/l) | MeTFS CONCENTRATION (mol/l) | TBABF$_4$ CONCENTRATION (mol/l) | AlCl$_3$ CONCENTRATION (mol/l) | HEATING TEMPERATURE (°C) | BF$_3$DEE CONCENTRATION (mol/l) | DISCHARGE CAPACITY (mAh/g) |
|---|---|---|---|---|---|---|---|
| COMPARATIVE EXAMPLE 2-1 | | 0.00 | | | | | 0.0 |
| EXAMPLE 2-1 | | 0.10 | | | | | 51.4 |
| EXAMPLE 2-2 | | 0.35 | | | | | 265.3 |
| EXAMPLE 2-3 | | 0.40 | | | | | 314.1 |
| EXAMPLE 1 | 0.50 | 0.50 | 0.75 | 0.25 | 60 | 1.00 | 320.5 |
| EXAMPLE 2-4 | | 0.60 | | | | | 320.0 |
| EXAMPLE 2-5 | | 0.65 | | | | | 287.0 |
| EXAMPLE 2-6 | | 0.70 | | | | | 246.8 |
| EXAMPLE 2-7 | | 0.80 | | | | | 151.3 |

(B)

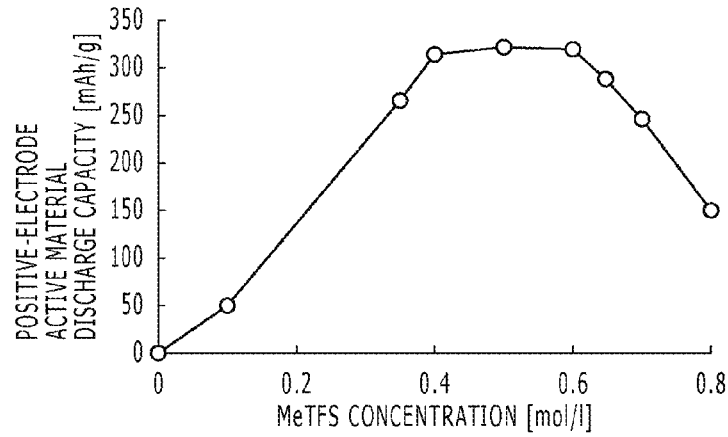

(A)

| BATTERY | Mg CONCENTRATION (mol/l) | MeTFS CONCENTRATION (mol/l) | TBABF$_4$ CONCENTRATION (mol/l) | AlCl$_3$ CONCENTRATION (mol/l) | HEATING TEMPERATURE (°C) | BF$_3$DEE CONCENTRATION (mol/l) | DISCHARGE CAPACITY (mAh/g) |
|---|---|---|---|---|---|---|---|
| COMPARATIVE EXAMPLE 3-1 | | | 0.00 | | | | 63.8 |
| EXAMPLE 3-1 | | | 0.20 | | | | 119.1 |
| EXAMPLE 3-2 | | | 0.40 | | | | 190.5 |
| EXAMPLE 3-3 | 0.50 | 0.50 | 0.50 | 0.25 | 60 | 1.00 | 315.9 |
| EXAMPLE 1 | | | 0.75 | | | | 320.5 |
| EXAMPLE 3-4 | | | 1.00 | | | | 318.6 |
| EXAMPLE 3-5 | | | 1.10 | | | | 256.6 |
| EXAMPLE 3-6 | | | 1.20 | | | | 211.4 |

(B)

(A)

| BATTERY | Mg CONCENTRATION (mol/l) | MeTFS CONCENTRATION (mol/l) | TBABF4 CONCENTRATION (mol/l) | AlCl3 CONCENTRATION (mol/l) | HEATING TEMPERATURE (°C) | BF3DEE CONCENTRATION (mol/l) | DISCHARGE CAPACITY (mAh/g) |
|---|---|---|---|---|---|---|---|
| EXAMPLE 4-1 | 0.50 | 0.50 | 0.75 | 0.00 | 60 | 1.00 | 310.4 |
| EXAMPLE 4-2 | | | | 0.10 | | | 318.0 |
| EXAMPLE 1 | | | | 0.25 | | | 320.5 |
| EXAMPLE 4-3 | | | | 0.50 | | | 315.0 |
| EXAMPLE 4-4 | | | | 0.55 | | | 265.2 |
| EXAMPLE 4-5 | | | | 0.60 | | | 219.0 |
| EXAMPLE 4-6 | | | | 0.80 | | | 91.2 |
| EXAMPLE 4-7 | | | | 1.00 | | | 54.9 |

(B)

(A)

| BATTERY | Mg CONCENTRATION (mol/l) | MeTFS CONCENTRATION (mol/l) | TBABF4 CONCENTRATION (mol/l) | AlCl3 CONCENTRATION (mol/l) | HEATING TEMPERATURE (°C) | BF3DEE CONCENTRATION (mol/l) | DISCHARGE CAPACITY (mAh/g) |
|---|---|---|---|---|---|---|---|
| EXAMPLE 5-1 | 0.10 | 0.10 | 0.20 | 0.10 | | 0.20 | 115.4 |
| EXAMPLE 5-2 | 0.20 | 0.20 | 0.40 | 0.20 | | 0.40 | 262.0 |
| EXAMPLE 5-3 | 0.25 | 0.25 | 0.50 | 0.25 | | 0.50 | 318.7 |
| EXAMPLE 5-4 | 0.50 | 0.50 | 1.00 | 0.50 | | 1.00 | 319.4 |
| EXAMPLE 5-5 | 0.90 | 0.90 | 1.80 | 0.90 | 60 | 1.80 | 320.5 |
| EXAMPLE 5-6 | 1.00 | 1.00 | 2.00 | 1.00 | | 2.00 | 320.1 |
| EXAMPLE 5-7 | 1.05 | 1.05 | 2.10 | 1.05 | | 2.10 | 295.4 |
| EXAMPLE 5-8 | 1.20 | 1.20 | 2.40 | 1.20 | | 2.40 | 218.2 |
| EXAMPLE 5-9 | 1.50 | 1.50 | 3.00 | 1.50 | | 3.00 | 82.1 |

(B)

(A)

| BATTERY | Mg CONCENTRATION (mol/l) | MeTFS CONCENTRATION (mol/l) | TBABF4 CONCENTRATION (mol/l) | AlCl3 CONCENTRATION (mol/l) | HEATING TEMPERATURE (°C) | BF3DEE CONCENTRATION (mol/l) | DISCHARGE CAPACITY (mAh/g) |
|---|---|---|---|---|---|---|---|
| EXAMPLE 6-1 | 0.50 | 0.50 | 0.75 | 0.25 | 20 | 1.00 | 0.0 |
| EXAMPLE 6-2 | | | | | 30 | | 122.8 |
| EXAMPLE 6-3 | | | | | 40 | | 228.6 |
| EXAMPLE 6-4 | | | | | 50 | | 310.2 |
| EXAMPLE 1 | | | | | 60 | | 320.5 |
| EXAMPLE 6-5 | | | | | 70 | | 320.0 |
| EXAMPLE 6-6 | | | | | 80 | | 316.7 |
| EXAMPLE 6-7 | | | | | 90 | | 146.3 |

(B)

(A)

| BATTERY | Mg CONCENTRATION (mol/l) | MeTFS CONCENTRATION (mol/l) | TBABF$_4$ CONCENTRATION (mol/l) | AlCl$_3$ CONCENTRATION (mol/l) | HEATING TEMPERATURE (°C) | BF$_3$DEE CONCENTRATION (mol/l) | DISCHARGE CAPACITY (mAh/g) |
|---|---|---|---|---|---|---|---|
| EXAMPLE 7-1 | 0.50 | 0.50 | 0.75 | 0.25 | 60 | 0.00 | 310.8 |
| EXAMPLE 7-2 | | | | | | 0.50 | 315.4 |
| EXAMPLE 1 | | | | | | 1.00 | 320.5 |
| EXAMPLE 7-3 | | | | | | 1.50 | 324.6 |
| EXAMPLE 7-4 | | | | | | 2.00 | 330.0 |
| EXAMPLE 7-5 | | | | | | 2.10 | 294.7 |
| EXAMPLE 7-6 | | | | | | 2.25 | 212.1 |
| EXAMPLE 7-7 | | | | | | 2.50 | 67.0 |

(B)

| BATTERY | RTFS | DISCHARGE CAPACITY (mAh/g) |
|---|---|---|
| EXAMPLE 1 | CH$_3$CF$_3$SO$_3$ | 320.5 |
| EXAMPLE 8 | C$_2$H$_5$CF$_3$SO$_3$ | 316.8 |

FIG.10

| BATTERY | QUATERNARY AMMONIUM SALT | DISCHARGE CAPACITY (mAh/g) |
|---|---|---|
| EXAMPLE 1 | $BF_4N(C_4H_9)_4$ | 320.5 |
| EXAMPLE 9-1 | $CF_3SO_3N(C_4H_9)_4$ | 320.1 |
| EXAMPLE 9-2 | $CF_3SO_3N(C_4H_9)_3CH_3$ | 313.2 |
| EXAMPLE 9-3 | $CF_3SO_3N(C_2H_5)_3CH_3$ | 321.0 |
| EXAMPLE 9-4 | $BF_4N(C_4H_9)_3CH_3$ | 314.8 |
| EXAMPLE 9-5 | $BF_4N(C_2H_5)_3CH_3$ | 324.6 |
| EXAMPLE 9-6 | $(SO_2CF_3)_2N-N(C_4H_9)_4$ | 322.6 |
| EXAMPLE 9-7 | $(SO_2CF_3)_2N-N(C_4H_9)_4CH_3$ | 318.7 |
| EXAMPLE 9-8 | $(SO_2CF3)_2N-N(C_2H_5)_3CH_3$ | 325.4 |

FIG.11

| BATTERY | TRIFLUOROBORANE-ETHER COMPLEX SALT | DISCHARGE CAPACITY (mAh/g) |
|---|---|---|
| EXAMPLE 1 | $BF_3((C_2H_5)_2O)$ | 320.5 |
| EXAMPLE 10-1 | $BF_3((CH_3)_2O)$ | 321.8 |
| EXAMPLE 10-2 | $BF_3(C_2H_5OCH_3)$ | 325.4 |
| EXAMPLE 10-3 | $BF_3((C_4H_9)_2O)$ | 320.2 |
| EXAMPLE 10-4 | $BF_3(C_4H_8O)$ | 326.8 |

FIG.12
(A) [MgMe TFS] DME
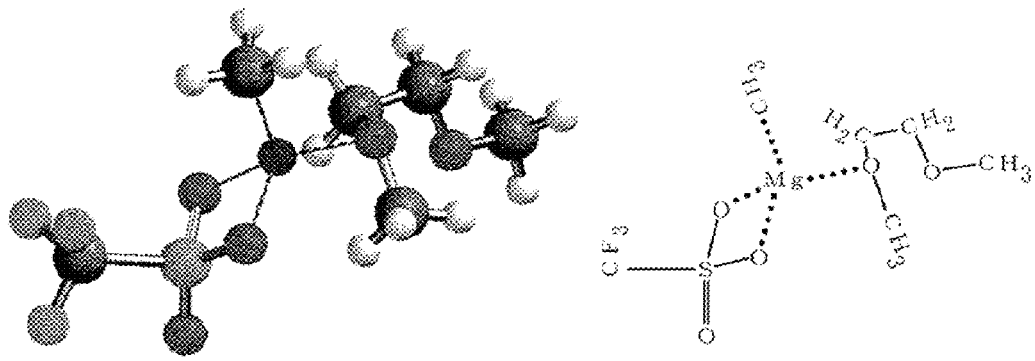
(B) [TBA]⁺: [N(CH₂CH₂CH₂CH₃)₄]⁺
TETRABUTYLAMMONIUM ION
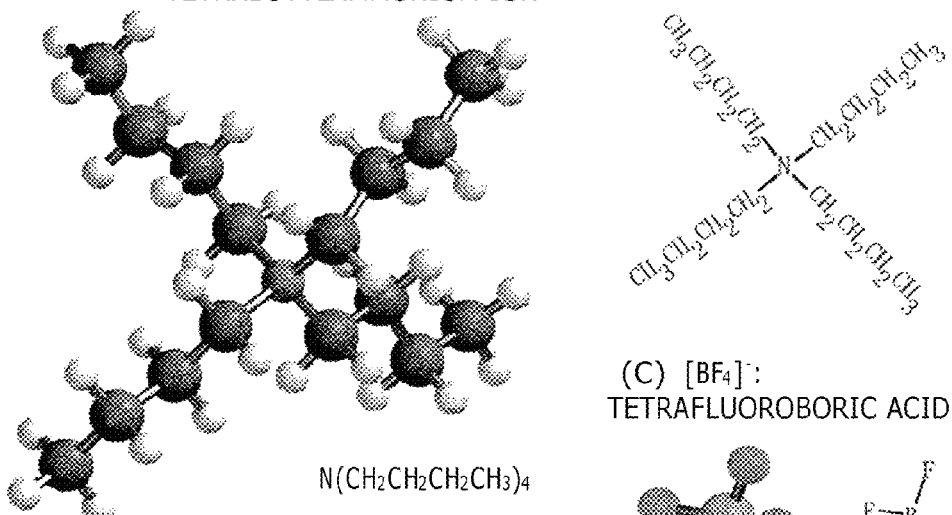
N(CH₂CH₂CH₂CH₃)₄
(C) [BF₄]⁻: TETRAFLUOROBORIC ACID ION
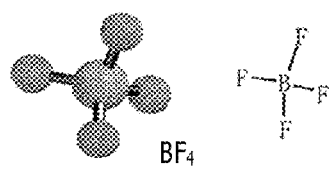
BF₄
(D) DME: CH₃OCH₂CH₂OCH₃
1,2-DIMETHOXYETHANE
(E) Me TFS: CF₃SO₃CH₃
METHYL TRIFLUOROMETHANESULFONATE
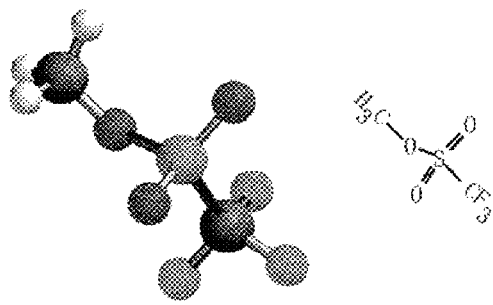
(F) [TFS]⁻: [CF₃SO₃]⁻
TRIFLUOROMETHANESULFONATE ION
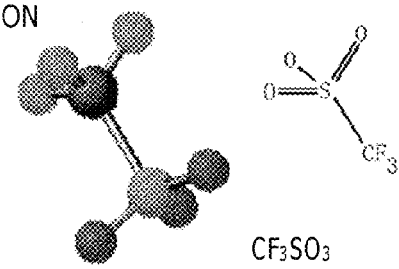
CF₃SO₃

FIG.13

| BATTERY | Mg CONCENTRATION (*) | MeTFS CONCENTRATION (*) | EMITFSI CONCENTRATION (*) | AlCl$_3$ CONCENTRATION (*) | HEATING TEMPERATURE (°C) | BF$_3$DEE CONCENTRATION (*) | DISCHARGE CAPACITY (mAh/g) |
|---|---|---|---|---|---|---|---|
| EXAMPLE 11 | 0.50 | 0.50 | 0.75 | 0.25 | 60 | 1.00 | 321.5 |
| COMPARATIVE EXAMPLE 8 | 0.50 | 0.50 | 0.75 | | | | 310.0 |
| COMPARATIVE EXAMPLE 9 | 0.50 | 0.50 | | 0.25 | | | 12.3 |
| COMPARATIVE EXAMPLE 10 | 0.50 | 0.50 | | | | 1.00 | 0.0 |
| COMPARATIVE EXAMPLE 11 | 0.50 | 0.50 | 0.75 | 0.25 | | | 314.0 |
| COMPARATIVE EXAMPLE 12 | 0.50 | 0.50 | 0.75 | | | 1.00 | 320.4 |
| COMPARATIVE EXAMPLE 13 | 0.50 | 0.50 | | 0.25 | | 1.00 | 20.4 |
| COMPARATIVE EXAMPLE 14-1 | 0.25 mol/l THF SOLUTION OF Mg[AlCl$_2$(C$_2$H$_5$)(C$_4$H$_9$)]$_2$ | | | | | | 0.0 |
| COMPARATIVE EXAMPLE 14-2 | 0.25 mol/l THF SOLUTION OF Mg[AlCl$_2$(C$_2$H$_5$)(C$_4$H$_9$)]$_2$ | | | | | | 314.0 |

* : mol/l (A)

| BATTERY | Mg CONCENTRATION (mol/l) | MeTFS CONCENTRATION (mol/l) | EMITFSI CONCENTRATION (mol/l) | AlCl$_3$ CONCENTRATION (mol/l) | HEATING TEMPERATURE (°C) | BF$_3$DEE CONCENTRATION (mol/l) | DISCHARGE CAPACITY (mAh/g) |
|---|---|---|---|---|---|---|---|
| COMPARATIVE EXAMPLE 9-1 | | 0.00 | | | | | 0.0 |
| EXAMPLE 12-1 | | 0.10 | | | | | 51.6 |
| EXAMPLE 12-2 | | 0.35 | | | | | 267.4 |
| EXAMPLE 12-3 | | 0.40 | | | | | 317.5 |
| EXAMPLE 11 | 0.50 | 0.50 | 0.75 | 0.25 | 60 | 1.00 | 321.5 |
| EXAMPLE 12-4 | | 0.60 | | | | | 324.2 |
| EXAMPLE 12-5 | | 0.65 | | | | | 290.2 |
| EXAMPLE 12-6 | | 0.70 | | | | | 247.1 |
| EXAMPLE 12-7 | | 0.80 | | | | | 153.6 |

(B)

(A)

| BATTERY | Mg CONCENTRATION (mol/l) | MeTFS CONCENTRATION (mol/l) | EMITFSI CONCENTRATION (mol/l) | AlCl₃ CONCENTRATION (mol/l) | HEATING TEMPERATURE (°C) | BF₃DEE CONCENTRATION (mol/l) | DISCHARGE CAPACITY (mAh/g) |
|---|---|---|---|---|---|---|---|
| COMPARATIVE EXAMPLE 10-1 | 0.50 | 0.50 | 0.00 | 0.25 | 60 | 1.00 | 65.0 |
| EXAMPLE 13-1 | | | 0.20 | | | | 122.3 |
| EXAMPLE 13-2 | | | 0.40 | | | | 191.5 |
| EXAMPLE 13-3 | | | 0.50 | | | | 320.3 |
| EXAMPLE 11 | | | 0.75 | | | | 321.5 |
| EXAMPLE 13-4 | | | 1.00 | | | | 322.9 |
| EXAMPLE 13-5 | | | 1.10 | | | | 256.9 |
| EXAMPLE 13-6 | | | 1.20 | | | | 211.6 |

(B)

(A)

| BATTERY | Mg CONCENTRATION (mol/l) | MeTFS CONCENTRATION (mol/l) | EMITFSI CONCENTRATION (mol/l) | AlCl₃ CONCENTRATION (mol/l) | HEATING TEMPERATURE (°C) | BF₃DEE CONCENTRATION (mol/l) | DISCHARGE CAPACITY (mAh/g) |
|---|---|---|---|---|---|---|---|
| COMPARATIVE EXAMPLE 14-1 | 0.50 | 0.50 | 0.75 | 0.00 | 60 | 1.00 | 312.5 |
| EXAMPLE 14-2 | | | | 0.10 | | | 319.3 |
| EXAMPLE 11 | | | | 0.25 | | | 321.5 |
| EXAMPLE 14-3 | | | | 0.50 | | | 319.2 |
| EXAMPLE 14-4 | | | | 0.55 | | | 266.6 |
| EXAMPLE 14-5 | | | | 0.60 | | | 223.2 |
| EXAMPLE 14-6 | | | | 0.80 | | | 94.2 |
| EXAMPLE 14-7 | | | | 1.00 | | | 59.0 |

(B)

(A)

| BATTERY | Mg CONCENTRATION (mol/l) | MeTFS CONCENTRATION (mol/l) | EMITFSI CONCENTRATION (mol/l) | AlCl$_3$ CONCENTRATION (mol/l) | HEATING TEMPERATURE (°C) | BF$_3$DEE CONCENTRATION (mol/l) | DISCHARGE CAPACITY (mAh/g) |
|---|---|---|---|---|---|---|---|
| EXAMPLE 15-1 | 0.10 | 0.10 | 0.20 | 0.10 | | 0.20 | 115.5 |
| EXAMPLE 15-2 | 0.20 | 0.20 | 0.40 | 0.20 | | 0.40 | 262.1 |
| EXAMPLE 15-3 | 0.25 | 0.25 | 0.50 | 0.25 | | 0.50 | 321.1 |
| EXAMPLE 15-4 | 0.50 | 0.50 | 1.00 | 0.50 | | 1.00 | 321.4 |
| EXAMPLE 15-5 | 0.90 | 0.90 | 1.80 | 0.90 | 60 | 1.80 | 324.8 |
| EXAMPLE 15-6 | 1.00 | 1.00 | 2.00 | 1.00 | | 2.00 | 324.1 |
| EXAMPLE 15-7 | 1.05 | 1.05 | 2.10 | 1.05 | | 2.10 | 295.5 |
| EXAMPLE 15-8 | 1.20 | 1.20 | 2.40 | 1.20 | | 2.40 | 220.2 |
| EXAMPLE 15-9 | 1.50 | 1.50 | 3.00 | 1.50 | | 3.00 | 83.2 |

(B)

(A)

| BATTERY | Mg CONCENTRATION (mol/l) | MeTFS CONCENTRATION (mol/l) | EMITFSI CONCENTRATION (mol/l) | AlCl$_3$ CONCENTRATION (mol/l) | HEATING TEMPERATURE (°C) | BF$_3$DEE CONCENTRATION (mol/l) | DISCHARGE CAPACITY (mAh/g) |
|---|---|---|---|---|---|---|---|
| EXAMPLE 16-1 | 0.50 | 0.50 | 0.75 | 0.25 | 20 | 1.00 | 0.0 |
| EXAMPLE 16-2 | | | | | 30 | | 127.1 |
| EXAMPLE 16-3 | | | | | 40 | | 229.8 |
| EXAMPLE 16-4 | | | | | 50 | | 310.4 |
| EXAMPLE 11 | | | | | 60 | | 321.5 |
| EXAMPLE 16-5 | | | | | 70 | | 320.2 |
| EXAMPLE 16-6 | | | | | 80 | | 320.9 |
| EXAMPLE 16-7 | | | | | 90 | | 146.5 |

(B)

(A)

| BATTERY | Mg CONCENTRATION (mol/l) | MeTFS CONCENTRATION (mol/l) | EMITFSI CONCENTRATION (mol/l) | AlCl$_3$ CONCENTRATION (mol/l) | HEATING TEMPERATURE (°C) | BF$_3$DEE CONCENTRATION (mol/l) | DISCHARGE CAPACITY (mAh/g) |
|---|---|---|---|---|---|---|---|
| EXAMPLE 17-1 | 0.50 | 0.50 | 0.75 | 0.25 | 60 | 0.00 | 315.0 |
| EXAMPLE 17-2 | | | | | | 0.50 | 318.5 |
| EXAMPLE 11 | | | | | | 1.00 | 321.5 |
| EXAMPLE 17-3 | | | | | | 1.50 | 326.8 |
| EXAMPLE 17-4 | | | | | | 2.00 | 333.0 |
| EXAMPLE 17-5 | | | | | | 2.10 | 286.0 |
| EXAMPLE 17-6 | | | | | | 2.25 | 215.4 |
| EXAMPLE 17-7 | | | | | | 2.50 | 67.3 |

(B)

| BATTERY | RTFS | DISCHARGE CAPACITY (mAh/g) |
|---|---|---|
| EXAMPLE 11 | CH$_3$CF$_3$SO$_3$ | 321.5 |
| EXAMPLE 18 | C$_2$H$_5$CF$_3$SO$_3$ | 318.4 |

FIG. 21

| BATTERY | 1,3-ALKYLMETHYLIMIDAZOLIUM SALT | DISCHARGE CAPACITY (mAh/g) |
|---|---|---|
| EXAMPLE 11 | $[C_2H_5(C_3H_3N_2)CH_3](SO_2CF_3)_2N$ | 321.5 |
| EXAMPLE 19-1 | $[(C_3H_3N_2)(CH_3)_2]BF_4$ | 320.4 |
| EXAMPLE 19-2 | $[C_2H_5(C_3H_3N_2)CH_3]BF_4$ | 314.5 |
| EXAMPLE 19-3 | $[C_4H_9(C_3H_3N_2)CH_3]BF_4$ | 321.7 |
| EXAMPLE 19-4 | $[(C_3H_3N_2)(CH_3)_2](SO_2CF_3)_2N$ | 315.1 |
| EXAMPLE 19-5 | $[C_4H_9(C_3H_3N_2)CH_3](SO_2CF_3)_2N$ | 320.6 |

FIG. 22

| BATTERY | TRIFLUOROBORANE-ETHER COMPLEX SALT | DISCHARGE CAPACITY (mAh/g) |
|---|---|---|
| EXAMPLE 11 | $BF_3((C_2H_5)_2O)$ | 321.5 |
| EXAMPLE 20-1 | $BF_3((CH_3)_2O)$ | 321.8 |
| EXAMPLE 20-2 | $BF_3(C_2H_5OCH_3)$ | 326.3 |
| EXAMPLE 20-3 | $BF_3((C_4H_9)_2O)$ | 322.9 |
| EXAMPLE 20-4 | $BF_3(C_4H_8O)$ | 325.2 |

FIG.23
(A) [MgMe TFSI (DME)]
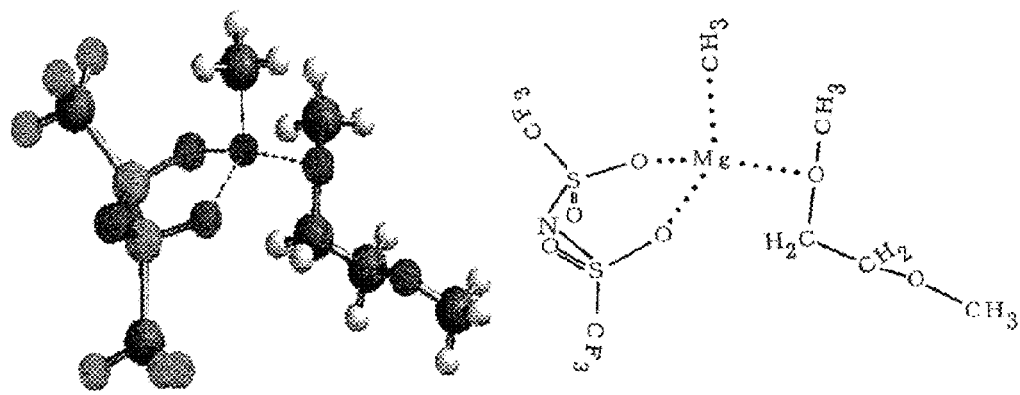
(B) [TFSI]⁻: [(CF₃SO₂)₂N]⁻
BIS (TRIFLUOROMETHANESULFONYL) IMIDE ION
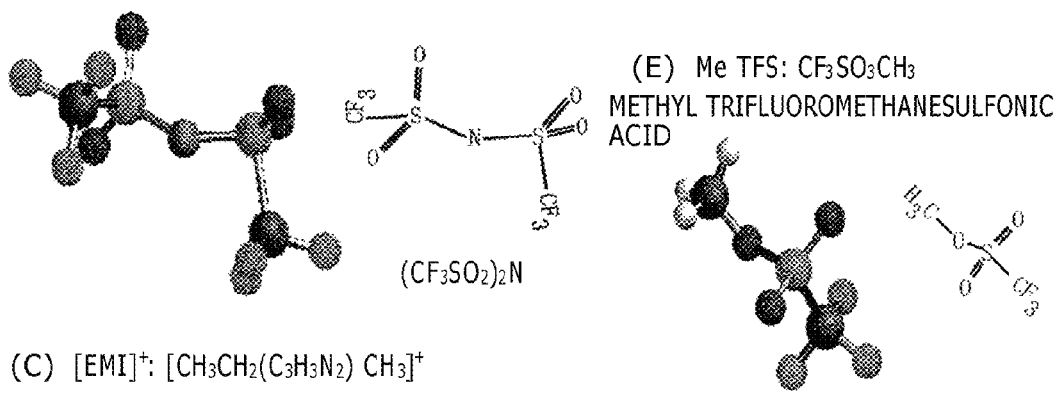
(CF₃SO₂)₂N
(E) Me TFS: CF₃SO₃CH₃
METHYL TRIFLUOROMETHANESULFONIC ACID
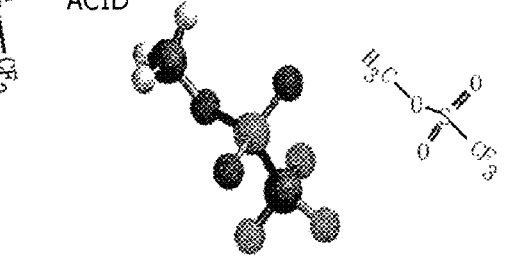
(C) [EMI]⁺: [CH₃CH₂(C₃H₃N₂) CH₃]⁺
1-ETHYL-3-METHYLIMIDAZOLIUM ION
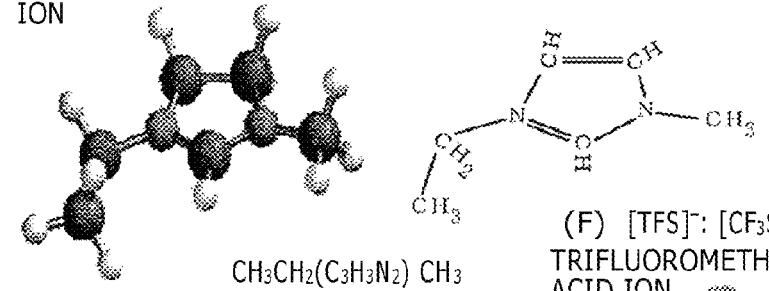
CH₃CH₂(C₃H₃N₂) CH₃
(F) [TFS]⁻: [CF₃SO₃]⁻
TRIFLUOROMETHANESULFONIC ACID ION
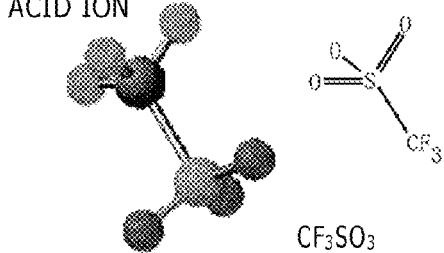
CF₃SO₃
(D) DME: CH₃OCH₂CH₂OCH₃
1,2-DIMETHOXY ETHANE
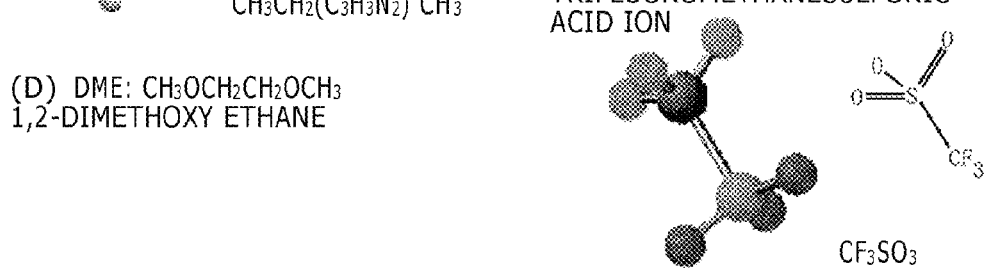

(A)

| | MASS COMPOSITION /% | | | | MASS RATIO×100 | | CF DISCHARGE CAPACITY/ mAhg⁻¹ |
|---|---|---|---|---|---|---|---|
| | CF | Cu | C | PFV | Cu/CF | C/CF | |
| COMPARATIVE EXAMPLE 15 | 85.45 | 0.00 | 8.55 | | 0.0 | | 118.0 |
| EXAMPLE 21-1 | 84.68 | 0.85 | 8.47 | | 1.0 | | 118.5 |
| EXAMPLE 21-2 | 83.93 | 1.68 | 8.39 | | 2.0 | | 120.1 |
| EXAMPLE 21-3 | 83.55 | 2.09 | 8.36 | | 2.5 | | 121.5 |
| EXAMPLE 21-4 | 83.19 | 2.50 | 8.31 | | 3.0 | | 154.8 |
| EXAMPLE 21-5 | 81.74 | 4.09 | 8.17 | | 5.0 | | 347.8 |
| EXAMPLE 21-6 | 80.34 | 5.62 | 8.04 | | 7.0 | | 502.9 |
| EXAMPLE 21-7 | 78.99 | 7.11 | 7.90 | 6 | 9.0 | 10.0 | 641.9 |
| EXAMPLE 21-8 | 77.69 | 8.55 | 7.76 | | 11.0 | | 736.5 |
| EXAMPLE 21-9 | 76.42 | 9.93 | 7.65 | | 13.0 | | 802.3 |
| EXAMPLE 21-10 | 75.50 | 10.95 | 7.55 | | 14.5 | | 841.2 |
| EXAMPLE 21-11 | 75.20 | 11.28 | 7.52 | | 15.0 | | 850.0 |
| EXAMPLE 21-12 | 74.90 | 11.61 | 7.49 | | 15.5 | | 850.1 |
| EXAMPLE 21-13 | 72.31 | 14.46 | 7.23 | | 20.0 | | 850.0 |

CF : GRAPHITE FLUORIDE  PFV : POLYVINYLIDEN FLUORIDE
Cu : COPPER   Cu/CF : COPPER/GRAPHITE FLUORIDE
C : GRAPHITE   C/CF : GRAPHITE/GRAPHITE FLUORIDE (B)

| | GRAPHITE FLUORIDDE DISCHARGE CAPACITY/mAhg$^{-1}$ |
|---|---|
| COMPARATIVE EXAMPLE 15 | 118.0 |
| EXAMPLE 22 | 823.8 |

FIG.27

| | GRAPHITE FLUORIDDE DISCHARGE CAPACITY/mAhg$^{-1}$ |
|---|---|
| COMPARATIVE EXAMPLE 15 | 118.0 |
| EXAMPLE 23 | 802.4 |

NONAQUEOUS ELECTROLYTIC SOLUTION CONTAINING MAGNESIUM IONS, AND ELECTROCHEMICAL DEVICE USING THE SAME

CROSS REFERENCE TO RELATED APPLICATIONS

The present application is a national stage of International Application No. PCT/JP2009/060234 filed on Jun. 4, 2009 and claims priority to Japanese Patent Applications P2008-148401 filed on Jun. 5, 2008, P2008-148403 filed on Jun. 5, 2008 and P2008-148402 filed on Jun. 5, 2009 the disclosures of which are incorporated herein by reference.

BACKGROUND

The present invention relates to a nonaqueous electrolytic solution containing therein magnesium ions, and an electrochemical device using the same.

A metal which is easy to emit an electron to become a cation, that is, a metal having a large ionization tendency is given as a material suitable for a negative-electrode active material as one of basic constituent materials of a battery. In a battery using a nonaqueous electrolytic solution, metal lithium is given as this example. The battery using metal lithium as a negative-electrode active material is structured in the form of a battery using a nonaqueous electrolytic solution based on a combination of various kinds of positive-electrode active materials such as an oxide and a sulfide, thereby being commercialized. Thus, that battery is mainly used as a power source of a small portable electronic apparatus.

In recent years, for the purpose of enhancing the convenience, miniaturization, weight lighting, thinning, and an increased high function of the small portable electronic apparatuses have been steadily advanced year by year. Along therewith, a small size, a light weight, a small width, and especially a large capacity are required for the battery used as the power source of each of these apparatuses. Therefore, it can be said that the larger a capacity (mAh/g) per unit mass or a capacity (mAh/cm$^3$) per unit volume of each of the negative-electrode active material and the positive-electrode active material composing the battery is, the better.

Comparing the energy capacity per unit mass of the metal lithium with that of other metals, the energy capacity of metal lithium (Li) is larger than that of any of other metals, and thus is superior to that of any of other metals. For this reason, heretofore, many studies about the lithium secondary battery have been reported. However, the lithium secondary battery involves a problem in stability, and lithium is limited in terms of resources and is expensive.

An example of a study about a nonaqueous electrolytic solution system battery using magnesium (Mg), as a metal having a higher energy density than that of lithium (Li), as the negative-electrode active material has been reported as a next-generation high capacity battery (for example, refer to a Non-Patent Document 1 which will be described later).

Magnesium is abundant in terms of the resources, and is much more inexpensive than lithium. In addition, metal magnesium has a large energy capacity per unit volume, and has a higher energy density than that of metal lithium. Moreover, when metal magnesium is used in the battery, the high margin of safety can be expected. As described above, the magnesium secondary battery is the secondary battery which can cover the shortcomings of the lithium secondary battery. On the basis of these respects, at the present time, the development of the nonaqueous electrolytic solution battery using metal magnesium as the negative-electrode active material gains recognition as the next-generation high capacity battery. As with this example, metal magnesium and the magnesium ions are very promising materials as the electrode active material in the electrochemical device, and the electric charge carriers in the electrolytic solution, respectively.

The selection of the electrolytic solution is very important in designing the electrochemical device using metal magnesium and the magnesium ions. For example, not only water and a protic organic solvent, but also an ester class and a nonprotic organic solvent such as acrylonitrile cannot be used as the solvent composing the electrolytic solution. The reason for this is because when these solvents are used, a passive state film through which none of the magnesium ions are not passed is formed on a surface of metal magnesium. A problem about the formation of the passive state film becomes one of hindrances in putting the magnesium secondary battery into practical use.

An ether solution of a Grignard reagent (RMgX: R is either an arkyl group or an aryl group, and X is any one of chlorine, bromine, and iodine) has been known as an electrolytic solution which does not involve the problem about the formation of the passive state film and which can electrochemically utilize magnesium since long ago. When this electrolytic solution is used, metal magnesium can be reversibly precipitated and dissolved. However, an oxidation and decomposition potential of the electrolytic solution is as low as about 1.5 V relative to an equilibrium potential of metal magnesium. Thus, a potential window is insufficient for use of that electrolytic solution in the electrochemical device (refer to a in FIG. 1 of the Non-Patent Document 1 which will be described later).

With regard to the nonaqueous electrolytic solution not using the Grignard reagent, there are the Non-Patent Document 1, a Patent Document 1, a Patent Document 2 and the like which will be described later.

Firstly, the following description is given in the Patent Document 1, which will be described later, entitling "Nonaqueous Electrolytic Solution of High Energy, Rechargeable Electrochemical Cell."

A nonaqueous electrolytic solution for use in an electrochemical cell is composed of (a) at least one organic solvent, and (b) at least one electrolytic solution active salt represented by a formula $M'^{+m}(ZR_nX_{q-n})_m$. In this formula, M' is selected from the group consisting of magnesium, calcium, aluminum, lithium and sodium. Z is selected from the group consisting of aluminum, boron, phosphorus, antimony, and arsenic. R represents a group selected from the following group, that is, the group consisting of alkyl, alkenyl, aryl, phenyl, benzyl, and amide. X is halogen (I, Br, Cl, F). m=1 to 3. When Z=phosphorus, antimony and arsenic, n=0 to 5, and q=6. When Z=aluminum and boron, n=0 to 3, and q=4.

In addition, the following description is given as Example 3 of the invention in the Patent Document 1.

An electrochemical cell was composed of a Chevrel phase cathode, a magnesium metal anode, and an electrolytic solution containing therein a Mg(AlCl$_2$BuEt)$_2$ salt in THF and was prepared. 25.7 mg of the cathode was made of a mixture of the Chevrel phase material in which copper was leached out, and which contained therein 10 wt % carbon black and 10 wt % PVDF as a binder spread out in a stainless steel mesh. A solution thereof was prepared from 0.25 mol of a Mg(AlCl$_2$BuEt)$_2$ salt in THF. The anode was a disc of a pure magnesium metal having a diameter of 16 mm, and a thickness of 0.2 mm. The cell was packed in a stainless steel "coin cell" shape provided with a paper separator made of a glass fiber. The cell was subjected to the circulation of the standard charge-discharge having a current density of 23.3 mA/g. A potential limit for the circulation was lied between 0.5 V in a perfectly discharged state, and 1.8 V in a perfectly discharged state.

The battery was continuously subjected to the circulation for three months or more. A circulation possibility having the excellent circulation is clearly obvious from FIG. 3 of the Patent Document 1, and cycles 340 to 345 are shown adjacent to first five cycles (cycles 1 to 5). The result of the circulation is kept strong throughout the experiments. A charge density obtained in each discharge is 61 mAh per gram of the cathode material.

In addition, a description about a potential difference dynamic behavior of a $Mg_xMo_3S_4$ electrode in a tetrahydrofuran (THF) solution of a $Mg(AlCl_2BuEt)_2$ is given in the Non-Patent Document 1. Moreover, a typical charge-discharge behavior of a $Mg—Mg_xMo_3S_4$ coin cell type battery (an electrolyte is 0.25 M of $Mg(AlCl_2BuEt)_2$ in THF) is shown based on a relationship between the number of cycles, and a specific discharge capacity ($mAhg^{-1}$).

Next, the following description is given in the Patent Document 2, which will be described later, entitling "Magnesium Secondary Battery."

The invention of the Patent Document 2 relates to a secondary battery in which a negative-electrode active material is a magnesium metal, and a positive-electrode active material is a transition metal compound which can carry out intercalation of a magnesium ion, and an electrolytic solution is composed of an electrolyte containing therein a compound including an atomic group in which an aromatic atomic group and one halogen atom are linked to a magnesium atom, and a solvent composed of an ether system compound liquid. It is said that a charge voltage can be set as being equal to or higher than 2.3 V with this secondary battery.

The electrolyte described above is preferably halogenophenyl magnesium ($C_6H_5MgX(X=Cl, Br)$). In addition, it is said that the electrolyte described above is preferably a polymer gel electrolyte containing therein $C_6H_5MgX$ (X=Cl, Br), and a polyethylene oxide (PEO).

In Example in which a THF solution of $C_6H_5MgBr$ is used as an electrolytic solution, a decomposition start voltage is about 3.8 V, whereas in Comparative Example in which a THF solution of $Mg[Al(C_2H_5)_2Br_2]_2$ is used as an electrolytic solution, a decomposition start voltage is about 2.3 V, and the electrolytic solution is oxidized even at 2.2 V to be colored with brown. Therefore, it was made clear that with the secondary battery shown in Example, the charge at the high voltage is possible. In addition, it was shown that the electrolytic solution used in the secondary battery has a high decomposition voltage.

In a word, according to the invention of the Patent Document 2, the secondary battery is prepared in which the negative-electrode active material is the magnesium metal, and the positive-electrode active material is the transition metal compound which can carry out the intercalation of the magnesium ion, and the electrolytic solution is made the electrolytic solution containing therein the electrolyte containing therein the compound including the atomic group in which the aromatic atomic group and one halogen atom are linked to the magnesium atom, and the solvent composed of the ether system compound liquid, whereby it is possible to obtain the secondary battery which has the high margin of safety, is inexpensive, and has the high electric capacity density, and with which the high charge voltage is possible.

In addition, a study about a graphite fluoride as a positive-electrode active material for which a higher capacity than that of a molybdenum sulfide can be expected is reported (for example, refer to a Non-Patent Document 2 which will be described later).

PRIOR ART DOCUMENT

Patent Document

Patent Document 1:
Japanese Unexamined Patent Application Publication No. 2003-512704 (paragraph 0017, paragraphs 0048 to 0049, FIG. 3)
Patent Document 2:
Japanese Patent Laid-Open No. 2004-259650 (paragraphs 0015 to 0019, paragraph 0020, paragraphs 0034 to 0035)

Non-Patent Document

Non-Patent Document 1:
D. Aurbach et al, "Prototype systems for rechargeable magnesium batteries," Nature 407, p. 724 to 727 (2000) (FIG. 3, FIG. 4, left-column lines 41 to 56 in page 726)
Non-Patent Document 2:
Jerome Giraudet et al, "Magnesium batteries: Towards a first use of graphite fluorides," Journal of Power Sources 173 (2007) 592 to 598 (3.2.3 Effect of the electrolyte composition and of the re-fluorimation treatment)

SUMMARY

Technical Problem

The electrolytic solution composed of the ether solution of the Grignard reagent involves such a problem that its oxidation decomposition potential is as low as about +1.5 V relative to the equilibrium potential of metal magnesium, and thus the potential window is insufficient for use of that electrolytic solution in the electrochemical device.

A raw material which is unstable for synthesis of the electrolytic solution, and various kinds of solvents are used in the electrolytic solution reported in the Patent Document 1 and the manufacturing process thereof is very complicated. For example, since dichlorobutylethylmagnesium aluminate (Mg $[AlCl_2(C_2H_5)(C_4H_9)]_2$) used as an electrolyte salt is unstable in the atmosphere, the process for manufacturing the battery must be carried out in an inactive ambient atmosphere such as an argon box. For this reason, this battery cannot be manufactured in a dry room as a general manufacturing environment of the battery using the organic nonaqueous electrolytic solution. Therefore, it is thought that it is actually impossible to commercialize the magnesium battery reported in the Patent Document 1 without change.

In addition, it is described in the Patent Document 2 that the decomposition start potential is +3.8 V. However, the inventor of this application carried out the additional experiments in detail, and as a result, it became clear that the THF solution having a concentration of 0.1 mol/l of phenylmagnesiumbromide ($C_6H_5MgBr$) actually starts to be decomposed around +2.0 V, and thus it was made clear that the decomposition start voltage is not so high as to be described in the Patent Document 2.

A battery system in which a molybdenum sulfide is used as a positive-electrode active material, a magnesium metal is used as a negative electrode, and a tetrahydrofuran solution of organic haloaluminate magnesium is used as an electrolytic solution is proposed in the Non-Patent Document 1. However, in this battery system, the capacity of the molybdenum sulfide as the positive-electrode active material is small, and thus for the battery system, it is very difficult to realize the increased high capacity for the existing battery.

In a graphite fluoride described in the Non-Patent Document 2, a theoretical capacity due to one electron reduction reaction is 860 mAh/g (2000 mAh/cc or more) which largely exceeds that of the molybdenum sulfide described in the Non-Patent Document 1. Thus, the graphite fluoride holds a potentiality that the very large capacity can be realized in terms of the magnesium battery. It is noted that although in the Non-Patent Document 2, 572 mAh/g is obtained as the discharge capacity of the graphite fluoride, this value is merely 66.5% of the theoretical capacity and thus in the future, it is desired to further increase the capacity.

The present invention has been made in order to solve the problems as described above, and it is therefore an object of the present invention to provide a nonaqueous electrolytic solution containing therein magnesium ions which is capable of sufficiently bringing out excellent characteristics of metal magnesium as a negative-electrode active material, and is also capable of being manufactured in a general environment such as a dry room, and an electrochemical device using the same.

Technical Solution

That is to say, the present invention relates to a nonaqueous electrolytic solution containing therein magnesium ions in which metal magnesium, alkyl trifluoromethanesulfonate ($RCF_3O_3$) (for example, methyl trifluoromethanesulfonate in an embodiment which will be described later), and a quaternary ammonium salt ($R^1R^2R^3R^4N^+Z^-$) (for example, tetrafluoro tetrabutyl ammonium borate in the embodiment which will be described later) or/and a 1,3-alkyl methylimidazolium salt($[R(C_3H_3N_2)CH_3]^+X^-$) (for example, 1-ethyl-3-methylimidazoliumbis(trifluoromethanesulfonyl)imide in the embodiment which will be described later) are added to an ether system organic solvent, and magnesium ions are dissolved in the ether system organic solvent (for example, 1,2-dimethoxyethane in the embodiment which will be described later).

In this regard, R in the general formula $RCF_3SO_3$ representing alkyl trifluoromethanesulfonate, R is either a methyl group or an ethyl group. In addition, each of $R^1$, $R^2$, $R^3$, and $R^4$ in the general formula $R^1R^2R^3R^4N^+Z^-$ representing the quaternary ammonium salt described above is either an alkyl group or an aryl group, and $Z^-$ is any one of a chloride ion ($Cl^-$), a boromide ion ($Br^-$), an iodine ion ($I^-$), an acetic acid ion ($CH_3COO^-$), a perchloric acid ion ($ClO_4^-$), a tetrafluoroboric acid ($BF_4^-$), a hexafluorophosphoric acid ion ($PF_6^-$), a hexafluoroarsenic acid ion ($AsF_6^-$), a perfluoroalkylsulfonic acid ion ($Rf1SO_3^-$: $Rf1$ is a perfluoroalkyl group), and a perfluoroalkylsulfonyl imide ion ($(Rf2SO_2)_2N^-$): $Rf2$ is a perfluoroalkyl group).

In addition, in the general formulas $[R(C_3H_3N_2)CH_3]^+X^-$ representing the 1,3-alkyl methylimidazolium salt, R is a methyl group, an ethyl group or a butyl group, and $X^-$ is any one of a tetrafluoroboric acid ion ($BF_4^-$) or a bis(trifluoromethanesulfonyl)imide ion ($(SO_2CF_3)_2N^-$).

In addition, the present invention relates to an electrochemical device having the nonaqueous electrolytic solution containing magnesium ions described above (for example, an electrolytic solution 7 in an embodiment which will be described later), a first electrode (for example, a positive electrode 11 in the embodiment which will be described later, and a second electrode (for example, a negative electrode 12 in the embodiment which will be described later), in which the electrochemical device is structured in such a way that an active material of the second electrode is oxidized to generate magnesium ions.

In addition, the present invention relates to an electrochemical device having a negative-electrode active material containing therein either a magnesium metal or a magnesium alloy, and a positive-electrode mixture containing therein a positive-electrode active material made from a graphite fluoride, and copper (for example, composed of a positive-electrode active material, a conductive material, a binder, and copper powder in the embodiment which will be described later), and structured as a magnesium battery.

In addition, the present invention relates to an electrochemical device having a negative-electrode active material containing therein either a magnesium metal or a magnesium alloy, a positive-electrode mixture containing therein a positive-electrode active material made from a graphite fluoride, (for example, composed of a positive-electrode active material, a conductive material, and a binder in the embodiment which will be described later), a positive-electrode power collecting body made of a conductive material covered with copper, or/and copper and/or a positive-electrode can having an inner surface covered with copper contacting the positive-electrode active material, and structured as a magnesium battery.

Advantageous Effects

According to the present invention, metal magnesium, alkyl trifluoromethanesulfonate ($RCF_3SO_3$), and the quaternary ammonium salt ($R^1R^2R^3R^4N^+Z^-$) or/and the 1,3-alkyl methylimidazolium salt ($[R(C_3H_3N_2)CH_3]^+X^-$) are added to the ether system organic solvent, and the magnesium ions are dissolved in the ether system organic solvent. Therefore, it is possible to provide the nonaqueous electrolytic solution containing therein magnesium ions which is capable of sufficiently bringing out the excellent characteristics of metal magnesium as the negative-electrode active material, and is also capable of being manufactured in the general environment such as the dry room.

In addition, according to the present invention, the electrochemical device has the nonaqueous electrolytic solution containing magnesium ions described above, the first electrode, and the second electrode, and is structured in such a way that the active material of the second electrode is oxidized to generate the magnesium ions. Therefore, it is possible to provide the electrochemical device which is capable of sufficiently bringing out the excellent characteristics of metal magnesium.

In addition, according to the present invention, the electrochemical device has the negative-electrode active material containing therein either the magnesium metal or the magnesium alloy, and the positive-electrode mixture containing therein the positive-electrode active material made from the graphite fluoride, and copper, and has the structure that copper is mixed with the positive-electrode active material, or is covered with the positive-electrode active material to be contained in the positive-electrode mixture, thereby contacting the positive-electrode active material, and the positive-electrode mixture contains therein copper (hereinafter referred to as a first structure). Therefore, it is possible to provide the electrochemical device which is capable of greatly increasing the discharge capacity of the graphite fluoride, and which is structured as the magnesium battery having the discharge capacity corresponding up to about 99% relative to the theoretical capacity based on the one electron reduction reaction.

In addition, according to the present invention, the electrochemical device has the negative-electrode active material containing therein either the magnesium metal or the magnesium alloy, the positive-electrode mixture containing therein the positive-electrode active material made from the graphite fluoride, the positive-electrode power collecting body made of the conductive material covered with copper or/and copper, and/or the positive-electrode can having the inner surface covered with copper contacting the positive-electrode active material. Therefore, when the positive-electrode power collecting body is made of the conductive material covered with copper and/or copper (hereinafter referred to as a second structure), copper contacts the positive-electrode active material. Thus, it is possible to provide the electrochemical device structured as the magnesium battery which has the discharge capacity corresponding to 95.8% relative to the theoretical capacity described above without increasing the capacity of the battery. When the inner surface of the positive-electrode can described above is covered with copper and copper contacts the positive-electrode active material described above (hereinafter referred to as a third structure), it is possible to provide the magnesium battery which has the discharge capacity corresponding to 93.3% relative to the theoretical capacity described above without increasing the capacity of the battery. In addition, since the inner volume of the battery is not increased, the discharge capacity per unit volume is prevented from being reduced. Moreover, in the second structure, the positive-electrode power collecting body covered with copper only has to be used. Also, in the third structure, the positive-electrode can having the inner surface coated with copper only has to be used. Therefore, the manufacturing cost is prevented from being increased without largely changing the method of manufacturing the battery.

Additional features and advantages of the present invention are described in, and will be apparent from, the following Detailed Description and the Figures.

BRIEF DESCRIPTION OF FIGURES

FIG. 1 is a cross sectional view showing a structure of a magnesium battery in an embodiment of the present invention.

[FIG. 2]

FIG. 2 is a diagram showing a relationship among concentrations of Mg, MeTFS, $TBABF_4$, $AlCl_3$, and $BF_3DEE$ used in synthesis of an electrolytic solution, a heating temperature, and a discharge capacity of a magnesium battery using the synthesized electrolytic solution in Example of the present invention.

[FIG. 3]

FIG. 3 is a diagram showing a relationship among the concentrations of Mg, MeTFS, $TBABF_4$, $AlCl_3$, and $BF_3DEE$ used in the synthesis of the electrolytic solution, the heating temperature, and the discharge capacity of the magnesium battery using the synthesized electrolytic solution in Examples of the present invention, and showing a relationship between a discharge capacity of a positive-electrode active material, and a MeTFS concentration.

FIG. 4 is a diagram showing a relationship among the concentrations of Mg, MeTFS, $TBABF_4$, $AlCl_3$, and $BF_3DEE$ used in the synthesis of the electrolytic solution, the heating temperature, and the discharge capacity of the magnesium battery using the synthesized electrolytic solution in Examples of the present invention, and showing a relationship between a discharge capacity of a positive-electrode active material, and a $TBABF_4$ concentration.

FIG. 5 is a diagram showing a relationship among the concentrations of Mg, MeTFS, $TBABF_4$, $AlCl_3$, and $BF_3DEE$ used in the synthesis of the electrolytic solution, the heating temperature, and the discharge capacity of the magnesium battery using the synthesized electrolytic solution in Examples of the present invention, and showing a relationship between the discharge capacity of the positive-electrode active material, and an $AlCl_3$ concentration.

FIG. 6 is a diagram showing a relationship among the concentrations of Mg, MeTFS, $TBABF_4$, $AlCl_3$, and $BF_3DEE$ used in the synthesis of the electrolytic solution, the heating temperature, and the discharge capacity of the magnesium battery using the synthesized electrolytic solution in Examples of the present invention, and showing a relationship between the discharge capacity of the positive-electrode active material, and a Mg concentration.

FIG. 7 is a diagram showing a relationship among the concentrations of Mg, MeTFS, $TBABF_4$, $AlCl_3$, and $BF_3DEE$ used in the synthesis of the electrolytic solution, the heating temperature, and the discharge capacity of the magnesium battery using the synthesized electrolytic solution in Examples of the present invention, and showing a relationship between the discharge capacity of the positive-electrode active material, and the heating temperature.

FIG. 8 is a diagram showing a relationship among the concentrations of Mg, MeTFS, $TBABF_4$, $AlCl_3$, and $BF_3DEE$ used in the synthesis of the electrolytic solution, the heating temperature, and the discharge capacity of the magnesium battery using the synthesized electrolytic solution in Examples of the present invention, and showing a relationship between the discharge capacity of the positive-electrode active material, and the $BF_3DEE$ concentration.

FIG. 9 is a diagram showing a discharge capacity of a magnesium battery using an electrolytic solution which is synthesized by changing a kind of alkyl trifluoromethane-sulfonate in Example 1 of the present invention.

[FIG. 10]

FIG. 10 is a diagram showing a discharge capacity of a magnesium battery using an electrolytic solution which is synthesized by changing a kind of quaternary ammonium salt in Example 1 of the present invention.

[FIG. 11]

FIG. 11 is a diagram showing a discharge capacity of a magnesium battery using an electrolytic solution which is synthesized by changing a kind of trifluoroborane-ether complex salt in Example 1 of the present invention.

[FIG. 12]

FIG. 12 is a view showing an example of structures of complexes each of which is thought to be contained in the synthesized electrolytic solution in Example 1 of the present invention.

[FIG. 13]

FIG. 13 is a diagram showing a relationship among concentrations of Mg, MeTFS, EMITFSI, $AlCl_3$, and $BF_3DEE$ used in synthesis of an electrolytic solution, a heating temperature, and a discharge capacity of a magnesium battery using the synthesized electrolytic solution in Example of the present invention.

FIG. 14 is a diagram showing a relationship among concentrations of Mg, MeTFS, EMITFSI, AlCl$_3$, and BF$_3$DEE used in synthesis of an electrolytic solution, a heating temperature, and a discharge capacity of a magnesium battery using the synthesized electrolytic solution in Examples of the present invention, and showing a relationship between a discharge capacity of a positive-electrode active material, and the MeTFS concentration.

FIG. 15 is a diagram showing a relationship among concentrations of Mg, MeTFS, EMITFSI, AlCl$_3$, and BF$_3$DEE used in synthesis of an electrolytic solution, a heating temperature, and a discharge capacity of a magnesium battery using the synthesized electrolytic solution in Examples of the present invention, and showing a relationship between a discharge capacity of a positive-electrode active material, and the EMITFSI concentration.

FIG. 16 is a diagram showing a relationship among concentrations of Mg, MeTFS, EMITFSI, AlCl$_3$, and BF$_3$DEE used in synthesis of an electrolytic solution, a heating temperature, and a discharge capacity of a magnesium battery using the synthesized electrolytic solution in Examples of the present invention, and showing a relationship between a discharge capacity of a positive-electrode active material, and the AlCl$_3$ concentration.

FIG. 17 is a diagram showing a relationship among concentrations of Mg, MeTFS, EMITFSI, AlCl$_3$, and BF$_3$DEE used in synthesis of an electrolytic solution, a heating temperature, and a discharge capacity of a magnesium battery using the synthesized electrolytic solution in Examples of the present invention, and showing a relationship between a discharge capacity of a positive-electrode active material, and the Mg concentration.

FIG. 18 is a diagram showing a relationship among concentrations of Mg, MeTFS, EMITFSI, AlCl$_3$, and BF$_3$DEE used in synthesis of an electrolytic solution, a heating temperature, and a discharge capacity of a magnesium battery using the synthesized electrolytic solution in Examples of the present invention, and showing a relationship between a discharge capacity of a positive-electrode active material, and the heating temperature.

FIG. 19 is a diagram showing a relationship among concentrations of Mg, MeTFS, EMITFSI, AlCl$_3$, and BF$_3$DEE used in synthesis of an electrolytic solution, a heating temperature, and a discharge capacity of a magnesium battery using the synthesized electrolytic solution in Examples of the present invention, and showing a relationship between a discharge capacity of a positive-electrode active material, and the BF$_3$DEE concentration.

FIG. 20 is a diagram showing a discharge capacity of a magnesium battery using an electrolytic solution which is synthesized by changing a kind of alkyl trifluoromethanesulfonate in Example 11 of the present invention.

[FIG. 21]

FIG. 21 is a diagram showing a discharge capacity of a magnesium battery using an electrolytic solution which is synthesized by changing a kind of 1,3-alkylmethylimidazolium salt in Example 11 of the present invention.

[FIG. 22]

FIG. 22 is a diagram showing a discharge capacity of a magnesium battery using an electrolytic solution which is synthesized by changing a kind of trifluoroborane-ether complex salt in Example 11 of the present invention.

[FIG. 23]

FIG. 23 is a view showing an example of structures of complexes each of which is thought to be contained in the synthesized electrolytic solution in Example 11 of the present invention.

FIG. 24 is a diagram showing a relationship between a mass ratio of copper to a graphite fluoride (copper/graphite fluoride), and a discharge capacity of the graphite fluoride when copper is added to a positive-electrode mixture in Examples of the present invention.

FIG. 25 is a graph showing a change in positive-electrode discharge capacity about Comparative Example 15 and Example 21-10 of the present invention.

FIG. 26 is a diagram showing a discharge capacity of the graphite fluoride when a positive-electrode power collecting body made of copper is used in Examples of the present invention.

[FIG. 27]

FIG. 27 is a diagram showing the discharge capacity of the graphite fluoride when an inner surface of a positive-electrode can is covered with copper in Examples of the present invention.

DETAILED DESCRIPTION

Figure 1:
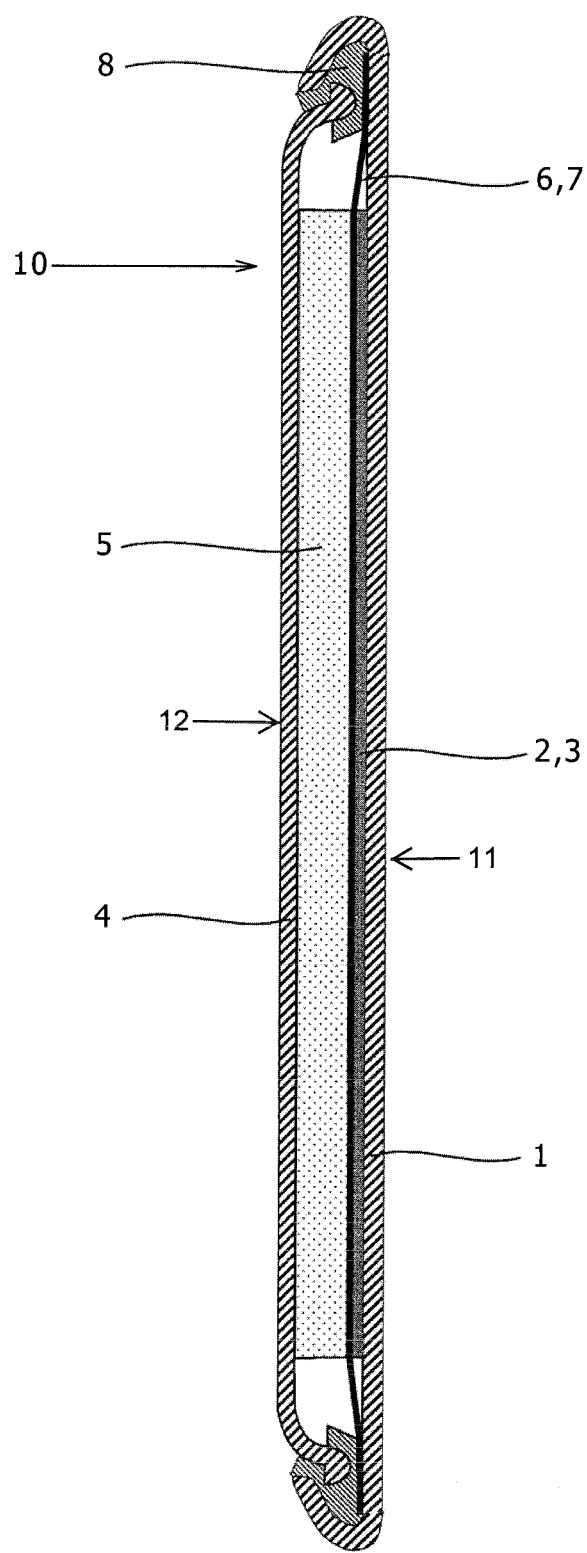
[FIG. 1]

In a nonaqueous electrolytic solution containing therein magnesium ions of the present invention, it is better to adopt a structure that an aluminum halide (AlY$_3$) is added to the ether system organic solvent described above. In this regard, Y in the general formula AlY$_3$ representing the aluminum halide is any one of chlorine (Cl), bromine (Br), and iodine (I). According to this structure, it is possible to increase a positive-electrode discharge capacity of the magnesium battery using the nonaqueous electrolytic solution containing therein the magnesium ions.

In addition, it is better to adopt a structure that the aluminum halide described above is an aluminum chloride, and the aluminum halide is added at a ratio of 1.0 mol or less per 1.0 mol of metal magnesium described above. According to this structure, it is possible to provide the electrolytic solution which can increase the positive-electrode discharge capacity of the magnesium battery using the nonaqueous electrolytic solution containing therein the magnesium ions. With the structure that the aluminum halide is added at a ratio of exceeding 1.0 mol per 1.0 mol of metal magnesium, the discharge capacity of the magnesium battery is reduced.

In addition, it is better to adopt a structure that the trifluoroborane-ether complex salt (BF$_3$(ether)) described above is added to the ether system organic solvent described above. According to this structure, it is possible to increase the positive-electrode discharge capacity of the magnesium battery using the nonaqueous electrolytic solution containing therein the magnesium ions.

In addition, it is better to adopt a structure that at least one kind of trifluoroborane-ether complex salt (BF$_3$(ether)) selected from the group consisting of a trifluoroborane-dimethyl ether complex salt, a trifluoroborane-ethyl methyl ether complex salt, a trifluoroborane-diethyl ether complex salt, a trifluoroborane-n-dibutyl ether complex salt, and a trifluoroborane-tetrahydrofuran complex salt is added. Ether in the general formula BF$_3$(ether) representing the trifluoroborane-ether complex salt described above is any one of a dimethyl ether (($CH_3$)$_2$O), an ethylmethyl ether ($C_2H_5OCH_3$), a diethyl ether (($C_2H_5$)$_2$O), an n-dibutyle ether (($C_4H_9$)$_2$O), and a tetrahydrofuran ($C_4H_8O$). According to this structure, even in the case of the magnesium battery using the electrolytic solution to which any one of the trifluoroborane-ether complex salts represented by the general formula $BF_3$(ether) described above, with regard to the discharge capacity, it is possible to obtain approximately the same performance. In addition, it is possible to provide the electrolytic solution which can increase the positive-electrode discharge capacity of the magnesium battery using the nonaqueous electrolytic solution containing therein the magnesium ions.

In addition, it is better to adopt a structure that the trifluoroborane-ether complex salt described above is added to a ratio of 4.0 mol or less per 1.0 mol of metal magnesium described above. According to this structure, it is possible to provide the electrolytic solution which can increase the positive-electrode discharge capacity of the magnesium battery using the nonaqueous electrolytic solution containing therein the magnesium ions. With the structure that the trifluoroborane-ether complex salt is added at a ratio of exceeding 4.0 mol per 1.0 mol of metal magnesium, the discharge capacity of the magnesium battery is reduced.

In addition, it is better to adopt a structure that the alkyl trifluoromethanesulfonate described above is at least one kind selected from the group consisting of a methyl trifluoromethanesulfonate and an ethyl trifluoromethanesulfonate, the alkyl trifluoromethanesulfonate described above is added at a ratio of equal to or more than 0.8 mol and equal to or less than 1.2 mol per 1.0 mol metal magnesium described above.

According to this structure, even in the case of the magnesium battery using the electrolytic solution manufactured by using any one of the alkyl trifluoromethanesulfonates contained in that group, with regard to the discharge capacity, it is possible to obtain approximately the same performance. In addition, it is possible to provide the electrolytic solution which can increase the positive-electrode discharge capacity of the magnesium battery using the nonaqueous electrolytic solution containing therein the magnesium ions. As the cause for this, it is thought that a stoichiometric proportion of the alkyl trifluoromethanesulfonate to metal magnesium described above in a reaction in which a compound similarly to the Grignard reagent is created from metal magnesium described above and the alkyl trifluoromethanesulfonate described above is 1. Thus, since there is adopted the structure that the alkyl trifluoromethanesulfonate described above is added at the ratio of falling within the range of equal to or more than 0.8 mol and equal to or less than 1.2 mol per 1.0 mol of metal magnesium, it is possible to provide the electrolytic solution which can increase the positive-electrode discharge capacity of the magnesium battery using the nonaqueous electrolytic solution containing therein the magnesium ions. With the structure that the alkyl trifluoromethanesulfonate described above is added at the ratio of less than 0.8 mol and exceeding 1.2 mol per 1.0 mol of metal magnesium described above, the discharge capacity of the magnesium battery is reduced.

In addition, it is better to adopt a structure that the quaternary ammonium salt described above is at least one kind selected from the group consisting of trifluoromethanesulfonic acid tetrabutylammonium ($CF_3SO_3N(C_4H_9)_4$), trifluoromethanesulfonic acid tributylmethylammonium ($CF_3SO_3N(C_4H_9)_3CH_3$), trifluoromethanesulfonic acid triethylmethylammonium ($CF_3SO_3N(C_2H_5)_3CH_3$), tetrafluoroboric acid tetrabutylammonium ($BF_4N(C_4H_9)_4$), tetrafluoroboric acid tributylmethylammonium ($BF_4N(C_4H_9)_3CH_3$), tetrafluoroboric acid triethylmethylammonium ($BF_4N(C_2H_5)_3CH_3$), tetrabutylammoniumbis(trifluoromethanesulfonyl)imide (($SO_2CF_3$)$_2$N—N($C_4H_9$)$_4$), tributylmethylammoniumbis(trifluoromethanesulfonyl)imide (($SO_2CF_3$)$_2$N—N($C_4H_9$)$_4$), tributylmethylammoniumbis(trifluoromethanesulfonyl)imide (($SO_2CF_3$)$_2$N—N($C_4H_9$)$_3CH_3$)), and triethylmethylammoniumbis(trifluoromethanesulfonyl)imide (($SO_2CF_3$)$_2$N—N($C_2H_5$)$_3CH_3$), and the 1,3-alkylmethylimidazolium salt is at least one kind selected from the group consisting of a 1,3-dimethylimidazoliumtetrafluoroborate ([($C_3H_3N_2$)($CH_3$)$_2$]$BF_4$), a 1-ethyl-3-methylimidazoliumtetrafluoroborate ([$C_2H_5$($C_3H_3N_2$)$CH_3$]$BF_4$), a 1-butyl-3-methylimidazoliumtetrafluoroborate ([$C_4H_9$ ($C_3H_3N_2$)$CH_3$]$BF_4$), 1,3-dimethylimidazoliumbis(trifluoromethanesulfonyl)imide ([($C_3H_3N_2$)($CH_3$)$_2$]($SO_2CF_3$)$_2$N), 1-ethyl-3-methylimidazoliumbis(trifluoromethanesulfonyl)imide ([$C_2H_5$($C_3H_3N_2$)$CH_3$]($SO_2$ ($CF_3$)$_2$N), and 1-butyl-3-methylimidazoliumbis(trifluoromethanesulfonyl)imide ([$C_4H_9$ ($C_3H_3N_2$)$CH_3$]($SO_2CF_3$)$_2$N).

According to this structure, even in the case of the magnesium battery using the electrolytic solution using any one of the quaternary ammonium salts of the group described above, or/and any one of the 1,3-alkylmethylimidazolium salts of the group described above, with regard to the discharge capacity, it is possible to obtain approximately the same performance. In addition, it is possible to provide the electrolytic solution which can increase the positive-electrode discharge capacity of the magnesium battery using the nonaqueous electrolytic solution containing therein the magnesium ions.

In addition, it is better to adopt a structure that either the quaternary ammonium salt described above or the 1,3-alkylmethylimidazolium salt described above is added at the ratio of equal to or more than 1.0 mol and equal to or less than 2.0 mol per 1.0 mol of metal magnesium described above, the quaternary ammonium salt described above and the 1,3-alkylmethylimidazolium salt described above are added at the ratio of equal to or more than 1.0 mol and equal to or less than 2.0 mol in total per 1.0 mol of metal magnesium described above.

According to this structure, it is possible to provide the electrolytic solution which can increase the positive-electrode discharge capacity of the magnesium battery using the nonaqueous electrolytic solution containing therein the magnesium ions. With the structure that either the quaternary ammonium salt described above or the 1,3-alkylmethylimidazolium salt described above is added at the ratio of less than 1.0 mol or exceeding 2.0 mol per 1.0 mol of metal magnesium described above, the discharge capacity of the magnesium battery is reduced.

In addition, it is better to adopt a structure that the ether system organic solvent described above is 1,2-dimethoxyethane. The ether class organic compound does not form a passive state film during the dissolution and precipitation of magnesium caused by the electrode reaction. In addition, the ether class organic compound can form the coordinate bond with the magnesium ions, thereby dissolving the magnesium ions. Heretofore, tetrahydrofuran (THF) has been used as the ether class organic compound composing the electrolytic solution of the magnesium battery in many cases. However, a boiling point of THF is 66° C. Thus, when the actual use condition of the magnesium battery in the high-temperature environment is supposed, it is possible that the temperature of the magnesium battery becomes higher than the boiling point of THF, and it is also possible that the vapor pressure of THF exceeds the atmospheric pressure.

With the magnesium battery using the nonaqueous electrolytic solution containing therein the magnesium ions using 1,2-dimethoxyethane, the boiling point of 1,2-dimethoxyethane is 84° C., and is about 20° C. higher than that of THF. Therefore, the possibility that the temperature of the magnesium battery becomes higher than the boiling point becomes remarkably small as compared with the case of tetrahydrofuran (THF) which has been conventionally in heavy usage, and the stability in the high-temperature environment is enhanced.

In addition, it is better to adopt a structure that metal magnesium described above is added at the ratio of equal to or more than 0.25 mol/l and equal to or less than 1.0 mol/l to the ether system organic solvent described above. According to this structure, it is possible to provide the electrolytic solution which can increase the positive-electrode discharge capacity of the magnesium battery using the nonaqueous electrolytic solution containing therein the magnesium ions. With the structure that metal magnesium described above is added at the ratio of less than 0.25 mol/l or exceeding 1.0 mol/l to the ether system organic solvent described above, the discharge capacity of the magnesium battery is reduced.

In the electrochemical device of the present invention, it is better to adopt a structure that the active material of the first electrode described above is made from either a compound which reacts with the magnesium ion described above or a compound which occludes the magnesium ion described above, and the active material of the second electrode described above is made from either a metal single body of magnesium or an alloy containing therein magnesium. When the electrochemical device based on the structure that the metal single body (a pure metal) of magnesium is used in the negative electrode is structured as the magnesium battery, it is possible to increase the discharge capacity (energy capacity) of the battery.

Or, when the electrochemical device based on the structure that the alloy containing therein magnesium is used in the negative electrode is structured as the magnesium battery, for example, the negative electrode can be stabilized against the repetition of the charge and the discharge, and so forth. Thus, it is possible to enhance the cycle characteristics because the precipitation/dissolution of magnesium following the charge/discharge is unaccompanied (because magnesium is brought in as the ions).

It is better to adopt a structure that the first electrode described above is a positive electrode including a positive-electrode active material made from a graphite fluoride and a positive-electrode mixture containing therein copper, and the second electrode described above is a negative electrode containing therein either a magnesium metal or a magnesium alloy as a negative-electrode active material. According to this structure (first structure), copper is either mixed with the positive-electrode active material described above, or covered with the positive-electrode active material described above to be contained in the positive-electrode mixture described above, and thus contacts the positive-electrode active material described above, and the positive-electrode mixture described above contains therein copper. Therefore, it is possible to largely increase the discharge capacity of the graphite fluoride, and thus it is possible to provide the electrochemical device structured as the magnesium battery which has the discharge capacity corresponding up to about 99% relative to the theoretical capacity due to one electron reduction reaction.

In addition, it is better to adopt a structure that the first electrode described above is a positive electrode including a positive-electrode mixture containing a positive-electrode active material made from a graphite fluoride, and the second electrode described above is a negative electrode containing therein either a magnesium metal or a magnesium alloy as the negative-electrode active material, and the electrochemical device has a positive-electrode power collecting body made of a conductive material covered with copper or/and copper, or/and a positive-electrode can having an inner surface covered with copper contacting therein the positive-electrode active material described above.

When the positive-electrode power collecting body described above is made of the conductive material covered with copper or/and copper (second structure), copper contacts the positive-electrode active material described above. Thus, it is possible to provide the electrochemical device structured as the magnesium battery which has the discharge capacity corresponding to 95.8% relative to the theoretical capacity described above without increasing the capacity of the battery. When the inner surface of the positive-electrode can described above is covered with copper and copper contacts the positive-electrode active material described above (third structure), it is possible to provide the magnesium battery which has the discharge capacity corresponding to 93.3% relative to the theoretical capacity described above without increasing the capacity of the battery.

In addition, since the inner volume of the battery is not increased, the discharge capacity per unit volume is prevented from being reduced. Moreover, in the second structure, the positive-electrode power collecting body covered with copper described above only has to be used. Also, in the third structure, the positive-electrode can having the inner surface coated with copper described above only has to be used. Therefore, the manufacturing cost is prevented from being increased without largely changing the method of manufacturing the battery.

In addition, it is better to adopt a structure that the electrochemical device is structured as the battery. According to this structure, for example, when the electrochemical device is structured as the magnesium battery, the nonaqueous electrolytic solution containing therein the magnesium ions has a sufficiently high oxidation potential, and thus the electrolyte described above is prevented from being oxidized and decomposed by a large electromotive force generated between the first electrode described above and the second electrode described above. Therefore, it is possible to realize the battery having the large output voltage by making full use of the features of magnesium as the metal having the large ionization tendency.

In addition, it is better that the electrochemical device is structured as the secondary battery chargeable by a reverse reaction. According to this structure, a current is caused to flow in a direction opposite to that in the case of the discharge, thereby charging the secondary battery described above, and thus the state of the battery after use can be returned back to the state before the discharge. Therefore, the secondary battery can be repetitively used, and thus the resources can be effectively utilized. Also, even when the battery after the discharge is charged for reutilization, it is possible to sufficiently make full use of the large energy capacity of the magnesium battery. In addition, it is better to adopt a structure that the battery is structured as a thin secondary battery. According to this structure, it is possible to structure the flat and small battery having the small inner capacity.

In the electrochemical device of the present invention, it is better to adopt a structure that copper described above is contained at a mass ratio of equal to larger than 3 and equal to or smaller than 15 per mass ratio of 100 of the graphite fluoride in the positive-electrode mixture. According to this structure, the discharge capacity of the graphite fluoride can be increased as compared with the case where no copper is contained. When the mass ratio of copper is set as 15 relative to the graphite fluoride described above, the discharge capacity can be largely increased without especially increasing the capacity size of the battery. Thus, it is possible to provide the magnesium battery which has the discharge capacity corresponding to about 99% relative to the theoretical capacity described above.

In addition, it is better to adopt a structure that copper described above is contained at least 15 per mass ratio of 100 of the graphite fluoride in the positive-electrode mixture. According to this structure, it is possible to provide the magnesium battery which has the discharge capacity corresponding to 98.8% relative to the theoretical capacity. When the mass ratio of copper described above is set as being equal to or larger than 15 relative to the mass ratio of the graphite fluoride described above, the discharge capacity per unit volume is prevented from being reduced because the discharge capacity is approximately constant and thus copper described above only has to be contained at the mass ratio of at least 15.

In addition, it is better to adopt a structure that the electrochemical device has a separator, and the negative-electrode active material is disposed on one side of the separator, and the positive-electrode mixture is disposed on the other hand of the separator. According to this structure, the separator described above is made to have a flat surface shape, whereby the negative-electrode active material and the positive-electrode mixture can be separated from each other by the separator, thereby structuring the thin battery. Thus, it is possible to structure the flat and small battery having the small inner capacity.

A method of manufacturing the nonaqueous electrolytic solution containing therein the magnesium ions according to the present invention has the features which will be described below. Thus, it is possible to obtain the nonaqueous electrolytic solution containing therein the magnesium ions which can efficiently bring out the excellent characteristics of metal magnesium as the negative-electrode active material.

(1) A method of manufacturing the nonaqueous electrolytic solution containing therein the magnesium ions having a first process for adding metal magnesium, an alkyl trifluoromethanesulfonate ($RCF_3SO_3$), a quaternary ammonium salt ($R^1R^2R^3R^4N^+Z^-$) or/and a 1,3-alkyl methylimidazolium salt ($[R(C_3H_3N_2)CH_3]^+X^-$) to at least an ether system organic solvent, and a second process for heating the liquid solution obtained in the first process, in which the magnesium ions are dissolved in the ether system organic solvent.

In this regard, R in the general formula $RCF_3SO_3$ representing alkyl trifluoromethanesulfonate described above, R is either a methyl group or an ethyl group. In addition, each of $R^1$, $R^2$, $R^3$, and $R^4$ in the general formula $R^1R^2R^3R^4N^+Z^-$ representing the quaternary ammonium salt described above is either an alkyl group or an aryl group, and $Z^-$ is any one of a chloride ion ($Cl^-$), a boromide ion ($Br^-$), an iodide ion ($I^-$), an acetic acid ion ($CH_3COO^-$), a perchloric acid ion ($ClO_4^-$), a tetrafluoroboric acid ion ($BF_4^-$), a hexafluorophosphoric acid ion ($PF_6^-$), a hexafluoroarsenic acid ion ($AsF_6^-$), a perfluoroalkylsulfonic acid ion ($RflSO_3^-$: Rf1 is a perfluoroalkyl group), and a perfluoroalkylsulfonyl imide ion (($Rf2SO_2)_2N^-$: Rf2 is a perfluoroalkyl group).

In addition, R is the general formulas $[R(C_3H_3N_2)CH_3]^+ X^-$ representing the 1,3-alkyl methylimidazolium salt is a methyl group, an ethyl group or a butyl group, and $X^-$ is any one of a tetrafluoroboric acid ion ($BF_4^-$) or a bis(trifluoromethanesulfonyl)imide ion (($SO_2CF_3)_2N^-$).

According to the present invention, it is possible to provide the method of manufacturing the nonaqueous electrolytic solution containing therein the magnesium ions in which the magnesium ions are dissolved in the ether system organic solvent, and full use of the excellent characteristics of metal magnesium as the negative-electrode active material can be sufficiently made, and which can be manufactured in the general manufacturing environment such as the dry room.

(2) The method of manufacturing the nonaqueous electrolytic solution containing therein the magnesium ions described in (1) in which in the first process described above, an aluminum halide ($AlY_3$) is added. In this regard, Y in the general formula $AlY_3$ representing the aluminum halide is any one of chlorine (Cl), bromine (Br), and iodine (I).

According to this structure, it is possible to provide the method of manufacturing the electrolyte which can increase a positive-electrode discharge capacity of the magnesium battery using the nonaqueous electrolytic solution containing therein the magnesium ions.

(3) The method of manufacturing the nonaqueous electrolytic solution containing therein the magnesium ions described in (2) in which an aluminum chloride is used as the aluminum halide.

According to this structure, it is possible to provide the method of manufacturing the electrolyte which can increase the positive-electrode discharge capacity of the magnesium battery using the nonaqueous electrolyte solution containing therein the magnesium ions.

(4) The method of manufacturing the nonaqueous electrolytic solution containing the magnesium ions described in (2) in which the aluminum halide is added at a ratio of equal to or less than 1.0 mol per 1.0 mol of metal magnesium described above.

According to this structure, it is possible to provide the method of manufacturing the electrolytic solution which can increase the positive-electrode discharge capacity of the magnesium battery using the nonaqueous electrolytic solution containing therein the magnesium ions. With the structure that the aluminum halide is added at the ratio of exceeding 1.0 mol per 1.0 mol of metal magnesium described above, the discharge capacity of the magnesium battery is reduced.

(5) The method of manufacturing the nonaqueous electrolytic solution containing therein the magnesium ions described in (1) in which at least one kind of trifluoroborane-ether complex salt ($BF_3$(ether)) selected from the group consisting of a trifluoroborane-dimethyl ether complex salt, a trifluoroborane-ethyl methyl ether complex salt, a trifluoroborane-diethyl ether complex salt, a trifluoroborane-n-dibutyl ether complex salt, and a trifluoroborane-tetrahydrofuran complex salt is added.

In this regard, Ether in the general formula $BF_3$(ether) representing the trifluoroborane-ether complex salt described above is any one of a dimethyl ether (($CH_3)_2O$), an ethylmethyl ether ($C_2H_5OCH_3$), a diethyl ether (($C_2H_5)_2O$), an n-dibutyle ether (($C_4H_9)_2O$), and a tetrahydrofuran ($C_4H_8O$).

According to this structure, even in the case of the magnesium battery using the electrolytic solution manufactured by using any one of the trifluoroborane-ether complex salts represented by the general formula $BF_3$(ether) described above, with regard to the discharge capacity, it is possible to obtain approximately the same performance. In addition, it is possible to provide the method of manufacturing the electrolytic solution which can increase the positive-electrode discharge capacity of the magnesium battery using the nonaqueous electrolytic solution containing therein the magnesium ions.

(6) The method of manufacturing the nonaqueous electrolytic solution containing therein the magnesium ions described in (5) in which at least one kind selected from the group consisting of a trifluoroborane-dimethyl ether complex salt, a trifluoroborane-ethyl methyl ether complex salt, a trifluoroborane-diethyl ether complex salt, a trifluoroborane-n-dibutyl ether complex salt, and a trifluoroborane-tetrahydrofuran complex salt is used as the trifluoroborane-ether complex salt described above.

According to this structure, even in the case of the magnesium battery using the electrolytic solution manufactured by using any of the trifluoroborane-ether complex salts represented by the general formula $BF_3$(ether) described above, with regard to the discharge capacity, it is possible to obtain approximately the same performance. In addition, it is possible to provide the method of manufacturing the electrolytic solution which can increase the positive-electrode discharge capacity of the magnesium battery using the nonaqueous electrolytic solution containing therein the magnesium ions.

(7) The method of manufacturing the nonaqueous electrolytic solution containing therein the magnesium ions described in (5) in which the trifluoroborane-ether complex salt described above is added at a ratio of equal to or less than 0.4 mol per 1.0 mol of metal magnesium described above.

According to this structure, it is possible to provide the method of manufacturing the electrolytic solution which can increase the positive-electrode discharge capacity of the magnesium battery using the nonaqueous electrolytic solution containing therein the magnesium ions. With the structure that the trifluoroborane-ether complex salt described above is added at the ratio of exceeding 0.4 mol per 1.0 mol of metal magnesium described above, the discharge capacity of the magnesium battery is reduced.

(8) The method of manufacturing the nonaqueous electrolytic solution containing the magnesium ions described in (1) in which at least one kind selected from the group consisting of a methyl trifluoromethanesulfonate ($CH_3CF_3SO_3$) and an ethyl trifluoromethanesulfonate ($C_2H_5CF_3SO_3$) is used as the alkyl trifluoromethanesulfonate.

According to this structure, even in the case of the magnesium battery using the electrolytic solution manufactured by using any of the alkyl trifluoromethanesulfonates in the group described above, with regard to the discharge capacity, it is possible to obtain approximately the same performance. In addition, it is possible to provide the method of manufacturing the electrolytic solution which can increase the positive-electrode discharge capacity of the magnesium battery using the nonaqueous electrolytic solution containing therein the magnesium ions.

(9) The method of manufacturing the nonaqueous electrolytic solution containing therein the magnesium ions described in (1) in which the alkyl trifluoromethanesulfonate is added at a ratio of equal to or more than 0.8 mol and equal to or less than 1.2 mol per 1.0 mol of metal magnesium described above.

As the cause for this, it is thought that a stoichiometric proportion of the alkyl trifluoromethanesulfonate to metal magnesium described above in a reaction in which a compound similar to the Grignard reagent is created from metal magnesium described above and the alkyl trifluoromethanesulfonate described above is 1. Thus, since there is adopted the structure that the alkyl trifluoromethanesulfonate described above is added at the ratio of falling within the range of equal to or more than 0.8 mol and equal to or less than 1.2 mol per 1.0 mol of metal magnesium described above, it is possible to provide the method of manufacturing the electrolytic solution which can increase the positive-electrode discharge capacity of the magnesium battery using the nonaqueous electrolytic solution containing therein the magnesium ions.

With the structure that the alkyl trifluoromethanesulfonate described above is added at the ratio of less than 0.8 mol, or exceeding 1.2 mol per 1.0 mol of metal magnesium described above, the discharge capacity of the magnesium battery is reduced.

(10) The method of manufacturing the nonaqueous electrolytic solution containing therein the magnesium ions described in (1) in which the quaternary ammonium salt described above is at least one kind selected from the group consisting of trifluoromethanesulfonic acid tetrabutylammonium, trifluoromethanesulfonic acid tributylmethylammonium, trifluoromethanesulfonic acid triethylmethylammonium, tetrafluoroboric acid tetrabutylammonium, tetrafluoroboric acid tributylmethylammonium, tetrafluoroboric acid triethylmethylammonium, tetrabutylammoniumbis(trifluoromethanesulfonyl)imide, triethylmethylammoniumbis(trifluoromethanesulfonyl)imide, and triethylmethylammoniumbis(trifluoromethanesulfonyl) imide, and the 1,3-alkylmethylimidazolium salt is at least one kind selected from the group consisting of a 1,3-dimethylimidazoliumtetrafluoroborate, a 1-ethyl-3-methylimidazoliumtetrafluoroborate, a 1-butyl-3-methylimidazoliumtetrafluoroborate, 1,3-dimethylimidazoliumbis(trifluoromethanesulfonyl)imide, 1-ethyl-3-methylimidazoliumbis(trifluoromethanesulfonyl)imide, and 1-butyl-3-methylimidazoliumbis(trifluoromethanesulfonyl)imide.

According to this structure, even in the case of the magnesium battery using the electrolytic solution manufactured by using any one of the quaternary ammonium salts of the group described above, or any one of the 1,3-alkylmethylimidazolium salts of the group described above, with regard to the discharge capacity, it is possible to obtain approximately the same performance. In addition, it is possible to provide the method of manufacturing the electrolytic solution which can increase the positive-electrode discharge capacity of the magnesium battery using the nonaqueous electrolytic solution containing therein the magnesium ions.

(11) The method of manufacturing the nonaqueous electrolytic solution containing the magnesium ions described in (1) in which either the quaternary ammonium salt described above or the 1,3-alkylmethylimidazolium salt described above is added at the ratio of equal to or more than 1.0 mol and equal to or less than 2.0 mol per 1.0 mol of metal magnesium described above, or the quaternary ammonium salt described above and the 1,3-alkylmethylimidazolium salt described above are added at the ratio of equal to or more than 1.0 mol and equal to or less than 2.0 mol in total per 1.0 mol of metal magnesium described above.

According to this structure, it is possible to provide the method of manufacturing the electrolytic solution which can increase the positive-electrode discharge capacity of the magnesium battery using the nonaqueous electrolytic solution containing therein the magnesium ions. With the structure that either the quaternary ammonium salt described above or the 1,3-alkylmethylimidazolium salt described above is added at the ratio of less than 1.0 mol or exceeding 2.0 mol per 1.0 mol of metal magnesium described above, the discharge capacity of the magnesium battery is reduced.

(12) The method of manufacturing the nonaqueous electrolytic solution containing therein the magnesium ions described in (1) in which 1,2-dimethoxyethane is used as the ether system organic solvent described above.

The ether class organic compound does not form a passive state film during the dissolution and precipitation of magnesium caused by the electrode reaction. In addition, the ether class organic compound can form the coordinate bond with the magnesium ions, thereby dissolving the magnesium ions. Heretofore, tetrahydrofuran (THF) has been used as the ether class organic compound composing the electrolytic solution of the magnesium battery in many cases. However, a boiling point of THF is 66° C. Thus, when the actual use condition of the magnesium battery in the high-temperature environment is supposed, it is possible that the temperature of the magnesium battery becomes higher than the boiling point of THF, and it is also possible that the vapor pressure of THF exceeds the atmospheric pressure.

With the magnesium battery using the nonaqueous electrolytic solution containing therein the magnesium ions using 1,2-dimethoxyethane, the boiling point of 1,2-dimethoxyethane is 84° C., and is about 20° C. higher than that of THF. Therefore, the possibility that the temperature of the magnesium battery becomes higher than the boiling point becomes remarkably small as compared with the case of tetrahydrofuran which has been conventionally in heavy usage, and the stability at the high-temperature environment is enhanced.

(13) The method of manufacturing the nonaqueous electrolytic solution containing therein the magnesium ions described in (1) in which metal magnesium described above is added at the ratio of equal to or more than 0.25 mol/l and equal to or less than 1.0 mol/l to the ether system organic solvent described above.

According to this structure, it is possible to provide the method of manufacturing the electrolytic solution which can increase the positive-electrode discharge capacity of the magnesium battery using the nonaqueous electrolytic solution containing therein the magnesium ions. With the structure that metal magnesium described above is added at the ratio of less than 0.25 mol/l or exceeding 1.0 mol/l to the ether system organic solvent described above, the discharge capacity of the magnesium battery is reduced.

(14) The method of manufacturing the nonaqueous electrolytic solution containing therein the magnesium ions described in (1) in which in the second process described above, a heating temperature of the liquid solution described above is set as being equal to or higher than 50° C. and equal to or lower than 80° C.

According to this structure, it is possible to provide the method of manufacturing the electrolytic solution which can increase the positive-electrode discharge capacity of the magnesium battery using the nonaqueous electrolytic solution containing therein the magnesium ions. With the structure that the heating temperature of the liquid solution described above is lower than 50° C. or exceeding 80° C., the discharge capacity of the magnesium battery is reduced.

The inventor of this application has examined the electrochemical characteristics of the various kinds of nonaqueous electrolytic solutions each containing therein the magnesium ions, and stability in the atmosphere including the stability during the manufacturing process in detail. As a result, it has become clear that the following method is suitable as the method of manufacturing the electrolytic solution of the magnesium battery.

The magnesium battery has a positive-electrode pellet composed of a positive-electrode can, a positive-electrode pellet made of a positive-electrode active material and the like, a positive electrode composed of a metallic net-like body (metallic net supporting body) made from a metallic net, a negative electrode composed of a negative-electrode cap and a negative-electrode active material, and a separator the inside of which is impregnated with the nonaqueous electrolyte solution containing therein the magnesium ions, and disposed between the positive-electrode pellet and the negative-electrode active material.

Metal magnesium, the alkyl trifluoromethanesulfonate, the quaternary ammonium salt or/and the 1,3-alkylmethylimidazolium salt, more preferably, an aluminum halide are added to the ether system organic solvent, and a heating treatment is carried out while they are stirred. After that, furthermore preferably, the trifluoroborane-ether complex salt is added thereto, thereby making it possible to manufacture the nonaqueous electrolytic solution containing therein the magnesium ions in the general manufacturing environment such as the dry room. It is noted that either a pure solvent or a mixed solvent containing therein at least one kind of ether class organic compound can be used as the ether system organic solvent.

The magnesium battery as the electrochemical device which has the nonaqueous electrolytic solution containing therein the magnesium ions, the positive electrode, and the negative electrode, and which is structured in such a way that the negative-electrode active material is oxidized to generate the magnesium ions can sufficiently bring out the excellent characteristics of metal magnesium and shows the large discharge capacity.

In addition, in the magnesium battery of the present invention, at least one or more of the structure that copper and the positive-electrode active material contact each other, that is, the structure that copper is contained in the positive-electrode mixture, the structure that the positive-electrode power collecting body is made of either copper or a material covered with copper, and the structure that the inner surface of the positive-electrode can is covered with copper are adopted, thereby making it possible to realize the magnesium battery having the large discharge capacity.

Hereinafter, an embodiment according to the present invention will be described in detail with reference to the accompanying drawings.

[Embodiment]

In this embodiment, a description will now be given with respect to the nonaqueous electrolytic liquid containing therein the magnesium ions based on the present invention, and the magnesium battery as an example of the electrochemical device using the nonaqueous electrolytic liquid. In this connection, it is noticed in advance that the description given herein is merely an example, and thus the present invention is by no means limited thereto. Although hereinafter, a coin type (referred to as a button type as well) battery will be described, the present invention can also be applied to a cylinder type or square type battery having a spiral structure in its inside in which a thin positive electrode and a thin negative electrode between which a separator is held are wound into a spiral-like shape, and thus the same effects as those in the coin type battery can be obtained.

FIG. 1 is a cross sectional view showing a structure of a magnesium battery 10 in the embodiment of the present invention.

As shown in FIG. 1, the magnesium battery 10 is formed as a coin type battery having a thin disc-like external form shape. A positive electrode 11 as a first electrode is composed of a positive-electrode can 1, a positive-electrode pellet 2, and a metallic net-like body 3 (hereinafter referred to as a metallic net supporting body 3 as well) formed from a metallic net, and a negative electrode 12 as a second electrode is composed of a negative-electrode cup 4 and a negative-electrode active material 5. The positive-electrode pellet 2 and the negative-electrode active material 5 are disposed in such a way that the positive-electrode pellet 2 and the negative-electrode active material 5 each contact the separator 6, and thus the positive-electrode pellet 2 and the negative-electrode active material 5 are prevented from being mutually short-circuited by the separator 6. Also, the separator 6 is impregnated with the electrolytic solution, and thus the electrolytic solution is infused into the separator 6.

The positive-electrode pellet 2 into which the positive-electrode mixture composed of the positive-electrode active material, the conductive agent and the binder are pressed together with the metallic net-like body 3 so as to have a disc-like shape is disposed inside the positive-electrode can 1, the porous separator 6 is provided on the positive-electrode pellet 2, and thus is impregnated with the electrolytic solution 7. Subsequently, the negative-electrode active material 5 obtained by carrying out the press-molding so as to have a disc-like shape similarly to the case of the positive-electrode pellet 2 is placed on the separator 6, and the negative-electrode cup 4 and the positive-electrode can 1 are fitted into each other through a sealing gasket 8, thereby forming the hermetically-sealed coin type battery.

The positive-electrode can 1 functions as an external positive electrode terminal of a power collecting body and the battery. The positive-electrode mixture composed of the positive-electrode active material, the conductive agent and the binder are press-molded together with the metallic net-like body 3 into the positive-electrode pellet 2 so as to have the disc-like shape, and the positive-electrode pellet 2 is disposed inside the positive electrode can 1. The metallic net supporting body 3 functions as the supporting body and the power collecting body (positive-electrode power collecting body) for the positive-electrode pellet 2.

The positive-electrode active material, for example, is made of an oxide, a halide or the like of a metal element such as scandium (Sc), titanium (Ti), vanadium (V), chromium (Cr), manganese (Mn), iron (Fe), cobalt (Co), nickel (Ni), copper (Cu) or zinc (Zn) in addition to a graphite fluoride $((CF)_n)$.

A graphite class, a conductive fiber class such as a carbon fiber or a metallic fiber, metallic powder, a conductive whisker, a conductive metallic oxide, an organic conductive material, or the like, for example, is used as the conductive agent.

A polymer material containing therein fluorine such as a vinylidene fluoride (PVdF), hexafluoropropylene (HFP), or chlorotrifluoroethylene (CTFE), tetrafluoroethylene (PTFE), or a copolymer of these polymer materials, for example, a copolymer of the vinylidene fluoride and hexafluoropropylene, or the like, for example, is used as the binder.

The negative-electrode cup 4 functions as an external negative-electrode terminal of the power collecting body (negative-electrode power collecting body) and the battery. The negative-electrode active material 5, for example, is a metal magnesium plate which is molded so as to have a disc-like shape, and is disposed so as to contact the negative-electrode cup 4. For the purpose of increasing the energy capacity of the negative electrode 12 as much as possible, pure metal magnesium is desirably used in the negative-electrode active material 5. However, for the purpose of enhancing the battery performance other than the energy capacity such as stabilizing the negative-electrode active material 5 against the repetition of the charge and discharge, an alloy can also be used as the material of the negative-electrode active material 5.

A polyolefin system fine-porous film or the like such as polypropylene or polyethylene can be used in the separator 6. The positive-electrode can 1 and the negative-electrode cup 4 are fitted to each other through the sealing gasket 8. The sealing gasket 8 serves to hermetically seal the inside of the magnesium battery 10 while the positive electrode 11 and the negative electrode 12 are electrically insulated from each other.

The electrolytic solution 7 is a nonaqueous electrolytic solution containing therein the magnesium ions based on the present invention. In the first preparation example for the manufacturing of the electrolytic solution, 1,2-dimethoxyethane is used as the ether system organic solvent, metal magnesium is added at a ratio of 0.25 mol/l (liter)~1.0 mol/l to this solvent. Also, methy trifluoromethanesulfonate is used as an alkyl trifluoromethanesulfonate and is added at a ratio of 0.8 mol~1.2 mol per 1.0 mol of magnesium. Also, tetrafluoroboric acid tetrabutylammonium is used as a quaternary ammonium salt and is added at a ratio of 1.0 mol~2.0 mol per 1.0 mol of magnesium. More preferably, an aluminum chloride is used an aluminum halide and is added at a ratio of 1.0 mol per 1.0 mol of magnesium. A heating treatment is carried out at 50° C.~80° C. while they are stirred, thereby dissolving both the magnesium ions and the aluminum ions in 1,2-dimethoxyethane as the ether system organic solvent.

It is noted that the concentration of 0.25 mol/l~1.0 mol/l, and the temperature of 50° C.~80° C. mean a concentration range of equal to or more than 0.25 mol/l and equal to or less than 1.0 mol/l, and a temperature range of equal to or higher than 50° C. and equal to or lower than 80° C., respectively, and in the following description, the mark "~" representing a range represents a range including numerical values on both sides of the mark.

More preferably, after that, a trifluoroborane-dimethylether complex salt is added at a ratio of 4.0 mol or less per 1.0 mol of metal magnesium.

In a second preparation example for the manufacturing of the nonaqueous electrolytic solution containing therein the magnesium ions based on the present invention, 1,2-dimethoxyethane is used as the ether system organic solvent and metal magnesium is added at a ratio of 0.25 mol/l~1.0 mol/l to this solvent. Also, a methyl trifluoromethanesulfonate is used as an alkyl trifluoromethanesulfonate and is added at a ratio of 0.8 mol~1.2 mol per 1.0 mol of magnesium. 1-ethyl-3-methylimidazoliumbis(trifluoromethanesulfonyl) imide is used as a 1,3-alkylmethylimidazolium salt and is added at a ratio of 1.0 mol~2.0 mol per 1.0 mol of magnesium. More preferably, aluminum chloride is used an aluminum halide and is added at a ratio of 1.0 mol per 1.0 mol of magnesium. A heating treatment is carried out at 50° C.~80° C. while they are stirred, thereby dissolving both the magnesium ions and the aluminum ions in 1,2-dimethylethane as the ether system organic solvent.

More preferably, after that, a trifluoroborane-diethylether complex salt is added at a ratio of 4.0 mol or less per 1.0 mol of metal magnesium.

Although the quaternary ammonium salt and the 1,3-alkylmethylimidazolium salt are used in the first preparation example and the second preparation example which have been described so far, respectively, the quaternary ammonium salt and the 1,3-alkylmethylimidazolium salt may be used at the same time (third preparation example). The quaternary ammonium salt and the 1,3-alkylmethylimidazolium salt are used at the same time instead of using the quaternary ammonium salt in the first preparation example, or the 1,3-alkylmethylimidazolium salt in the second preparation example, and are added at a ratio of 1.0 mol~2.0 mol in total per 1.0 mol of magnesium, and the nonaqueous electrolytic solution is prepared similarly to each of the cases of the first example and the second example, thereby making it possible to manufacture the nonaqueous electrolytic solution having the same performance as that of each of the first example and the second example.

In the magnesium battery of the present invention, as will be described subsequently, it is possible to adopt a structure that copper and the positive-electrode active material contact each other. (1) The positive-electrode mixture composed of the positive-electrode active material, the conductive agent, and the binder is mixed with the copper powder, or the positive-electrode active material is covered with copper to contain copper in the positive-electrode active material, and copper is used in a state of contacting the positive-electrode active material. (2) The conductive material covered with copper, or/and the positive-electrode power collecting body made of copper are used, and copper is used in a state of contacting the positive-electrode active material. (3) The positive-electrode can having the inner surface covered with copper is used, and copper is used in a state of contacting the positive-electrode active material. Copper is used in the three forms, and the structure that copper and the positive-electrode active material contact each other is adopted, whereby it is possible to efficiently develop the discharge performance of the graphite fluoride as the positive-electrode active material, and it is possible to largely increase the discharge capacity.

When the positive-electrode active material has such a structure as to contact copper, the three forms described above can be applied to the coin type (referred to as the button type as well) battery, the cylinder type battery, the square type battery or the like having the spiral structure in its inside in which the thin positive electrode and the thin negative electrode between which the separator is held are wound into the spiral shape, and thus the same effects as those in the coin type battery can be obtained. It is noted that one or more forms of the three forms described above are adopted, thereby making also it possible to form the battery.

In the battery using the form (1) described above, that is, in the battery having the structure that copper is contained in the positive-electrode mixture, when the mass ratio of copper to the graphite fluoride in the positive-electrode mixture, that is, the ratio represented by (mass of copper/mass of graphite fluoride)×100 is 8.5, 10.0, 12.3, 15.0, it is possible to realize the battery having the discharge capacity of 70%, 80%, 90%, 98.8% of the theoretical capacity (about 860 mAh/g). When copper is contained at the mass ratio of at least 15 per 100 of the mass ratio of the graphite fluoride, it is possible to realize the magnesium battery having the discharge capacity corresponding to about 99% of the theoretical capacity.

In the negative electrode 12 of the magnesium battery 10, during the discharge, metal magnesium as the negative-electrode active material 5, or an alloy of metal magnesium is oxidized in accordance with the following reaction formula, and the electrons are discharged to an external circuit through the negative-electrode cup 4:

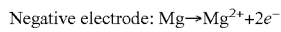

Negative electrode: Mg→Mg$^{2+}$+2e$^-$

It is thought that the magnesium ions generated in this reaction are dissolved in the electrolytic solution 7, and are diffused in the electrolytic solution 7 to be moved to the positive electrode 11 side.

It is thought that the magnesium ions which have been moved to the positive electrode 11 are trapped on a surface of either the oxide or the halide as the positive-electrode active material, or inner wall surfaces within holes formed either in the oxide or in the halide to react with the positive-electrode active material. At this time, the elements composing the positive-electrode active material are reduced, and the electrons are taken in from the external circuit through the positive-electrode can 1 or the like.

The magnesium battery according to the present invention can be used as a power source of an apparatus which is fixed to and installed in a factory or a home, a power source used in a portable and transportable information apparatus such as a telephone or a PC, or a power source mounted to a mobile apparatus such as an auto mobile.

Hereinafter, Examples based on the present invention will be described.

EXAMPLES

Example 1

In Example 1, the coin type magnesium battery 10 shown in FIG. 1 was manufactured by using metal magnesium as the negative-electrode active material 5, by using the manganese oxide as the positive-electrode active material, and by using the electrolytic solution based on the present invention, and the performance of the electrolytic solution was examined.

<Synthesis of Nonelectrolytic Solution 7 Containing Magnesium Ions>

0.12 g of metal magnesium was added to 10 ml of 1,2-dimethoxyethane. In addition, 0.55 ml of a methyl trifluoromethanesulfonate (MeTFS), 2.47 g of tetrafluoroboric acid tetrabutylammonium (TBABF$_4$), and 0.33 g of an aluminum chloride (AlCl$_3$) were added. This corresponds that metal magnesium, a methyl trifluoromethanesulfonate, tetrafluoroboric acid tetrabutylammonium, and an aluminum chloride are added at the ratio of 0.50 mol/l, at the ratio of 0.50 mol/l, at the ratio of 0.75 mol/l, and at the ratio of 0.25 mol/l to 1,2-dimethoxyethane, respectively. A heating treatment was carried out at 60° C. for 20 hours while they were stirred, thereby dissolving both the magnesium ions and the aluminum ions in 1,2-dimethoxyethane.

After that, 1.26 ml/of a trifluoroborane-diethylether complex salt (BF$_3$DEE) was added, and was then sufficiently stirred. This corresponds to that a trifluoroborane-diethylether complex salt is added at the ratio of 1.00 mol/l.

<Formation of Positive-Electrode Pellet 2 and Negative-Electrode Active Metal 5>

Firstly, after 2 g of potassium permanganate was added to 50 ml of a hydrochloric acid having a concentration of 4 mol/l, was stirred at room temperature for 15 minutes, and was stationarily left. Then, after a resulting precipitate was filtered out and was then sufficiently rinsed in water, a heating treatment was carried out at 300° C. for two hours, thereby synthesizing a manganese oxide.

Next, the manganese oxide described above, graphite as the coordinate agent, and a poly(vinylidene fluoride) (PVdF) as the binder were mixed at a mass ratio of 78:20:2 with each other. N-methylpyrrolidone (NMP) was added as the solvent to the mixture, poly(vinylidene fluoride) as the binder was dissolved in the mixture, and both a manganese oxide and graphite were dissolved in the resulting liquid solution, thereby obtaining a positive-electrode mixture slurry. A heating treatment was carried out for the resulting slurry at 120° C. for two hours, and thus NMP was vaporized from the slurry to solidify the slurry. The resulting solidified material was pounded into powder in a mortar, thereby obtaining the positive-electrode mixture.

0.1 g of the positive-electrode mixture was weighed, and was thermally compressed to the metallic net supporting body 3 made of nickel at a predetermined pressure to be pressure-molded into a disc-like shape, thereby forming the positive-electrode pellet 2 which was 15.5 mm in diameter and was 250 μm in thickness.

On the other hand, a magnesium plate was pressed to be pressure-molded into a disc-like shape which was 15.5 mm in diameter and was 800 μm in thickness, thereby forming the negative-electrode active material 5.

<Manufacture of Magnesium Battery 10>

The magnesium battery 10 was assembled in the dry room. Firstly, after the positive-electrode pellet 2 was disposed inside the positive-electrode can 1, and the separator 6 made from a fine-porous film made of polyethylene and having a thickness of 25 μm was disposed on the positive-electrode pellet 2, the separator 6 was impregnated with a given amount of the electrolytic liquid 7 to infuse the electrolytic liquid 7 into the separator 6. Next, the magnesium plate as the negative-electrode active material 5 was piled on the separator 6, and the sealing gasket 8 and the negative-electrode cup 4 were disposed in predetermined positions, respectively. Finally, the positive-electrode can 1 and the negative-electrode cup 4 were fitted into each other through the sealing gasket 8, thereby manufacturing the coin type magnesium battery 10 which was 20 mm in outer diameter, and was 1.6 mm in height.

<Discharge Test>

A discharge test was carried out for the magnesium battery 10 of Example 1 manufactured in the manner as described above with a constant current of 0.5 mA until the battery voltage became 0.2 V.

FIG. 2 is a diagram showing a relationship among concentrations of Mg, MeTFS, $TBABF_4$, $AlCl_3$, and $BF_3DEE$ used in the synthesis of the electrolytic solution, the heating temperature, and the discharge capacity of the magnesium battery using the synthesized electrolytic solution in Example 1 of the present invention, and Comparative Example 1 to Example 6, Comparative Example 7-1, and Comparative Example 7-2 which will be described later.

In FIG. 2, and FIG. 3 to FIG. 8 which will be described later, the MeTFS concentration means the concentration of a methyl trifluoromethanesulfonate, the $TBABF_4$ concentration means the concentration of tetrafluoroboric acid tetrabutylammonium, and the $BF_3DEE$ concentration means the concentration of the trifluoroborane-diethylether complex salt.

It is noted that since an excessive amount of metal magnesium is used as the negative-electrode active material 5, the discharge capacity obtained herein can be regarded as being determined by the discharge capacity of the positive-electrode active material, and the performance of the electrolytic solution.

Comparative Examples 1 to 6

In Comparative Examples 1 to 6, the influence of presence or absence of tetrafluoroboric acid tetrabutylammonium, an aluminum chloride, and the trifluoroborane-diethylether complex salt which were used during the manufacture of the electrolytic solution 7 was checked. The magnesium battery having the same structure as that of the magnesium battery 10 shown in FIG. 1 was manufactured similarly to the case of Example 1 except for presence or absence thereof, and the discharge test was carried out about that magnesium battery.

As a result, in each of Comparative Example 2, Comparative Example 3, and Comparative Example 6 each using the electrolytic solution not using tetrafluoroboric acid tetrabutylammonium, the discharge capacity was not obtained at all, or only the very small discharge capacity was obtained. In addition, in each of Comparative Example 1, Comparative Example 4, and Comparative Example 5 each using the electrolytic solution using tetrafluoroboric acid tetrabutylammonium, the large discharge capacity was obtained, but a value of the discharge capacity thus obtained was smaller than that in Example 1.

Comparative Example 7

In Comparative Example 7, a THF solution (having a concentration of 0.25 mol/l) of magnesium dichlorobutylethylaluminate ($Mg[AlCl_2(C_2H_5)(C_4H_9)_2]$ described as the electrolytic solution for the magnesium battery in the Non-Patent Document 1 was used as the electrolytic solution instead of using the electrolytic solution based on the present invention. A magnesium battery having the same structure as that of the magnesium battery 10 was manufactured similarly to the case of Example 1 except for this THF solution. In this case, in Comparative Example 7-1, the magnesium battery was assembled within the dry room similarly to the case of Example 1. On the other hand, in Comparative Example 7-2, the magnesium battery was assembled in an inactive gas ambient atmosphere within an argon gloved box.

Although the discharge test was carried out about each of these magnesium batteries similarly to the case of Example 1, the discharge capacity was not obtained at all in Comparative Example 7-1. The discharge capacity obtained in the battery of Comparative Example 7-2 is shown in FIG. 2.

In each of the batteries of Comparative Example 2, Comparative Example 3, and Comparative Example 6, the discharge capacity was not obtained, or was very small. From this, it is understood that tetrafluoroboric acid tetrabutylammonium as the quaternary ammonium salt is an essential component in the electrolytic solution based on the present invention. In addition, the effective discharge capacity was not obtained in the battery of Comparative Example 7-1. From this, equipment with which the magnesium battery can be assembled in the inactive gas ambient atmosphere such as the argon gloved box is necessary for using magnesium dichlorobutylethylaluminate described in the Non-Patent Document 1.

On the other hand, the batteries of Example 1, Comparative Example 1, Comparative Example 4, Comparative Example 5, and Comparative Example 7-2 showed approximately the equivalent discharge capacities. From a result in Example 5 which will be described later, it is thought that these discharge capacities were mainly determined by the discharge capacity of the positive-electrode active material, and the electrolytic solution exercised its function without a problem. Therefore, in each of batteries of Examples which will be described below, when the discharge capacity approximately compatible either to that of the battery of Example 1, or to that of each of the batteries of Comparative Example 1, Comparative Example 4, Comparative Example 5, and Comparative Example 7-2 was obtained, the electrolytic solution of the battery concerned was judged to be favorable.

Next, a synthesis condition under which the electrolytic solution based on the present invention was favorable in terms of the electrolytic solution of the magnesium battery was examined in Example 2 to Example 6.

Example 2

In Example 2, the concentration of the methyl trifluoromethanesulfonate was changed in the range of 0 mol/l~0.80 mol/l, and thus the electrolytic solution was prepared. The magnesium battery 10 using the electrolytic solution was manufactured similarly to the case of Example 1 except for this respect, and the discharge test was carried out about the magnesium battery 10.

FIG. 3 is a diagram showing a relationship among the concentrations of Mg, MeTFS, $TBABF_4$, $AlCl_3$, and $BF_3DEE$ used in the synthesis of the electrolytic solution, the heating temperature, and the discharge capacity of the magnesium battery using the synthesized electrolytic solution in Comparative Example 2-1, Example 2-1 to Example 2-7, and Example 1 of the present invention.

(A) of FIG. 3 is a numerical table showing the concentrations, heating temperature and discharge capacity described above, and (B) of FIG. 3 is a diagram in which the discharge capacity shown in (A) of FIG. 3 is expressed in the form of a graph. In (A) and (B) of FIG. 3, an axis of ordinate represents the discharge capacity (mAh/g) of the positive-electrode active material, and an axis of abscissa represents the MeTFS concentration (mol/l).

(B) of FIG. 3 is a graph showing a relationship between the concentration of the methyl trifluoromethane sulfonate used in the synthesis of the electrolytic solution in Example 2, and the discharge capacity of the magnesium battery. As can be seen from FIG. 3, when the concentration of the methyl trifluoromethanesulfonate is in the range of 0.40 mol/l~0.60 mol/l (an additive amount of methyl trifluoromethanesulfonate is in the range of 0.80 mol~1.20 mol per 1.00 mol of Mg), the electrolytic solution synthesized in Example 2 is favorable in terms of the electrolytic solution of the magnesium battery 10.

Example 3

In Example 3, the concentration of tetrafluoroboric acid tetrabutylammonium was changed in the range of 0 mol/l~1.20 mol/l, and thus the electrolytic solution was prepared. The magnesium battery 10 was manufactured similarly to the case of Example 1 except for this respect, and the discharge test was carried out about the magnesium battery 10.

Figure 4:
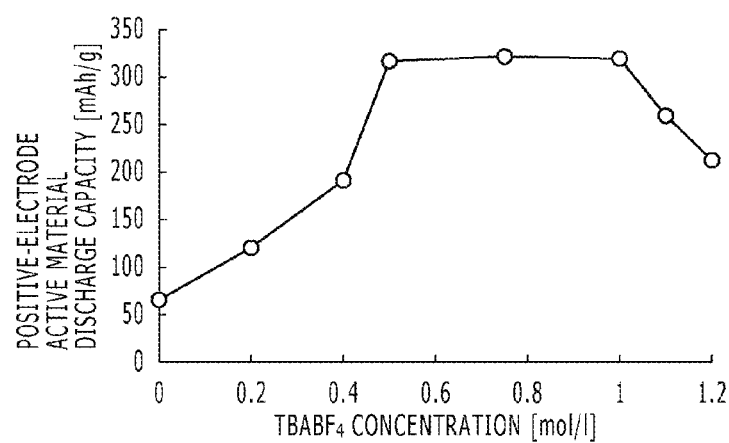
[FIG. 4]

FIG. 4 is a diagram showing a relationship among the concentrations of Mg, MeTFS, TBABF$_4$, AlCl$_3$, and BF$_3$DEE used in the synthesis of the electrolytic solution, the heating temperature, and the discharge capacity of the magnesium battery using the synthesized electrolytic solution in Comparative Example 3-1, Example 3-1 to Example 3-6, and Example 1 of the present invention.

(A) of FIG. 4 is a numerical table showing the concentrations, heating temperature and discharge capacity described above, and (B) of FIG. 4 is a diagram in which the discharge capacity shown in (A) of FIG. 4 is expressed in the form of a graph. In (A) and (B) of FIG. 4, an axis of ordinate represents the discharge capacity (mAh/g) of the positive-electrode active material, and an axis of abscissa represents the TBABF$_4$ concentration (mol/l).

(B) of FIG. 4 is a graph showing a relationship between the concentration of tetrafluoroboric acid tetrabutylammonium used in the synthesis of the electrolytic solution in Example 3, and the discharge capacity of the magnesium battery. As can be seen from FIG. 4, when the concentration of tetrafluoroboric acid tetrabutylammonium is in the range of 0.50 mol/l~1.00 mol/l (an additive amount of tetrafluoroboric acid tetrabutylammonium is in the range of 1.00 mol~2.00 mol per 1.00 mol of Mg), the electrolytic solution synthesized in Example 3 is favorable in terms of the electrolytic solution of the magnesium battery 10.

Example 4

In Example 4, the concentration of an aluminum chloride was changed in the range of 0 mol/l~1.00 mol/l, and thus the electrolytic solution was prepared. The magnesium battery 10 was manufactured similarly to the case of Example 1 except for this respect, and the discharge test was carried out about the magnesium battery 10.

Figure 5:
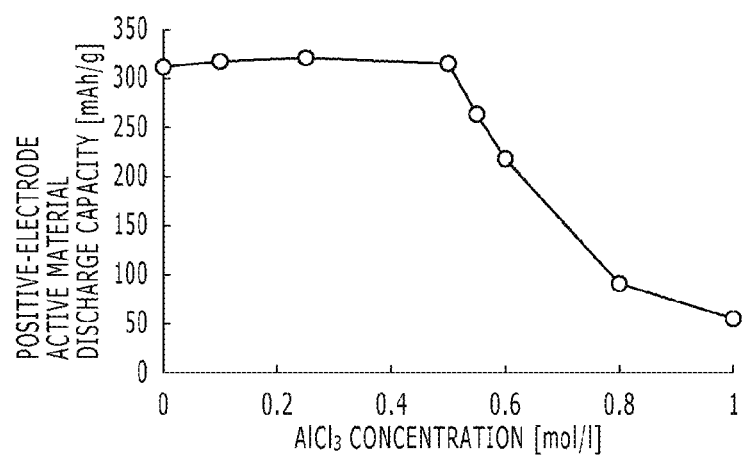
[FIG. 5]

FIG. 5 is a diagram showing a relationship among the concentration of Mg, MeTFS, TBABF$_4$, AlCl$_3$, and BF$_3$DEE used in the synthesis of the electrolytic solution, the heating temperature, and the discharge capacity of the magnesium battery using the synthesized electrolytic solution in Example 4-1 to Example 4-7, and Example 1 of the present invention.

(A) of FIG. 5 is a numeral table showing the concentrations, heating temperatures and discharge capacity described above, and (B) of FIG. 5 is a diagram in which the discharge capacity shown in (A) of FIG. 5 is expressed in the form of a graph. In (A) and (B) of FIG. 5, an axis of ordinate represents the discharge capacity (mAh/g) of the positive-electrode active material, and an axis of abscissa represents the AlCl$_3$ concentration (mol/l).

(B) of FIG. 5 is a graph showing a relationship between the concentration of the aluminum chloride used in the synthesis of the electrolytic solution in Example 4, and the discharge capacity of the magnesium battery. As can been from FIG. 5, when the concentration of the aluminum chloride is equal to or less than 0.50 mol/l (an additive amount of aluminum chloride is equal to or less than 1.00 mol per 1.00 mol of Mg), the electrolytic solution synthesized in Example 4 is favorable in terms of the electrolytic solution of the magnesium battery 10.

Example 5

In Example 5, the concentration of magnesium was changed in the range of 0.10 mol/l~1.50 mol/l, and thus the electrolytic solution was prepared. In this case, the electrolytic solution was prepared in such a way that each of the concentrations of the methyl trifluoromethanesulfonate and the aluminum chloride was made equal to that of Mg, and each of the concentrations of tetrafluoroboric acid tetrabutylammonium and the trifluoroborane-diethylether complex salt became twice that of magnesium. The magnesium battery 10 was manufactured similarly to the case of Example 1 except for this respect, and the discharge test was carried out about the magnesium battery 10.

Figure 6:
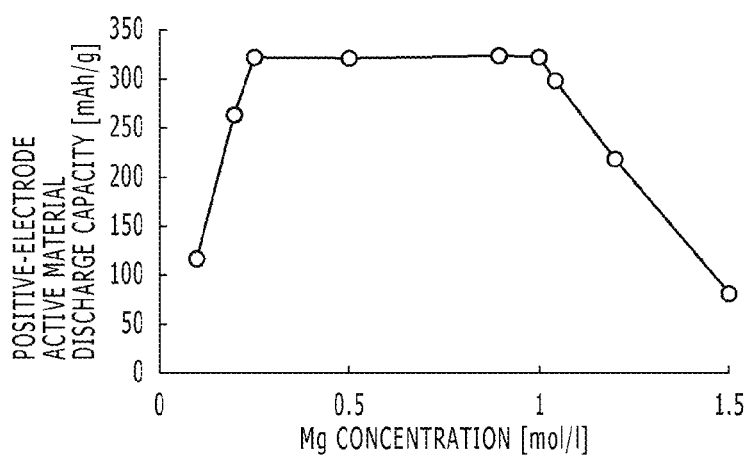
[FIG. 6]

FIG. 6 is a diagram showing a relationship among the concentrations of Mg, MeTFS, TBABF$_4$, AlCl$_3$, and BF$_3$DEE used in the synthesis of the electrolytic solution, the heating temperature, and the discharge capacity of the magnesium battery using the synthesized electrolytic solution in Example 5-1 to Example 5-9 of the present invention.

(A) of FIG. 6 is a numeral table showing the concentrations, heating temperatures and discharge capacity described above, and (B) of FIG. 6 is a diagram in which the discharge capacity shown in (A) of FIG. 6 is expressed in the form of a graph. In (A) and (B) of FIG. 6, an axis of ordinate represents the discharge capacity (mAh/g) of the positive-electrode active material, and an axis of abscissa represents the Mg concentration (mol/l).

(B) of FIG. 6 is a graph showing a relationship between the concentrations of Mg used in the synthesis of the electrolytic solution in Example 5, and the discharge capacity of the magnesium battery. It is understood from FIG. 6 that the discharge capacity increases approximately in proportion to the concentration of Mg in a region in which the concentration of Mg is in the range of 0 mol/l~0.25 mol/l, and thereafter, the discharge capacity is held approximately at a given value of about 320 (mAh/g) in a region in which the concentration of Mg is in the range of 0.25 mol/l~1.00 mol/1.

As the cause for this, it is thought that when the concentration of Mg is in the range of 0 mol/l~0.25 mol/l, the discharge capacity of the magnesium battery is limited by the Mg concentration of the electrolytic solution, and thus the Mg concentration of the electrolytic solution is insufficient. On the other hand, it is thought that when the concentration of Mg is in the range of 0.25 mol/l~1.00 mol/l, since the Mg concentration of the electrolytic solution is sufficiently much, the discharge capacity of the magnesium battery does not depend on the Mg concentration, and thus the discharge capacity is mainly determined by the discharge capacity of the positive-electrode active material.

Therefore, in the magnesium battery 10 of Example 5, it can be thought that the Mg concentration with which the discharge capacity reaches 320 (mAh/g) is in the range of 0.25 mol/l~1.00 mol/l, the electrolytic solution exercises its function without a problem.

Example 6

In Example 6, the heating temperature when the electrolytic solution was synthesized was changed in the range of 20° C.~90° C., and the magnesium battery 10 was manufactured similarly to the case of Example 1 except for this respect. Thus, the discharge test was carried out about the magnesium battery 10.

Figure 7:
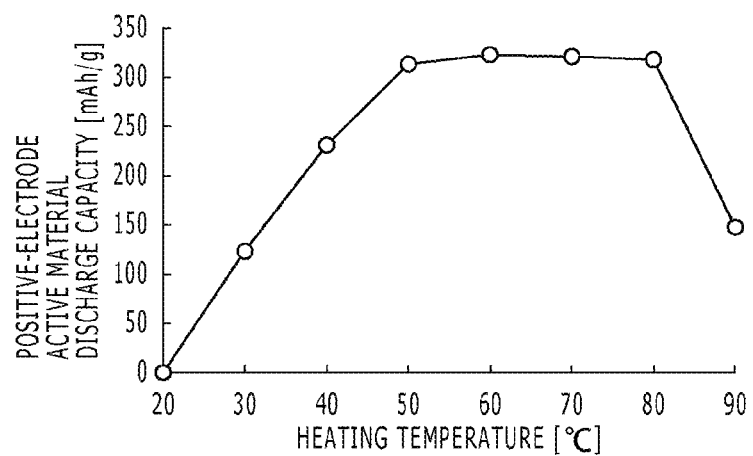
[FIG. 7]

FIG. 7 is a diagram showing a relationship among the concentrations of Mg, MeTFS, TBABF$_4$, AlCl$_3$, and BF$_3$DEE used in the synthesis of the electrolytic solution, the heating temperature, and the discharge capacity of the magnesium battery using the synthesized electrolytic solution in Example 6-1 to Example 6-7, and Example 1 of the present invention.

(A) of FIG. 7 is a numeral table showing the concentrations, heating temperatures and discharge capacity described above, and (B) of FIG. 7 is a diagram in which the discharge capacity shown in (A) of FIG. 7 is expressed in the form of a graph. In (A) and (B) of FIG. 7, an axis of ordinate represents the discharge capacity (mAh/g) of the positive-electrode active material, and an axis of abscissa represents the heating temperature (° C.).

(B) of FIG. 7 is a graph showing a relationship between the heating temperature when the electrolytic solution was synthesized in Example 6, and the discharge capacity of the magnesium battery of the battery manufactured by using that electrolytic solution. As shown in FIG. 7, it is understood that the electrolytic solution synthesized in Example 6 shows the favorable discharge capacity when the heating temperature is in the range of 50° C.~80° C.

Example 7

In Example 7, the concentration of the trifluoroborane-dimethylether complex salt was changed in the range of 0 mol/l~2.50 mol/l, and thus the electrolytic solution was prepared. The magnesium battery 10 was manufactured similarly to the case of Example 1 except for this respect, and the discharge test was carried out about the magnesium battery 10.

Figures 8, 9:
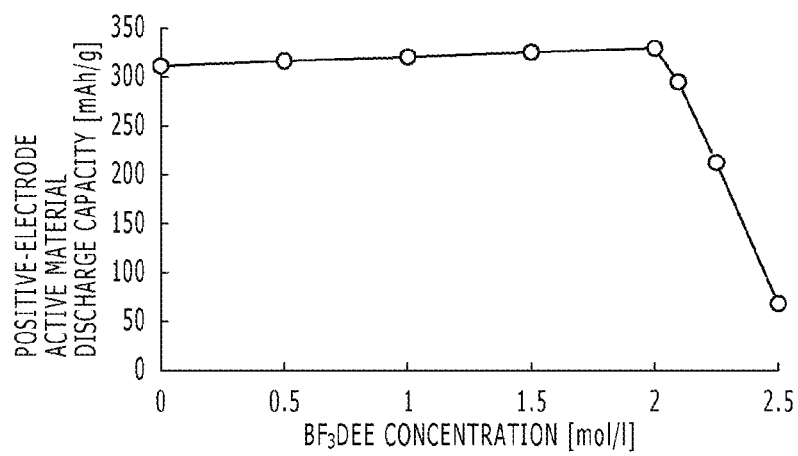
[FIG. 8]
[FIG. 9]

FIG. 8 is a diagram showing a relationship among the concentrations of Mg, MeTFS, TBABF$_4$, AlCl$_3$, and BF$_3$DEE used in the synthesis of the electrolytic solution, the heating temperature, and the discharge capacity of the magnesium battery using the synthesized electrolytic solution in Example 7-1 to Example 7-7, and Example 1 of the present invention.

(A) of FIG. 8 is a numerical table showing the concentrations, heating temperature and discharge capacity described above, and (B) of FIG. 8 is a diagram in which the discharge capacity shown in (A) of FIG. 8 is expressed in the form of a graph. In (A) and (B) of FIG. 8, an axis of ordinate represents the discharge capacity (mAh/g) of the positive-electrode active material, and an axis of abscissa represents the BF$_3$DEE concentration (mol/l).

(B) of FIG. 8 is a graph showing a relationship between the concentration of the trifluoroborane-dimethylether complex salt used in the synthesis of the electrolytic solution in Example 7, and the discharge capacity of the magnesium battery. As can be seen from FIG. 8, when the concentration of the trifluoroborane-dimethylether complex salt is equal to or less than 2.00 mol/l (the additive amount of trifluoroborane-dimethylether complex salt is equal to or less than 4.00 mol per 1.00 mol of Mg), the electrolytic solution synthesized in Example 7 is favorable in terms of the electrolytic solution of the magnesium battery 10.

Example 8

In example 8, the electrolytic solution was prepared by using the ethyl trifluoromethanesulfonate as the alkyl trifluoromethanesulfonate instead of using the methyl trifluoromethanesulfonate. The magnesium battery 10 was manufactured similarly to the case of Example 1 except for this respect, and the discharge test was carried out about the magnesium battery 10.

FIG. 9 is a diagram showing the discharge capacity of the magnesium battery using the electrolytic solution, in Example 8 of the present invention, which was synthesized by changing the kind of alkyl trifluoromethanesulfonate in Example 1. It is noted that in FIG. 9, RTFS means the kind of alkyl trifluoromethanesulfonate.

As shown in FIG. 9, even when the nonaqueous electrolytic solution containing therein the magnesium ions based on the present invention is manufactured by using any of the kinds of alkyl trifluoromethanesulfonates, with regard to the discharge capacity, the nonaqueous electrolytic solution containing therein the magnesium ions based on the present invention shows approximately the same performance.

Example 9

In Example 9, trifluoromethanesulfonic acid tetrabutylammonium, trifluoromethanesulfonic acid tributylmethylammonium, trifluoromethanesulfonic acid triethylmethylammonium, tetrafluoroboric acid tributylmethylammonium, tetrafluoroboric acid triethylmethylammonium, tetrabutylammoniumbis(trifluoromethanesulfonyl)imide, tributylmethylammoniumbis(trifluoromethanesulfonyl)imide, or triethylmethylammoniumbis(trifluoromethanesulfonyl)imide was used as the quaternary ammonium salt instead of using tetrafluoroboric acid tetrabutylammonium.

The electrolytic solution was prepared similarly to the case of Example 1 except for the kinds of quaternary ammonium salts, and the magnesium battery 10 was manufactured. Thus, the discharge test was carried out about the magnesium battery 10.

FIG. 10 is a diagram showing the discharge capacities of the magnesium batteries using the electrolytic solutions synthesized by changing the kind of quaternary ammonium salt of Example 1 in Example 9-1 to Example 9-8 of the present invention.

As shown in FIG. 10, even when the nonaqueous electrolytic solution containing therein the magnesium ions based on the present invention was manufactured by using any of the quaternary ammonium salts described above, with regard to the discharge capacity, the nonaqueous electrolytic solutions each containing therein the magnesium ions based on the present invention show approximately the same performance.

Example 10

In Example 10, a trifluoroborane-dimethyl ether complex salt, a trifluoroborane-ethyl methyl ether complex salt, a trifluoroborane-n-dibutyl ether complex salt, and a trifluoroborane-tetrahydrofuran complex salt were used as the trifluoroborane-ether complex salt instead of using the trifluoroborane-diethylether complex salt.

The electrolytic solution was prepared similarly to the case of Example 1 except for the kind of trifluoroborane-ether complex salt, and the magnesium battery 10 was manufactured by using that electrolytic solution thus prepared. Thus, the discharge test was carried out about the magnesium battery 10.

FIG. 11 is a diagram showing the discharge capacities of the magnesium batteries using the electrolytic solutions synthesized by changing the kind of trifluoroborane-ether complex salt of Example 1 in Example 10-1 to Example 10-4 of the present invention.

As shown in FIG. 11, even when the nonaqueous electrolytic solution containing therein the magnesium ions based on the present invention was manufactured by using any of the trifluoroborane-ether complex salts described above, with regard to the discharge capacity, the nonaqueous electrolytic solutions each containing therein the magnesium ions based on the present invention show approximately the same performance.

As shown in Comparative Example 7, the THF solution of the magnesium dichlorobutylethylaluminate described as the electrolytic solution for the magnesium battery in the Non-Patent Document 1 needs to be treated in the inactive gas ambient atmosphere within the argon gloved box. On the other hand, the nonaqueous electrolytic solution containing therein the magnesium ions based on the present invention can be treated within the dry room as the general equipment.

In addition, it is better that as shown in Example 2 to Example 7, metal magnesium is added at the ratio of 0.25 mol/l to 1.00 mol/l to 1,2-dimethoxyethane as the solvent, methyl trifluoromethanesulfonate, an aluminum chloride, and tetrafluoroboric acid tetrabutylammonium are added at the ratio of 0.80 mol~1.20 mol, at the ratio of 1.00 mol or less, and at the ratio of 1.00 mol~2.00 mol per 1.00 mol of magnesium, and they are made to react with one another at 50° C.~80° C. while they are stirred, and thereafter, more preferably, 4.00 mol or less of the trifluoroborane-diethylether complex salt per 1 mol of magnesium is added thereto.

The nonaqueous electrolytic solution containing therein the magnesium ions of Example 10, and the method of manufacturing the same are simpler than the conventional method because the solvent itself of the electrolytic solution is used in the synthesis. In addition, since metal magnesium and the magnesium salts, and other stable materials are used as the starting materials, the management of the row materials is easy, and thus the nonaqueous electrolytic solution containing therein the magnesium ions can be manufactured at high productivity and in the high yield with the simple equipment such as the dry room. That is to say, the nonaqueous electrolytic solution containing therein the magnesium ions has a possibility that the manufacturing cost when the electrolytic solution is put into practical use as the product is greatly reduced.

Next, a description will be given with respect to complexes which are thought to be contained in the electrolytic solutions synthesized in Examples described above. Some structures of the complexes which are thought to be generated in the nonaqueous electrolytic solution containing therein the magnesium ions are considered, and examples thereof will be described hereinafter.

FIG. 12 is a view showing examples of structures of complexes which are thought to be contained in the synthesized electrolytic solution in Example 1 of the present invention.

(A) of FIG. 12 shows an example of a structure of a complex [MgMeTFS(DME)] which is thought to be generated in the electrolytic solution when in the synthesis of the electrolyte, a methyl trifluoromethanesulfonate (MeTFS) is used as an alkyl trifluoromethanesulfonate, tetrafluoroboric acid tetrabutylammonium (TBABF$_4$) is used as the quaternary ammonium salt, 1,2-dimethoxyethane(DME) is used as the ether system organic solvent, and a trifluoroborane-diethylether complex salt (BF$_3$DEE) is used as the trifluoroborane-ether complex salt.

(B) of FIG. 12 shows an atomic arrangement of a tetrabutylammonium ion ($[N(CH_2CH_2CH_2CH_3)_4]^+$) abbreviated to $[TBA]^+$ in the form of a molecule model and a chemical formula, (C) of FIG. 12 shows an atomic arrangement of a tetrafluoroboric acid ion abbreviated to $[BF_4]^-$ in the form of a molecule model and a chemical formula, (D) of FIG. 12 shows an atomic arrangement of 1,2-dimethoxyethane ($CH_3OCH_2CH_2OCH_3$) abbreviated to DME in the form of a molecule model and a chemical formula, (E) of FIG. 12 shows an atomic arrangement of a methyl trifluoromethanesulfonate ($CF_3SO_3CH_3$) abbreviated to MeTFS in the form of a molecule model and a chemical formula, (F) of FIG. 12 shows an atomic arrangement of a trifluoromethane-sulfonate ion ($[CF_3SO_3]^-$) in the form of a molecule model and a chemical formula.

From a nuclear magnetic resonance absorption spectrum and a near edge X-ray absorption fine structure spectrum, like the example shown in (A) of FIG. 12, the complex [MgMeTFS(DME)] is through to have a structure that a carbon atom of a methyl ion (Me$^+$), an oxygen ion of a trifluoromethanesulfonate ion ($[TFS]^-$), and an oxygen ion of 1,2-dimethoxyethane (DME) are coordinate-bonded to a Mg atom.

DME forms together with the Mg ion the coordinate bond, thereby dissolving therein the Mg ion, and the Mg ion forms the complex [MgMeTFS(DME)] as shown in (A) of FIG. 12. Also, the complex [MgMeTFS(DME)] is in a state of dissociation equilibrium, and the Mg ion is in a state of being dissolved in DME as the ether system organic solvent.

Example 11

In Example 11, the coin type magnesium battery 10 shown in FIG. 1 was manufactured by using metal magnesium as the negative-electrode active material 5, by using the magnesium oxide as the positive-electrode active material, and by using the electrolytic solution based on the present invention. Thus, the performance of the electrolytic solution was examined.

<Synthesis of Nonaqueous Electrolytic Solution Containing Magnesium Ions>

0.12 g of metal magnesium was added to 10 ml of 1,2-dimethoxyethane (DME). In addition, 0.55 ml of methyl trifluoromethanesulfonate (MeTFS), 2.93 g of 1-ethyl-3-methylimidazoliumbis(trifluoromethanesulfonyl)imide (EMITFSI), and 0.33 g of an aluminum chloride were added thereto. This corresponds to that metal magnesium, methyl trifluoromethanesulfonate, 1-ethyl-3-methylimidazoliumbis (trifluoromethanesulfonyl)imide, and an aluminum chloride were added at the ratio of 0.50 mol/l, at the ratio of 0.50 mol/l, at the ratio of 0.75 mol/l, and at the ratio of 0.25 mol/l to 1,2-dimethoxyethane. The heating treatment was carried out at 60° C. for 20 hours while they were stirred, thereby dissolving both the magnesium ions and the aluminum ions in 1,2-dimethoxyethane.

After that, 1.26 ml of a trifluoroborane-diethylether complex salt (BF$_3$DEE) was added and was then sufficiently stirred. This corresponds to that a trifluoroborane-diethylether complex salt was added at the ratio of 1.00 mol/l.

<Formation of Positive-Electrode Pellet 2 and Negative-Electrode Active Material 5>

Firstly, 2 g of potassium permanganate was added to 50 ml of a hydrochloric acid having a concentration of 4 mol/l, was stirred at room temperature for 15 minutes, and was stationarily left. After a resulting precipitate was filtered out and was sufficiently rinsed in water, the heating treatment was carried out at 300° C. for two hours, thereby synthesizing a manganese oxide.

Next, the manganese oxide described above, graphite as the coordinate agent, and a poly(vinylidene fluoride) (PVdF) as the binder were mixed at a mass ratio of 78:20:2 with each other. N-methylpyrrolidone (NMP) was added as the solvent to the mixture, a poly(vinylidene fluoride) as the binder was dissolved in the mixture, and a manganese oxide and graphite were both dissolved in the resulting liquid solution, thereby obtaining a positive-electrode mixture slurry. A heating treatment was carried out for the resulting slurry at 120° C. for two hours, and thus NMP was vaporized from the slurry to solidify the slurry. The resulting solidified material was pounded into powder in a mortar, thereby obtaining the positive-electrode mixture.

0.1 g of the positive-electrode mixture was weighed, and was thermally compressed to the metallic net supporting body 3 made of nickel at a predetermined pressure to be pressure-molded into a disc-like shape, thereby forming the positive-electrode pellet 2 which was 15.5 mm in diameter and 250 μm in thickness.

On the other hand, a magnesium plate was processed to be pressure-molded into a disc-like shape which was 15.5 mm in diameter and was 800 μm in thickness, thereby forming the negative-electrode active material 5.

<Manufacture of Magnesium Battery 10>

The magnesium battery 10 was assembled in the dry room. Firstly, after the positive-electrode pellet 2 was disposed inside the positive-electrode can 1, and the separator 6 made from a fine porous film made of polyethylene, and having a thickness of 25 μm was disposed on the positive-electrode pellet 2, the separator 6 was impregnated with a given amount of electrolytic liquid 7 to infuse the electrolytic liquid 7 into the separator 6. Next, the magnesium plate as the negative-electrode active material 5 was piled on the separator 6, and the sealing gasket 8 and the negative-electrode cup 4 were disposed in predetermined positions, respectively. Finally, the positive-electrode can 1 and the negative-electrode cup 4 were fitted into each other through the sealing gasket 8, thereby manufacturing the coin type magnesium battery 10 which was 20 mm in outer diameter, and was 1.6 mm in height.

<Discharge Test>

A discharge test was carried out about the magnesium battery 10 of Example 11 manufactured in the manner as described above with a constant current of 0.5 mA until the battery voltage became 0.2 V FIG. 13 is a diagram showing a relationship among a concentrations of Mg, MeTFS, EMITFSI, AlCl$_3$, and BF$_3$DEE used in the synthesis of the electrolytic solution, the heating temperature, and the discharge capacity of the magnesium battery using the synthesized electrolytic solution in Example 11 of the present invention, and Comparative Example 8 to Comparative Example 13, Comparative Example 14-1, and Comparative Example 14-2 which will be described later.

In FIG. 13, and FIG. 14 to FIG. 19 which will be described later, the MeTFS concentration means the concentration of a methyl trifluoromethanesulfonate, the EMITFSI concentration means the concentration of 1-ethyl-3-methylimidazoliumbis(trifluoromethanesulfonyl)imide, and the BF$_3$DEE concentration means the concentration of trifluoroborane-diethylether complex salt.

It is noted that since an excessive amount of metal magnesium is used as the negative-electrode active material 5, the discharge capacity obtained herein can be regarded as being determined by the discharge capacity of the positive-electrode active material, and the performance of the electrolytic solution.

Comparative Examples 8 to 13

In Comparative Examples 8 to 13, the influence of presence or absence of 1-ethyl-3-methylimidazoliumbis(trifluoromethanesulfonyl)imide, an aluminum chloride, and the trifluoroborane-diethylether complex salt which were used during the manufacture of the electrolytic solution 7 was checked. The magnesium battery having the same structure as that of the magnesium battery 10 shown in FIG. 1 was manufactured similarly to the case of Example 11 except for presence or absence thereof, and the discharge test was carried out about the magnesium battery.

As a result, in each of Comparative Example 9, Comparative Example 10, and Comparative Example 13 each using the electrolytic solution not using 1-ethyl-3-methylimidazoliumbis(trifluoromethanesulfonyl)imide, the discharge capacity was not obtained at all, or only the very small discharge capacity was obtained. In addition, in each of Comparative Example 8, Comparative Example 11, and Comparative Example 12 each using the electrolytic solution using 1-ethyl-3-methylimidazoliumbis(trifluoromethanesulfonyl) imide, the large discharge capacity was obtained, but a value of the discharge capacity thus obtained was smaller than that in Example 11.

Comparative Example 14

In Comparative Example 14, a THF solution (having a concentration of 0.25 mol/l) of magnesium dichlorobutylethylaluminate (Mg[AlCl$_2$(C$_2$H$_5$)(C$_4$H$_9$)$_2$] described as the electrolytic solution for the magnesium battery in the Non-Patent Document 1 was used as the electrolytic solution instead of using the electrolytic solution based on the present invention. A magnesium battery having the same structure as that of the magnesium battery 10 was manufactured similarly to the case of Example 11 except for this THF solution. In this case, in Comparative Example 14-1, the magnesium battery was assembled within the dry room similarly to the case of Example 11. On the other hand, in Comparative Example 14-2, the magnesium battery was assembled in an inactive gas ambient atmosphere within an argon gloved box.

Although the discharge test was carried out about each of these magnesium batteries similarly to the case of Example 11, the discharge capacity was not obtained at all in Comparative Example 14-1. The discharge capacity obtained in the battery of Comparative Example 14-2 is shown in FIG. 13.

In each of the batteries of Comparative Example 9, Comparative Example 10, and Comparative Example 13, the discharge capacity was not obtained, or was very small. From this, it is understood that 1-ethyl-3-methylimidazoliumbis (trifluoromethanesulfonyl)imide as a 1,3-alkylmethylimidazolium salt is an essential component in the electrolytic solution based on the present invention. In addition, the effective discharge capacity was not obtained in the battery of Comparative Example 14-1. From this, the equipment with which the magnesium battery can be assembled in the inactive gas ambient atmosphere such as the argon gloved box is necessary for using magnesium dichlorobutylethylaluminate described in the Non-Patent Document 1.

On the other hand, the batteries of Example 11, Comparative Example 8, Comparative Example 11, Comparative Example 12, and Comparative Example 14-2 showed approximately equivalent discharge capacities. From a result in Example 15 which will be described later, it is thought that these discharge capacities were mainly determined by the discharge capacity of the positive-electrode active material, and the electrolytic solution exercised its function without a problem. Therefore, in batteries of Examples which will be described below, when the discharge capacity approximately compatible to that of the battery of Example 11, or that of each of the batteries of Comparative Example 8, Comparative Example 11, Comparative Example 12, and Comparative Example 14-2 was obtained, the electrolytic solution of the battery concerned was judged to be favorable.

Next, a synthesis condition under which the electrolytic solution based on the present invention was favorable in terms of the electrolytic solution of the magnesium battery was examined in Example 12 to Example 16.

Example 12

In Example 12, the electrolytic solution was prepared by changing the concentration of the methyl trifluoromethanesulfonate in the range of 0 mol/l~0.80 mol/l. The magnesium battery 10 was manufactured similarly to the case of Example 11 except for this respect, and the discharge test was carried out about the magnesium battery 10.

Figure 14:
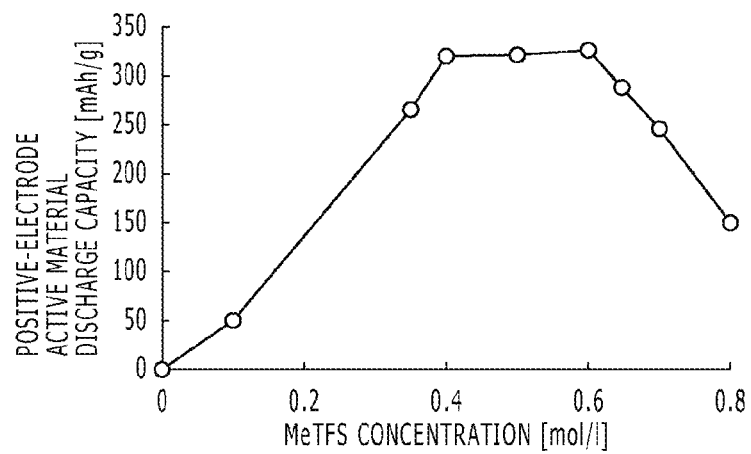
[FIG. 14]

FIG. 14 is a diagram showing a relationship among the concentrations of Mg, MeTFS, EMITFSI, $AlCl_3$, and $BF_3DEE$ used in the synthesis of the electrolytic solution, the heating temperature, and the discharge capacity of the magnesium battery using the synthesized electrolytic solution in Comparative Example 9-1, Example 12-1 to Example 12-7, and Example 11 of the present invention.

(A) of FIG. 14 is a numerical table showing the concentrations, heating temperature and discharge capacity described above, and (B) of FIG. 14 is a diagram in which the discharge capacity shown in (A) of FIG. 14 is expressed in the form of a graph. In (A) and (B) of FIG. 14, an axis of ordinate represents the discharge capacity (mAh/g) of the positive-electrode active material, and an axis of abscissa represents the MeTFS concentration (mol/l).

(B) of FIG. 14 is a graph showing a relationship between the concentration of the methyl trifluoromethanesulfonate used in the synthesis of the electrolytic solution in Example 12, and the discharge capacity of the magnesium battery. As can be seen from FIG. 14, when the concentration of the methyl trifluoromethanesulfonate is in the range of 0.40 mol/l~0.60 mol/l (an additive amount of methyl trifluoromethanesulfonate is in the range of 0.80 mol 1.20 mol per 1.00 mol of Mg), the electrolytic solution synthesized in Example 12 is favorable in terms of the electrolytic solution of the magnesium battery 10.

Example 13

In Example 13, the electrolytic solution was adjusted by changing the concentration of 1-ethyl-3-methylimidazolium-bis(trifluorosulfonyl)imide in the range of 0 mol/l~1.20 mol/l, and the magnesium battery 10 was manufactured similarly to the case of Example 11 except for this respect. Thus, the discharge test was carried out about the magnesium battery 10.

Figure 15:
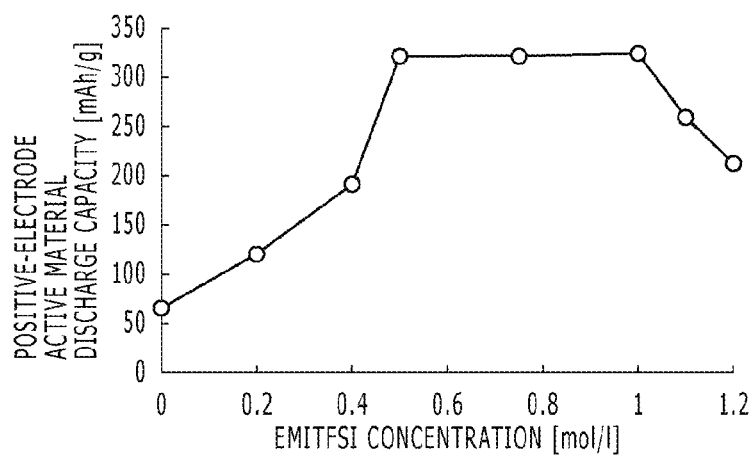
[FIG. 15]

FIG. 15 is a diagram showing a relationship among the concentrations of Mg, MeTFS, EMITFSI, $AlCl_3$, and $BF_3DEE$, the heating temperature, and the discharge capacity of the magnesium battery using the synthesized electrolytic solution in Comparative Example 10-1, Example 13-1 to Example 13-6, and Example 11 of the present invention.

(A) of FIG. 15 is a numerical table showing the concentrations, heating temperature and discharge capacity described above, and (B) of FIG. 15 is a diagram in which the discharge capacity shown in (A) of FIG. 15 is expressed in the form of a graph. In (A) and (B) of FIG. 15, an axis of ordinate represents the discharge capacity (mAh/g) of the positive-electrode active material, and an axis of abscissa represents the EMITFSI concentration (mol/l).

(B) of FIG. 15 is a graph showing a relationship of the concentration of 1-ethyl-3-methylimidazoliumbis(trifluoromethanesulfonyl)imide, and the discharge capacity of the magnesium battery. As can be seen from FIG. 15, when the concentration of 1-ethyl-3-methylimidazoliumbis(trifluorosulfonyl)imide is in the range of 0.50 mol/l~1.00 mol/l (an additive amount of 1-ethyl-3-methylimidazoliumbis(trifluoromethanesulfonyl)imide is in the range of 1.00 mol~2.00 mol per 1.00 mol of Mg), the electrolytic solution synthesized in Example 13 is favorable in terms of the electrolytic solution of the magnesium battery 10.

Example 14

In Example 14, the electrolytic solution was adjusted by changing the concentration of an aluminum chloride in the range of 0 mol/l~1.00 mol/l, and the magnesium battery 10 was manufactured similarly to the case of Example 11 except for this respect. Thus, the discharge test was carried out about the magnesium battery 10.

Figure 16:
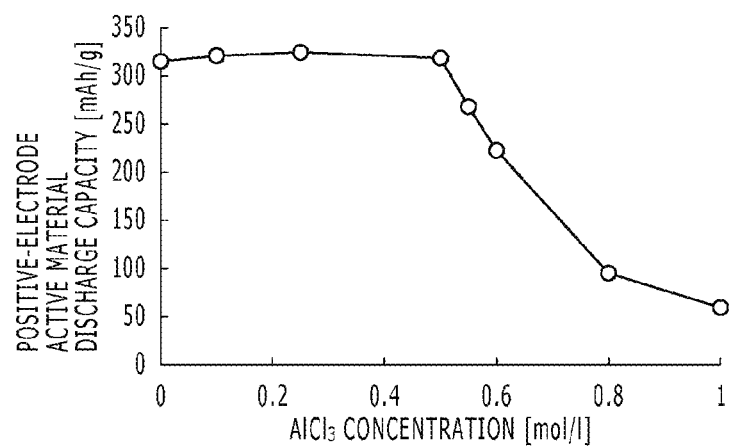
[FIG. 16]

FIG. 16 is a diagram showing a relationship among the concentrations of Mg, MeTFS, EMITFSI, $AlCl_3$, and $BF_3DEE$, the heating temperature, and the discharge capacity of the magnesium battery using the synthesized electrolytic solution in Example 14-1 to Example 14-7, and Example 11 of the present invention.

(A) of FIG. 16 is a numerical table showing the concentrations, heating temperature and discharge capacity described above, and (B) of FIG. 16 is a diagram in which the discharge capacity shown in (A) of FIG. 16 is expressed in the form of a graph. In (A) and (B) of FIG. 16, an axis of ordinate represents the discharge capacity (mAh/g) of the positive-electrode active material, and an axis of abscissa represents the $AlCl_3$ concentration (mol/l).

(B) of FIG. 16 is a graph showing a relationship of the concentration of an aluminum chloride used in the synthesis of the electrolytic solution in Example 14, and the discharge capacity of the magnesium battery. As can be seen from FIG. 16, when the concentration of the aluminum chloride is in the range of equal to or less than 0.50 mol/l (an additive amount of aluminum chloride is equal to or less than 1.00 mol per 1.00 mol of Mg), the electrolytic solution synthesized in Example 14 is favorable in terms of the electrolytic solution of the magnesium battery 10.

Example 15

In Example 15, the electrolytic solution was adjusted by changing the concentration of Mg in the range of 0.10 mol/

1~1.50 mol/l. In this case, the electrolytic solution was prepared in such a way that each of the concentrations of the methyl trifluoromethanesulfonate and the aluminum chloride was equal to that of Mg, and each of the concentrations of tetrafluoroboric acid tetrabutylammonium and the trifluoroborane-diethylether complex salt became twice that of magnesium. The magnesium battery 10 was manufactured similarly to the case of Example 11 except for this respect, and the discharge test was carried out about the magnesium battery 10.

Figure 17:
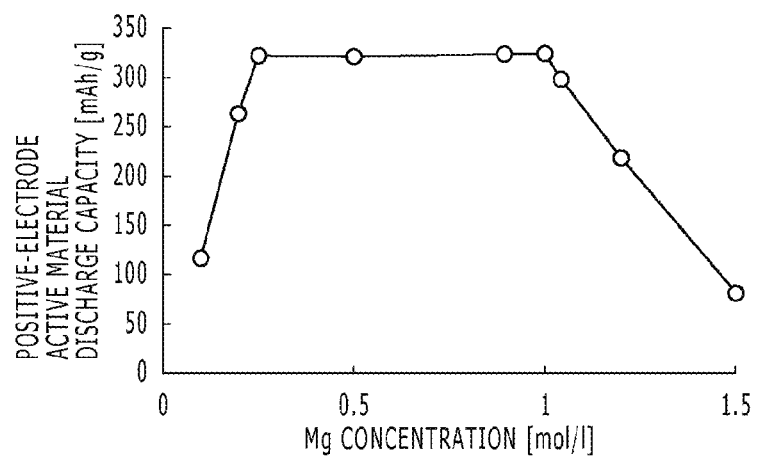
[FIG. 17]

FIG. 17 is a diagram showing a relationship among the concentrations of Mg, MeTFS, EMITFSI, $AlCl_3$, and $BF_3DEE$ used in the synthesis of the electrolytic solution, the heating temperature, and the discharge capacity of the magnesium battery using the synthesized electrolytic solution in Example 15-1 to Example 15-9 of the present invention.

(A) of FIG. 17 is a numeral table showing the concentrations, heating temperatures and discharge capacity described above, and (B) of FIG. 17 is a diagram in which the discharge capacity shown in (A) of FIG. 17 is expressed in the form of a graph. In (A) and (B) of FIG. 17, an axis of ordinate represents the discharge capacity (mAh/g) of the positive-electrode active material, and an axis of abscissa represents the Mg concentration (mol/l).

(B) of FIG. 17 is a graph showing a relationship between the concentration of Mg used in the synthesis of the electrolytic solution in Example 15, and the discharge capacity of the magnesium battery. It is understood from FIG. 17 that the discharge capacity increases approximately in proportion to the concentration of Mg in a region in which the concentration of Mg is in the range of 0 mol/l~0.25 mol/l, and thereafter, the discharge capacity is held approximately at a given value of about 320 (mAh/g) in a region in which the concentration of Mg is in the range of 0.25 mol/l~1.00 mol/l.

As the cause for this, it is thought that when the concentration of Mg is in the range of 0 mol/l~0.25 mol/l, the discharge capacity of the magnesium battery is limited by the Mg concentration of the electrolytic solution, and thus the Mg concentration of the electrolytic solution is insufficient. On the other hand, it is thought that when the concentration of Mg is in the range of 0.25 mol/l~1.00 mol/l, since the Mg concentration of the electrolytic solution is sufficiently much, the discharge capacity of the magnesium battery does not depend on the Mg concentration, and thus the discharge capacity is mainly determined by the discharge capacity of the positive-electrode active material.

Therefore, in the magnesium battery 10 of Example 15, it can be thought that the Mg concentration with which the discharge capacity reaches 320 (mAh/g) is in the range of 0.25 mol/l~1.00 mol/l, the electrolytic solution exercises its function without a problem.

Example 16

In Example 16, the heating temperature when the electrolytic solution was synthesized was changed in the range of 20° C.~90° C., and the magnesium battery 10 was manufactured similarly to the case of Example 11 except for this respect. Thus, the discharge test was carried out about the magnesium battery 10.

Figure 18:
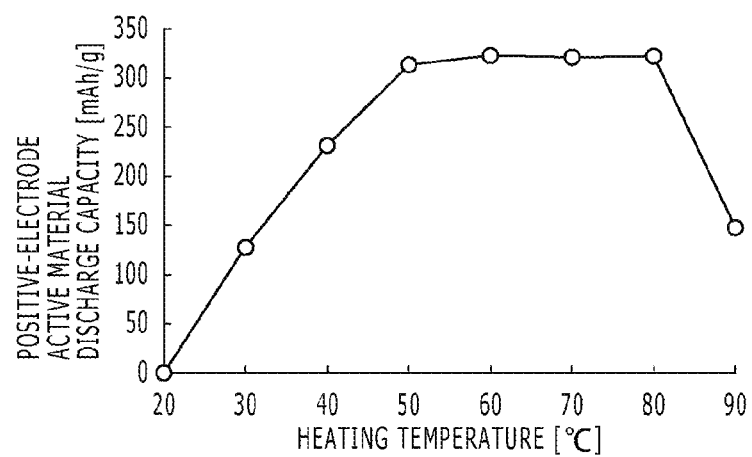
[FIG. 18]

FIG. 18 is a diagram showing a relationship among the concentrations of Mg, MeTFS, EMITFSI, $AlCl_3$, and $BF_3DEE$ used in the synthesis of the electrolytic solution, the heating temperature, and the discharge capacity of the magnesium battery using the synthesized electrolytic solution in Example 16-1 to Example 16-7, and Example 11 of the present invention.

(A) of FIG. 18 is a numeral table showing the concentrations, heating temperatures and discharge capacity described above, and (B) of FIG. 18 is a diagram in which the discharge capacity shown in (A) of FIG. 18 is expressed in the form of a graph. In (A) and (B) of FIG. 18, an axis of ordinate represents the discharge capacity (mAh/g) of the positive-electrode active material, and an axis of abscissa represents the heating temperature (° C.).

(B) of FIG. 18 is a graph showing a relationship of the heating temperature when the electrolytic solution is synthesized in Example 16, and the discharge capacity of the magnesium battery of the battery manufactured by using that electrolytic solution. As shown in FIG. 18, it is understood that the electrolytic solution synthesized in Example 16 shows the favorable discharge capacity when the heating temperature is in the range of 50° C.~80° C.

Example 17

In Example 17, the electrolytic solution was prepared by changing the concentration of a trifluoroborane-diethylether complex salt in the range of 0 mol/l~2.50 mol/l, and the magnesium battery 10 was manufactured similarly to the case of Example 11 except for this respect. Thus, the discharge test was carried out about the magnesium battery 10.

Figures 19, 20:
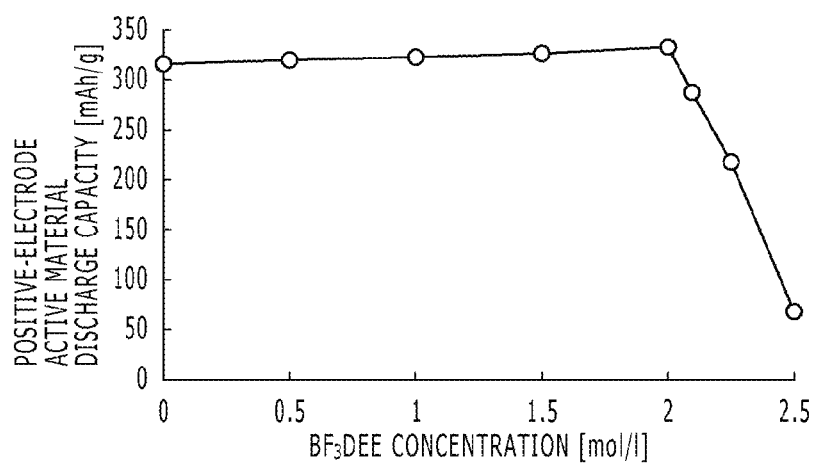
[FIG. 19]
[FIG. 20]

FIG. 19 is a diagram showing a relationship among the concentrations of Mg, MeTFS, EMITFSI, $AlCl_3$, and $BF_3DEE$ used in the synthesis of the electrolytic solution, the heating temperature, and the discharge capacity of the magnesium battery using the synthesized electrolytic solution in Example 17-1 to Example 17-7, and Example 11 of the present invention.

(A) of FIG. 19 is a numeral table showing the concentrations, heating temperatures and discharge capacity described above, and (B) of FIG. 19 is a diagram in which the discharge capacity shown in (A) of FIG. 19 is expressed in the form of a graph. In (A) and (B) of FIG. 19, an axis of ordinate represents the discharge capacity (mAh/g) of the positive-electrode active material, and an axis of abscissa represents the $BF_3DEE$ concentration (mol/l).

(B) of FIG. 19 is a graph showing a relationship between the concentration of the trifluoroborane-diethylether complex salt used in the synthesis of the electrolytic solution in Example 17, and the discharge capacity of the magnesium battery. As can be seen from FIG. 19, when the concentration of the trifluoroborane-diethylether complex salt is equal to or less than 2.00 mol/l (the additive amount of trifluoroborane-diethylether complex salt is equal to or less than 4.00 mol per 1.00 mol of Mg), the electrolytic solution synthesized in Example 17 is favorable in the terms of the electrolytic solution of the magnesium battery 10.

Example 18

In example 18, the electrolytic solution was prepared by using the ethyl trifluoromethanesulfonate as the alkyl trifluoromethanesulfonate instead of using the methyl trifluoromethanesulfonyl. The magnesium battery 10 was manufactured similarly to the case of Example 11 except for this respect, and the discharge test was carried out about the magnesium battery 10.

FIG. 20 is a diagram showing the discharge capacity of the magnesium battery using the electrolytic solution, in Example 18 of the present invention, which was synthesized by changing the kind of alkyl trifluoromethanesulfonate in Example 11. It is noted that in FIG. 20, RTFS means the kind of alkyl trifluoromethanesulfonate.

As shown in FIG. 20, even when the nonaqueous electrolytic solution containing therein the magnesium ions based on the present invention is manufactured by using any of the kinds of alkyl trifluoromethanesulfonates, with regard to the discharge capacity, the nonaqueous electrolytic solutions each containing therein the magnesium ions based on the present invention show approximately the same performance.

Example 19

In example 19, 1,3-dimethylimidazoliumtetrafluoroborate, 1-ethyl-3-methylimidazoliumtetrafluoroborate, 1-butyl-3-methylimizadoliumtetrafluoroborate, 1,3-dimethylimidazoliumbis(trifluoromethanesulfonyl)imide, or 1-butyl-3-methylimidazoliumbis(trifluoromethanesulfonyl) imide was used as a 1,3-alkylmethylimidazolium salt instead of using 1-ethyl-3-methylimidazoliumbis(trifluoromethanesulfonyl)imide.

The electrolytic solution was prepared similarly to the case of Example 11 except for the kind of 1,3-alkylmethylimidazolium salt, and the magnesium battery 10 was manufactured using the electrolytic solution thus prepared. Thus, the discharge test was carried out about the magnesium battery 10.

FIG. 21 is a diagram showing the discharge capacities of the magnesium batteries using the electrolytic solutions synthesized by changing the kind of 1,3-alkylmethylimidazolium salt of Example 11 in Example 19-1 to Example 19-5 of the present invention.

As shown in FIG. 21, even when the nonaqueous electrolytic solution containing therein the magnesium ions based on the present invention was manufactured by using any of the 1,3-alkylmethylimidazolium salts described above, with regard to the discharge capacity, the nonaqueous electrolytic solutions each containing therein the magnesium ions based on the present invention show approximately the same performance.

Example 20

In Example 20, a trifluoroborane-dimethyl ether complex salt, a trifluoroborane-ethyl methyl ether complex salt, a trifluoroborane-n-dibutyl ether complex salt, or a trifluoroborane-tetrahydrofuran complex salt was used as the trifluoroborane-ether complex instead of using the trifluoroborane-diethylether complex salt.

The electrolytic solution was prepared similarly to the case of Example 11 except for the kind of 1,3-alkylmethylimidazolium salt, and the magnesium battery 10 was manufactured by using the electrolytic solution thus prepared. Thus, the discharge test was carried out about the magnesium battery 10.

FIG. 22 is a diagram showing the discharge capacities of the magnesium batteries using the electrolytic solutions synthesized by changing the kind of trifluoroborane-ether complex salt of Example 11 in Example 20-1 to Example 20-4 of the present invention.

As shown in FIG. 22, even when the nonaqueous electrolytic solution containing therein the magnesium ions based on the present invention was manufactured by using any of the trifluoroborane-ether complex salts described above, with regard to the discharge capacity, the nonaqueous electrolytic solutions each containing therein the magnesium ions based on the present invention show approximately the same performance.

As shown in Comparative Example 14, the THF solution of the magnesium dichlorobutylethylaluminate described as the electrolytic solution for the magnesium battery in the Non-Patent Document 1 needs to be treated in the inactive gas ambient atmosphere within the argon gloved box. On the other hand, the nonaqueous electrolytic solution containing therein the magnesium ions based on the present invention can be treated within the dry room as the general equipment.

In addition, it is better that as shown in Example 12 to Example 17, metal magnesium is added at the ratio of 0.25 mol/l~1.00 mol/l to 1,2-dimethoxyethane as the solvent, and the methyl trifluoromethanesulfonate, 1-ethyl-3-methylimidazoliumbis(trifluoromethanesulfonyl)imide, and the aluminum chloride are added at the ratio of 0.80 mol~1.20 mol, at the ratio of 1.00 mol~2.00 mol, and at the ratio of 1.00 mol or less per 1.00 mol of magnesium, and they are made to react with one another at 50° C.~80° C. while they are stirred, and thereafter, more preferably, 4.00 mol or less of the trifluoroborane-diethylether complex salt per 1 mol of magnesium is added thereto.

The nonaqueous electrolytic solution containing therein the magnesium ions of Example 20, and the method of manufacturing the same are simpler than the conventional method because the solvent itself of the electrolytic solution is used in the synthesis. In addition, since metal magnesium and the magnesium salts, and other stable materials are used as the starting materials, the management of the row materials is easy, and thus the nonaqueous electrolytic solution containing therein the magnesium ions can be manufactured at high productivity and in the high yield with the simple equipment such as the dry room. That is to say, the nonaqueous electrolytic solution containing therein the magnesium ions has a possibility that the manufacturing cost when the electrolytic solution is put into practical use as the product is greatly reduced.

Next, a description will be given with respect to complex salts which are thought to be contained in the electrolytic solutions synthesized in Examples of the present invention described above. Some structures of the complex salts which are thought to be generated in the nonaqueous electrolytic solution containing therein the magnesium ions are considered, and examples thereof will be described hereinafter.

FIG. 23 is a view showing examples of structures of complex salts which are thought to be contained in the synthesized electrolytic solution in Example 11 of the present invention.

(A) of FIG. 23 shows an example of a structure of a complex salt [MgMeTFSI(DME)] which is thought to be generated in the electrolytic solution when in the synthesis of the electrolyte, a methyl trifluoromethanesulfonate (MeTFS) was used as an alkyl trifluoromethanesulfonate, 1-ethyl-3-methylimidazoliumbis(trifluoromethanesulfonyl)imide (EMITFSI) was used as a 1,3-alkylmethylimidazolium salt, 1,2-dimethoxyethane(DME) was used as the ether system organic solvent, and a trifluoroborane-diethylether complex salt ($BF_3DEE$) was used as the trifluoroborane-ether complex salt.

(B) of FIG. 23 shows an atomic arrangement of a bis (trifluoromethanesulfonyl)imide ion($[(CF_3SO_2)_2N]^-$) abbreviated to $[TFSI]^-$ in the form of a molecule model and a chemical formula, (C) of FIG. 23 shows an atomic arrangement of a 1-ethyl-3-methylimidazolium ion ($[CH_3CH_2(C_3H_3N_2)CH_3]^+$) abbreviated to $[EMI]^+$ in the form of a molecule model and a chemical formula, (D) of FIG. 23 shows an atomic arrangement of 1,2-dimethoxyethane ($CH_3OCH_2CH_2OCH_3$) abbreviated to DME in the form of a molecule model and a chemical formula, (E) of FIG. 23 shows an atomic arrangement of a methyl trifluoromethanesulfonic acid ($CF_3SO_3CH_8$) abbreviated to MeTFS in the form of a molecule model and a chemical formula, and (F) of FIG. 23 shows an atomic arrangement of a trifluoromethanesulfonic acid ($[CF_3SO_3]^-$) abbreviated to $[TFS]^-$ in the form of a molecule model and a chemical formula.

From a nuclear magnetic resonance absorption spectrum and a near edge X-ray absorption fine structure spectrum, like the example shown in (A) of FIG. 23, the complex [MgMeTFSI(DME)] is thought to have a structure that a carbon atom of a methyl ion ($Me^+$), an oxygen ion of a bis(trifluoromethanesulfonyl)imide ion $[TFSI]^-$, and an oxygen atom of 1,2-dimethoxyethane (DME) are coordinate-bonded to a Mg atom.

DME forms together with the Mg ion the coordinate bond, thereby dissolving therein the Mg ion, and the Mg ion forms the complex [MgMeTFSI(DME)] as shown in (A) of FIG. 23. Also, the complex [MgMeTFSI(DME)] is in a state of dissociation equilibrium, and the Mg ion is in a state of being dissolved in DME as the ether system organic solvent.

[Example (Magnesium Battery Using Nonaqueous Electrolytic Solution Containing Magnesium Ions Simultaneously Using Quaternary Ammonium Salt and 1,3-Alkylmethylimidazolium Salt)]

In this Example, the coin type magnesium battery 10 shown in FIG. 1 was manufactured by using metal magnesium as the negative-electrode active material 5, by using the manganese oxide as the positive-electrode active material, and by using both the quaternary ammonium salt and the 1,3-alkylmethylimidazolium salt. Thus, the discharge capacity of the magnesium battery 10 was measured.

The electrolytic solution was prepared by using tetrafluoroboric acid tetrabutylammonium as the quaternary ammonium salt, and by using 1-ethyl-3-methylimidazoliumbis(trifluoromethanesulfonyl)imide as the 1,3-alkylmethylimidazolium salt.

<Synthesis of Nonaqueous Electrolytic Solution 7 Containing Magnesium Ions>

0.12 g of metal magnesium was added to 10 ml of 1,2-dimethoxyethane. In addition, 0.55 ml of methyl trifluoromethanesulfonate (MeTFS), 1.235 g of tetrafluoroboric acid tetrabutylammonium ($TBABF_4$), 1.465 g of 1-ethyl-3-methylimidazoliumbis(trifluoromethanesulfonyl)imide (EMITF SI), and 0.33 g of an aluminum chloride ($AlCl_3$) were added thereto. This corresponds to that metal magnesium, methyl trifluoromethanesulfonate, tetrafluoroboric acid tetrabutylammonium, 1-ethyl-3-methylimidazoliumbis (trifluoromethanesulfonyl)imide, and an aluminum chloride were added at the ratio of 0.50 mol/l, at the ratio of 0.50 mol/l, at the ratio of 0.35 mol/l, at the ratio of 0.35 mol/l, and at the ratio of 0.25 mol/l to 1,2-dimethoxyethane. The heating treatment was carried out at 60° C. for 20 hours while they were stirred, thereby dissolving both the magnesium ions and the aluminum ions in 1,2-dimethoxy ethane.

In the electrolytic solution of this Example, tetrafluoroboric acid tetrabutylammonium and 1-ethyl-3-methylimidazoliumbis(trifluoromethanesulfonyl)imide are added at the ratio of 1.50 mol per 1.00 mol of metal magnesium.

After that, 1.26 ml of a trifluoroborane-diethylether complex salt ($BF_3DEE$) was added and was then sufficiently stirred. This corresponds to that a trifluoroborane-diethylether complex salt was added at the ratio of 1.00 mol/l.

The positive-electrode pellet 2 and the negative-electrode active material 5 were both formed, thereby manufacturing the magnesium battery 10 similarly to the case of each of Example 1 and Example 11, and the discharge test was carried out about the magnesium battery 10. As a result, there was obtained approximately the same discharge capacity as that in each of Example 1 and Example 11.

The magnesium battery in each of Examples which will be described below is a nonaqueous electrolytic solution system battery which uses either a magnesium metal or a magnesium alloy as the negative-electrode material and uses a graphite fluoride as the positive-electrode active material, and a battery which uses copper.

The magnesium battery in each of Examples which will be described below includes a positive-electrode pellet 2 into which a positive-electrode mixture composed of the positive-electrode active material made from the graphite fluoride, a conductive agent such as graphite, and a binder such as a poly(vinylidene fluoride) is pressure-molded together with a net-like positive-electrode power collecting body so as to have a disc-like shape, a positive-electrode can 1, a negative-electrode cup 4, a negative-electrode active material 5 containing therein either a magnesium metal or a magnesium alloy, a porous separator 6 impregnated with an electrolytic solution 7, and a sealing gasket 8.

In addition, although in each of following Examples, a coin type battery is described, the present invention can also be applied to a cylinder type or square type battery having a spiral structure in its inside in which a thin positive electrode and a thin negative electrode between which a separator is held are wound into a spiral shape as long as the positive-electrode active material has the structure of contacting copper, and thus the same effects as those in the coin type battery can be obtained.

It is noted that in each of Example 21-1 to Example 21-13 which will be described later, the positive-electrode mixture described above further contains therein copper power. In addition, in Example 22 which will be described later, the positive-electrode mixture not containing therein copper power and a metallic net supporting body 3 made of copper are both used. Moreover, in Example 23 which will be described later, a positive-electrode mixture not containing therein copper powder, a metallic net supporting body 3 made of non-copper, and the positive-electrode can 1 having an inner surface covered with copper are used.

With regard to the negative-electrode active material 5, a magnesium metal, a magnesium alloy obtained by adding an alloy element such as aluminum to magnesium, or the like can be used.

For example, a fine porous film made of a polyolefin system such as polypropylene or polyethylene, or the like can be used in the separator 6.

Metal magnesium, an alkyl trifluoromethanesulfonic acid, a quaternary ammonium salt or/and a 1,3-alkylmethylimidazolium salt are added to an ether system organic solvent and are then heated, thereby making it possible to prepare the nonaqueous electrolytic solution in which the magnesium ions are dissolved in the ether system organic solvent.

The nonaqueous electrolytic solution, for example, is a liquid solution obtained by dissolving either a suitable salt containing therein magnesium ions or metal magnesium (Mg) in an aprotic solvent. For example, a liquid solution which is synthesized (prepared) from metal magnesium, a methyl trifluoromethanesulfonate ($CH_3CF_3SO_3$), 1-ethyl-3-methylimidazoliumbis(trifluoromethanesulfonyl)imide ($[C_2H_5(C_3H_3N_2)CH_3](SO_2CF_3)_2N$) as a 1-ethyl-3-methylimidazolium salt, and 1,2-dimethoxyethane ($CH_3OCH_2CH_2OCH_3$), or the like can be used as the nonaqueous electrolytic solution.

Example 21

In Example 21, a description will now be given with respect to a magnesium battery using a positive-electrode mixture containing therein a positive-electrode active material made from a graphite fluoride, and copper.

<Formation of Positive-Electrode Pellet 2>

Powder of the graphite fluoride as the positive-electrode active material, powder of metal copper, power of graphite as the conductive agent, and powder of a poly(vinylidene fluoride) as the binder are mixed with one another. The mixing was carried out at a composition such that a mass ratio of graphite to the graphite fluoride ((mass of graphite/mass of graphite fluoride)×100), and a mass ratio of copper to the graphite fluoride ((mass of copper)/mass of graphite fluoride)×100) become predetermined values, respectively.

This mixture was dispersed in an N-methyl-2-pyrrolidone (NMP) solution to obtain a positive-electrode mixture slurry. The resulting slurry was dried at 120° C. for two hours to volatilize NMP, and the resulting solidified material was pounded into powder in a mortar, thereby obtaining a positive-electrode mixture. 0.1 g of the positive-electrode mixture was weighed and was then pressure-molded with an expanded metal made of nickel (Ni) as a positive-electrode power collecting body at a predetermined pressure so as to have a disc-like shape, thereby obtaining a positive-electrode pellet having a diameter of 15.5 mm and a thickness of 250 μm. It is noted that in the used expanded metal made of Ni (manufactured by Thank-Metal Co., Ltd.), a distance of center in a mesh short-width direction=SW=0.75 mm, a distance of center in a mesh long-width direction=LW=1.50 mm, a step size=W=0.1 mm, and a thickness of a material=T=0.1 mm.

A magnesium plate was processed to be molded so as to obtain a disc-like shape having a diameter of 15.5 mm and a thickness of 800 μm, thereby forming the negative electrode pellet.

<Preparation of Nonaqueous Electrolytic Solution 7 Containing Magnesium Ions>

Metal magnesium, a methyl trifluoromethane sulfonate, and 1-ethyl-3-methylimidazoliumbis(trifluoromethanesulfonyl)imide were added at a ratio of 0.25 mol/L, at a ratio of 0.25 mol, and at a ratio of 0.5 mol to a 1,2-dimethoxyethane solution. A heating treatment was carried out at 60° C. for 20 hours while they were stirred, thereby obtaining an electrolytic solution.

Next, a fine-porous separator made of polyethylene and having a thickness of 25 μm was placed on a positive-electrode can made of stainless in which the positive-electrode pellet was accommodated, a given amount of electrolytic solution thus manufactured was infused from the fine-porous separator, and the negative-electrode pellet described above, a sealing gasket, and a negative-electrode cup made of stainless were laminated in order therefrom. Finally, they were fitted into one another, and were recovered from an argon gloved box, thereby manufacturing a coin type battery having an external shape of 20 mm, and a height of 1.6 mm.

Comparative Example 15

In the battery of Example 21, a battery having a structure that a content of copper in the positive-electrode mixture was 0 (zero) was manufactured.

Figure 24:
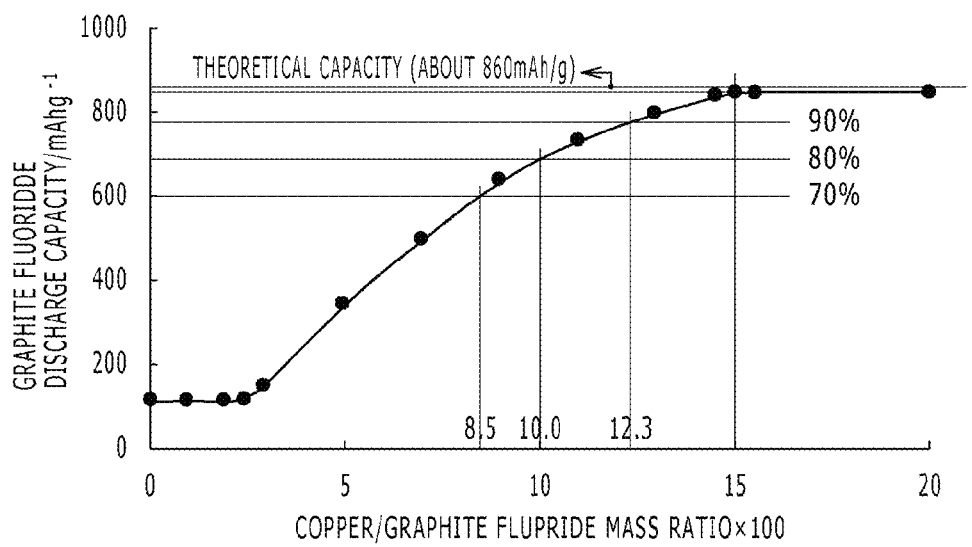
[FIG. 24]

FIG. 24 shows a relationship about the discharge capacity of the positive-electrode mixture in Examples of the present invention, and is a diagram showing a relationship between a mass ratio of copper to the graphite fluoride ((mass of copper/mass of graphite fluoride)×100), and the discharge capacity of the graphite fluoride when copper is added to the positive-electrode mixture.

(A) of FIG. 24 is a numeral table showing the positive electrode mixture and discharge capacity described above, and (B) of FIG. 24 is a diagram in which (A) of FIG. 24 is expressed in the form of a graph. In (A) and (B) of FIG. 24, an axis of ordinate represents the discharge capacity (mAh/g) of the graphite fluoride, and an axis of abscissa represents the mass ratio of copper to the graphite fluoride ((mass of copper/mass of graphite fluoride)×100).

The positive-electrode mixtures for which the powder of the graphite fluoride (CF), the powder of metal copper (Cu), the powder of graphite (C), and the power of a poly(vinylidene fluoride) (PFV) were weighed at mass compositions (%) as shown in (A) of FIG. 24, and which was manufactured in accordance with the method described above were used in the magnesium batteries of Example 21-1 to Example 21-13, and Comparison Example 15, respectively.

With regard to the magnesium batteries thus manufactured in Example 21-1 to Example 21-13, and Comparison Example 15, the discharge test was carried out with a constant current of 0.1 mA until the battery voltage became zero V, and the discharge capacities were evaluated.

Figures 25, 26:
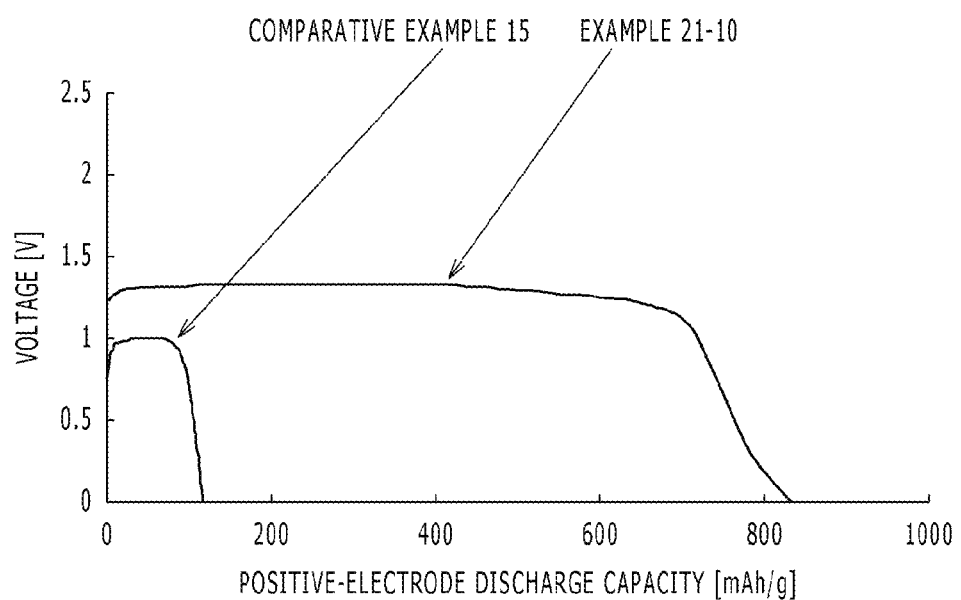
[FIG. 25]
[FIG. 26]

FIG. 25 is a diagram showing a change in discharge capacity in Example of the present invention, and showing the discharge capacities of the positive electrodes with respect to Comparative Example 15 and Example 21-10 as an example. In FIG. 25, an axis of ordinate represents the voltage (V), and an axis of abscissa represents the positive electrode discharge capacity (mAh/g).

As a result of the discharge tests, there are obtained the discharge capacities as shown in the rightmost side column in a table of (A) of FIG. 24, and as shown in a graph of (B) of FIG. 24, respectively. From the results shown in FIG. 24, as compared with the case of the magnesium battery of Comparative Example 15 in which copper is not added to the positive-electrode mixture, by adding copper to the positive-electrode mixture, the discharge capacity of the graphite fluoride becomes large, and thus the effect of increasing the discharge capacity is obtained when the mass ratio of copper to the graphite fluoride ((mass of copper/mass of graphite fluoride)×100) is equal to or larger than 3.0. In addition, the discharge capacity is approximately constant when that mass ratio exceeds 15.0. This discharge capacity is about 7.2 times as large as that of the battery of Comparative Example 15, and becomes a value corresponding to about 99% of the theoretical capacity.

As apparent from the results shown in FIG. 24, each of the discharge capacities of the batteries of Example 21-10 to Example 21-13 becomes about 7.1 times or more as large as that of Comparative Example 15, and thus is very large. It is obvious that in the magnesium graphite fluoride battery, it is preferable to use the positive-electrode mixture containing therein copper.

As shown in (B) of FIG. 24, when the ratio of copper added to the positive-electrode mixture, that is, the ratio (mass of copper/mass of graphite fluoride)×100 is 8.5, 10.0, 12.3, 15.0, the discharge capacity reaches 70%, 80%, 90%, 98.8% of the theoretical capacity (about 860 mAh/g).

Since copper itself in the positive-electrode mixture does not have the discharge capacity similarly to graphite as the conductive agent or a poly(vinylidene fluoride) as the binder, it is suitable that the mass ratio of copper to the graphite fluoride is equal to or smaller than an upper limit value in which the effect of increasing the discharge capacity is obtained. Therefore, in the magnesium graphite fluoride battery, when copper is added to the positive-electrode mixture in order to obtain the effect of increasing the discharge capacity, it is preferable that the mass of copper is made equal to or larger than 3.0 and equal to or smaller than 15.0 per the mass of 100 of the graphite fluoride.

In addition, since when the mass of copper is made at least 8.5, 10.0, 12.3, 15.0 per the mass of 100 of the graphite fluoride, 70%, 80%, 90%, 98.8% of the theoretical capacity can be obtained. Thus, a large amount of copper needs not to be contained in the positive-electrode mixture, and an increase in inner volume of the battery is prevented from being caused.

Example 22

In Example 22, a description will now be given with respect to a magnesium battery using a positive-electrode power collecting body made of copper without using the positive-electrode mixture containing therein the positive-electrode active material made from the graphite fluoride, and copper.

The magnesium battery of Example 22 was manufactured similarly to the case of the battery of Comparative Example 15 except that the positive-electrode power collecting body was made of an expanded metal made from copper (Cu) instead of being made of the expanded metal made from nickel in the battery of Comparative Example 15. It is noted that in the used expanded metal made of Cu (manufactured by Thank-Metal Co., Ltd.), the distance of center in the mesh short-width direction=SW=0.75 mm, the distance of center in the mesh long-width direction=LW=1.50 mm, the step size=W=0.1 mm, and the thickness of the material=T=0.1 mm.

With regard to the battery thus manufactured of Example 22, the discharge test was carried out with the constant current of 0.1 mA until the battery voltage became zero V similarly to the case of the battery of Example 21.

FIG. 26 is a diagram showing a discharge capacity of the graphite fluoride when the positive-electrode power collecting body made of copper is used in Example of the present invention.

As apparent from the results shown in FIG. 26, the discharge capacity of the battery of Example 22 in which the positive-electrode power collecting body is made of the expanded metal made from Cu is about 7.0 times as large as that of the battery of Comparative Example 15 in which the positive-electrode power collecting body is made of the expanded metal made from Ni. The discharge capacity of the battery of Example 22 is a value close to each of the discharge capacities of the batteries of Example 21-10 to Example 21-13, and corresponds to about 96% of the theoretical capacity. The battery of Example 22 is very large in discharge capacity, and thus it is obvious that in the magnesium graphite fluoride battery, it is preferable to use a positive-electrode power collecting body made of copper.

It is noted that the positive-electrode power collecting body made of a metal (conductive material) covered with copper can also be used instead of using the positive-electrode power collecting body made of copper. The positive-electrode power collecting body can be manufactured by using a conductive material covered with copper through evaporation or sputtering of copper onto a surface of a metal other than copper, and by using a cladding material in which a surface of a metal other than copper clads in copper. For example, it is possible to use the positive-electrode power collecting body which is covered with copper through the evaporation or sputtering of copper onto the surface of the expanded metal made of Ni.

Example 23

In Example 23, a description will now be given with respect to a magnesium battery using a positive-electrode can having an inner surface covered with copper without using the positive-electrode mixture containing therein the positive-electrode active material made from the graphite fluoride, and copper, and without using the positive-electrode power collecting body made of copper.

The magnesium battery of Example 23 was manufactured similarly to the case of the battery of Comparative Example 15 except that a positive-electrode can having an inner surface covered with copper was used instead of using the positive-electrode can made of stainless in the battery of Comparative Example 15. Also, the positive-electrode can made of a cladding material cladding in stainless and copper was used.

With regard to the battery thus manufactured of Example 23, the discharge test was carried out with the constant current of 0.1 mA until the battery voltage became zero V similarly to the case of each of the batteries of Example 21 and Example 22.

FIG. 27 is a diagram showing the discharge capacity of the graphite fluoride when the inner surface of the positive-electrode can is covered with copper in Example of the present invention.

As apparent from the results shown in FIG. 27, the discharge capacity of the battery of Example 23 using the positive-electrode can having the inner surface covered with copper is about 6.8 times as large as that of the battery of Comparative Example 15 using the positive-electrode can made of stainless. Although the discharge capacity of the battery of Example 23 is slightly smaller than that of each of the batteries of Example 21-10 to Example 21-13, the discharge capacity of the battery of Example 23 corresponds to about 93% of the theoretical capacity. The battery of Example 23 is very large in discharge capacity, and thus it is obvious that in the magnesium graphite fluoride battery, it is preferable to use the positive-electrode can having the inner surface covered with copper.

It is noted that the positive-electrode can having the inner surface covered with copper can be manufactured by using either the cladding material in which a metal other than copper clads in copper, or the material covered with copper through the evaporation or sputtering of copper onto a surface of a metal other than copper.

[Example (Magnesium Battery in which Composition of Electrolytic Solution is Changed)]

Although in each of Examples 21 to 23, the magnesium battery was manufactured by using the electrolytic solution prepared by using 1-ethyl-3-methylimidazoliumbis(trifluoromethanesulfonyl)imide, in this Example, the magnesium battery was manufactured by using an electrolytic solution prepared by using tetrafluoroboric acid tetrabutylammonium in each of Example 21 to Example 23.

<Preparation of Nonaqueous Electrolytic Solution 7 Containing Magnesium Ions>

Metal magnesium, a methyl trifluoromethanesulfonate, and tetrafluoroboric acid tetrabutylammonium were added at a ratio of 0.25 mol/L, at a ratio of 0.25 mol, and at a ratio of 0.5 mol to a 1,2-dimethoxyethane solution. A heating treatment was carried out at 60° C. for 20 hours while they were stirred, thereby obtaining an electrolytic solution.

The discharge test was carried out about the magnesium battery 10 manufactured by using this electrolytic solution. As a result, there was obtained approximately the same discharge capacity as that of each of the magnesium batteries of Example 21-11, Example 22, and Example 23.

As set forth hereinabove, by adopting the structure in which the positive-electrode active material contacts copper, it is possible to provide the magnesium battery having the very large discharge capacity.

Although in Examples described above, the description has been given with respect to the battery using the positive-electrode mixture contacting therein both the positive-electrode active material made from the graphite fluoride, and copper (Example 21), the battery using either the positive-electrode power collecting body made of copper or the positive-electrode power collecting body made of a metal (conductive material) covered with copper (Example 22), and the battery using the positive-electrode can having the inner surface covered with copper (Example 23), the magnesium battery having the discharge capacity corresponding to about 99% of the theoretical capacity can also be manufactured by using a combination of any of two or more of (1) the structure of the positive-electrode mixture containing therein copper, (2) the structure of either the positive-electrode power collecting body made of copper or the positive-electrode power collecting body covered with copper, and (3) the structure of the positive-electrode can having the inner surface covered with copper.

Although the present invention has been described so far with respect to the embodiments, the present invention is by no means limited to the embodiments described above, and thus various kinds of changes can be made based on the technical idea of the present invention.

For example, in the electrochemical device based on the present invention suitable for either the primary battery or the secondary battery, the shape, structure, material and the like thereof can be suitably selected without departing from the present invention, and thus the present invention can be suitably applied to the batteries having various shapes such as a cylinder type, a square type, a coin type and a winding type, and various sizes.

INDUSTRIAL APPLICABILITY

The electrochemical device according to the present invention can provide the magnesium secondary battery or the like having the structure with which the superior characteristics of the negative-electrode active material, such as the large energy capacity, which a polyvalent metal such as metal magnesium has can be sufficiently brought out, and which makes the miniaturization, the light weight, and the portable instrumentation of the small electronic apparatus possible, thereby realizing the enhancement of the convenience and the price reduction.

EXPLANATION OF REFERENCE NUMERALS

1 ... Positive-electrode can, 2 ... Positive-electrode pellet, 3 ... Metal net supporting body, 4 ... Negative-electrode cup, 5 ... Negative-electrode active material, 6 ... Separator, 7 ... Electrolytic solution, 8 ... Sealing gasket, 10 ... Magnesium battery, 11 ... Positive electrode, 12 ... Negative electrode It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A nonaqueous electrolytic solution comprising magnesium ions dissolved in an ether system organic solvent in which at least one of metal magnesium, alkyl trifluoromethanesulfonate having a general formula $RCF_3SO_3$, a quaternary ammonium salt having a general formula $R^1R^2R^3R^4N^+Z^-$ and a 1,3-alkyl methylimidazolium salt having a general formula $R(C_3H_3N_2)CH_3]^+X^-$ are added to the ether system organic solvent;
wherein in the general formula $RCF_3SO_3$, R is a methyl group or an ethyl group;
wherein in the general formula $R^1R^2R^3R^4N^+Z^-$, each of $R^1$, $R^2$, $R^3$, and $R^4$ is an alkyl group or an aryl group, and $Z^-$ is any one of a chloride ion ($Cl^-$), a bromide ion ($Br^-$), an iodine ion ($I^-$), an acetic acid ion ($CH_3COO^-$), a perchloric acid ion ($ClO_4^-$), a tetrafluoroboric acid ion ($BF_4^-$), a hexafluorophosphoric acid ion ($PF_6^-$), a hexafluoroarsenic acid ion ($AsF_6^-$), a perfluoroalkylsulfonic acid ion ($Rf1SO_3^-$) where Rf1 is a perfluoroalkyl group, and a perfluoroalkylsulfonyl imide ion (($Rf2SO_2)_2N^-$) where Rf2 is a perfluoroalkyl group; and
wherein in the general formula $[R(C_3H_3N_2)CH_3]^+X^-$, R is a methyl group, an ethyl group or a butyl group, and $X^-$ is any one of a tetrafluoroboric acid ion ($BF_4^-$) and a bis(trifluoromethanesulfonyl)imide ion (($SO_2CF_3)_2N^-$);
wherein an aluminum halide having a general formula $AlY_3$ is added to the ether system organic solvent, wherein in the general formula $AlY_3$, Y is any one of chlorine (Cl), bromine (Br), and iodine (I).

2. The nonaqueous electrolytic solution according to claim 1, wherein the aluminum halide is an aluminum chloride, and the aluminum halide is added at a ratio of 1.0 mol or less per 1.0 mol of metal magnesium.

3. The nonaqueous electrolytic solution according to claim 1, wherein at least one type of trifluoroborane-ether complex salt ($BF_3$(ether)) selected from the group consisting of a trifluoroborane-dimethyl ether complex salt, a trifluoroborane-ethyl methyl ether complex salt, a trifluoroborane-diethyl ether complex salt, a trifluoroborane-n-dibutyl ether complex salt, and a trifluoroborane-tetrahydrofuran complex salt is added.

4. The nonaqueous electrolytic solution according to claim 3, wherein the trifluoroborane-ether complex salt is added at a ratio of 4.0 mol or less per 1.0 mol of the metal magnesium.

5. The nonaqueous electrolytic solution according to claim 1, wherein the alkyl trifluoromethanesulfonate is at least one type selected from the group consisting of a methyl trifluoromethanesulfonate and an ethyl trifluoromethanesulfonate, and the alkyl trifluoromethanesulfonate is added at a ratio of equal to or more than 0.8 mol and equal to or less than 1.2 mol per 1.0 mol of the metal magnesium.

6. The nonaqueous electrolytic solution according to claim 1, wherein the quaternary ammonium salt is at least one type selected from the group consisting of trifluoromethanesulfonic acid tetrabutylammonium, trifluoromethanesulfonic acid tributylmethylammonium, trifluoromethanesulfonic acid triethylmethylammonium, tetrafluoroboric acid tetrabutylammonium, tetrafluoroboric acid tributylmethylammonium, tetrafluoroboric acid triethylmethylammonium, tetrabutylammoniumbis(trifluoromethanesulfonyl)imide, tributylmethylammoniumbis(trifluoromethanesulfonyl)imide, and triethylmethylammoniumbis(trifluoromethanesulfonyl)imide, and the 1,3-alkylmethylimidazolium salt is at least one kind selected from the group consisting of a 1,3-dimethylimidazoliumtetrafluoroborate, a 1-ethyl-3-methylimidazoliumtetrafluoroborate, a 1-butyl-3-methylimidazoliumtetrafluoroborate, 1,3-dimethylimidazoliumbis(trifluoromethanesulfonyl)imide, 1-ethyl-3-methylimidazoliumbis (trifluoromethanesulfonyl)imide, and 1-butyl-3-methylimidazoliumbis(trifluoromethanesulfonyl)imide.

7. The nonaqueous electrolytic solution according to claim 1, wherein any one of the quaternary ammonium salt or the 1,3-alkylmethylimidazolium salt is added at the ratio of equal to or more than 1.0 mol and equal to or less than 2.0 mol per 1.0 mol of the metal magnesium, or the quaternary ammonium salt and the 1,3-alkylmethylimidazolium salt are added at the ratio of equal to or more than 1.0 mol and equal to or less than 2.0 mol in total per 1.0 mol of the metal magnesium.

8. The nonaqueous electrolytic solution according to claim 1, wherein the ether system organic solvent is 1,2-dimethoxyethane.

9. The nonaqueous electrolytic solution according to claim 1, wherein the metal magnesium is added at the ratio of equal to or more than 0.25 mol/l and equal to or less than 1.0 mol/l to the ether system organic solvent.

10. An electrochemical device, comprising:
a first electrode;
a second electrode; and
a nonaqueous electrolytic solution, the nonaqueous electrolyte solution including magnesium ions dissolved in an ether system organic solvent in which at least one of metal magnesium, alkyl trifluoromethanesulfonate having a general formula $RCF_3SO_3$, a quaternary ammonium salt having a general formula $R^1R^2R^3R^4N^+Z^-$ and a 1,3-alkyl methylimidazolium salt having a general formula $R(C_3H_3N_2)CH_3]^{+X-}$ are added to the ether system organic solvent;
wherein in the general formula $RCF_3SO_3$, R is a methyl group or an ethyl group;
wherein in the general formula $R^1R^2R^3R^4N^+Z^-$, each of $R^1$, $R^2$, $R^3$, and $R^4$ is an alkyl group or an aryl group, and $Z^-$ is any one of a chloride ion ($Cl^-$), a bromide ion ($Br^-$), an iodine ion ($I^-$), an acetic acid ion ($CH_3COO^-$), a perchloric acid ion ($ClO_4^-$), a tetrafluoroboric acid ion ($BF_4^-$), a hexafluorophosphoric acid ion ($PF_6^-$), a hexafluoroarsenic acid ion ($AsF_6^-$), a perfluoroalkylsulfonic acid ion ($Rf1SO_3^-$) where Rf1 is a perfluoroalkyl group, and a perfluoroalkylsulfonyl imide ion ($(Rf2SO_2^-)_2N^-$) where Rf2 is a perfluoroalkyl group;
wherein in the general formula $[R(C_3H_3N_2)CH_3]^+X^-$, R is a methyl group, an ethyl group or a butyl group, and $X^-$ is any one of a tetrafluoroboric acid ion ($BF_4^-$) and a bis(trifluoromethanesulfonyl)imide ion ($(SO_2CF_3)_2N^-$); and
wherein an active material of the second electrode is oxidized to generate magnesium ions.

11. The electrochemical device according to claim 10, wherein the active material of the first electrode is made from any one of a compound which reacts with the magnesium ion and a compound which occludes the magnesium ion, and wherein the active material of the second electrode is made from any one of a metal single body of magnesium and an alloy containing magnesium.

12. The electrochemical device according to claim 10, wherein the first electrode is a positive electrode including a positive-electrode active material made from a graphite fluoride and a positive-electrode mixture containing copper, and the second electrode is a negative electrode containing any one of a magnesium metal and a magnesium alloy as a negative-electrode active material.

13. The electrochemical device according to claim 10, wherein the first electrode is a positive electrode including a positive-electrode mixture containing a positive-electrode active material made from a graphite fluoride, the second electrode is a negative electrode containing any one of a magnesium metal and a magnesium alloy as the negative-electrode active material, and the electrochemical device has at least one of a positive-electrode power collecting body made of at least one of a conductive material covered with copper and copper; and a positive-electrode can having an inner surface covered with copper contacting therein the positive-electrode active material.

14. The electrochemical device according to claim 10, wherein the electrochemical device is configured as a battery.

* * * * *